US009639809B1

United States Patent
Kakde et al.

(10) Patent No.: US 9,639,809 B1
(45) Date of Patent: May 2, 2017

(54) MONITORING SYSTEM BASED ON A SUPPORT VECTOR DATA DESCRIPTION

(71) Applicant: SAS Institute Inc., Cary, NC (US)

(72) Inventors: Deovrat Vijay Kakde, Cary, NC (US); Sergiy Peredriy, Auburndale, MA (US); Arin Chaudhuri, Raleigh, NC (US); Anya M. McGuirk, Holly Spring, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/390,236

(22) Filed: Dec. 23, 2016

Related U.S. Application Data

(63) Continuation-in-part of application No. 15/185,277, filed on Jun. 17, 2016, and a continuation-in-part of application No. 15/096,552, filed on Apr. 12, 2016, now Pat. No. 9,536,208.

(60) Provisional application No. 62/381,624, filed on Aug. 31, 2016, provisional application No. 62/331,084, filed on May 3, 2016, provisional application No. 62/293,494, filed on Feb. 10, 2016.

(51) Int. Cl.
*G06F 15/18* (2006.01)
*G06N 99/00* (2010.01)
*H04L 29/08* (2006.01)

(52) U.S. Cl.
CPC .......... *G06N 99/005* (2013.01); *H04L 67/02* (2013.01)

(58) Field of Classification Search
USPC ........................................................ 706/12
See application file for complete search history.

(56) References Cited

U.S. PATENT DOCUMENTS

| 8,671,364 | B2* | 3/2014 | Kakde ................... G06Q 10/06 715/765 |
| 9,536,208 | B1* | 1/2017 | Kakde .................. G06N 99/005 |
| 2009/0307149 | A1 | 12/2009 | Markov et al. |

(Continued)

OTHER PUBLICATIONS

An Improved Outlier Detection Method in High-dimension Based on Weighted Hypergraph YinZhao Li; Di Wu; JiaDong Ren; ChangZhen Hu 2009 Second International Symposium on Electronic Commerce and Security Year: 2009, vol. 2 pp. 159-163, DOI: 10.1109/ISECS.2009.54 IEEE Conference Publications.*

(Continued)

*Primary Examiner* — Michael B Holmes
(74) *Attorney, Agent, or Firm* — Bell & Manning, LLC

(57) ABSTRACT

A computing device identifies outliers. Support vectors, Lagrange constants, a center threshold value, an upper control limit value, and a lower control limit value are received that define a normal operating condition of a system. The center threshold value, the upper control limit value, and the lower control limit value are computed from the vectors and the Lagrange constants. A first plurality of observation vectors is received for a predefined window length. A window threshold value and a window center vector are computed. A window distance value is computed between the window center vector and the support vectors. Based on comparisons between the computed values and the received values, the first plurality of observation vectors is identified as an outlier relative to the normal operating condition of the system. When the first plurality of observation vectors are identified as the outlier, an alert is output.

30 Claims, 43 Drawing Sheets

(56) References Cited

U.S. PATENT DOCUMENTS

| | | | |
|---|---|---|---|
| 2010/0106561 A1* | 4/2010 | Peredriy | G06Q 30/0202 705/7.31 |
| 2013/0080978 A1* | 3/2013 | Kakde | G06Q 10/06 715/854 |
| 2016/0239749 A1* | 8/2016 | Peredriy | G06N 5/048 |

OTHER PUBLICATIONS

Adaptive Nonlocal Spatial-Spectral Kernel for Hyperspectral Imagery Classification Jianing Wang; Licheng Jiao; Shuang Wang; Biao Hou; Fang Liu IEEE Journal of Selected Topics in Applied Earth Observations and Remote Sensing Year: 2016, vol. 9, Issue: 9 pp. 4086-4101, DOI: 10.1109/JSTARS.2016.2526604 IEEE Journals & Magazines.*

A Novel Nonlinear Algorithm for Area-Wide Near Surface Air Temperature Retrieval Jiang-Lin Qin; Xiu-Hao Yang; He Fu; Xiu-Feng Lei IEEE Journal of Selected Topics in Applied Earth Observations and Remote Sensing Year: 2016, vol. 9, Issue: 7 pp. 3283-3296, DOI: 10.1109/JSTARS.2016.2536745 IEEE Journals & Magazines.*

Constructing Hierarchical Segmentation Tree for Feature Extraction and Land Cover Classification of High Resolution MS Imagery Leiguang Wang; Qinling Dai; Qizhi Xu; Yun Zhang IEEE Journal of Selected Topics in Applied Earth Observations and Remote Sensing Year: 2015, vol. 8, Issue: 5 pp. 1946-1961, DOI: 10.1109/JSTARS.2015.2428232 IEEE.*

Zahid et al., Assessment and Comparison of Multivariate Process Capability Indices in Ceramic Industry, Journal of Mechanical Engineering, vol. ME39, No. 1, Jun. 2008.

Downs et al., A Plant-Wide Industrial Process Control Problem, Computers chem. Engng., vol. 17, No. 3, 1993, pp. 245-255.

Tax et al., Support Vector Data Description, Machine Learning, 54, 2004, pp. 45-66.

Chang et al., A Library for Support Vector Machines, 2011.

Chaudhuri et al., Sampling Method for Fast Training of Support Vector Data Description, arXiv:1606.05382v3, Sep. 25, 2016.

G. Ege, Multi-stage modeling delivers the ROI for internet of things, http://blogs.sas.com/content/subconsciousmusings/2015/10/09/multi-stage-modeling-delivers-the-roi-for-internet-of-things/, Oct. 9, 2015.

Kakde et al., Peak Criterion for Choosing Gaussian Kernel Bandwidth in Support Vector Data Description, arXiv:1602.05257v2, May 11, 2016.

UCI Machine Learning Repository Statlog (Shuttle) Data Set, https://archive.ics.uci.edu/ml/datasets/Statlog+(Shuttle), Printed on Feb. 9, 2017.

S. Raissi, Multivariate process capability indices on the presence of priority for quality characteristics, Journal of Industrial Engineering International, vol. 5, No. 9, Jun. 2009, pp. 27-36.

N. Ricker, Tennessee Eastman Challenge Archive, http://depts.washington.edu/control/LARRY/TE/download.html, Printed on Feb. 9, 2017.

Santos-Fernandez et al., MPCI: An R Package for Computing Multivariate Process Capability Indices, Journal of Statistical Software, vol. 47, Issue 7, Apr. 2012.

Sun et al., A kernel-distance-based multivariate control chart using support vector methods, int. j. prod. res., vol. 41, No. 13, 2003, pp. 2975-2989.

MacGregor et al., Statistical process control of multivariate processes, Control Engineering Practice, vol. 3, Issue 3, Mar. 1995, pp. 403-414.

SAS Institute Inc. 2015. SAS/ETS® 14.1 User's Guide. Cary, NC: SAS Institute Inc, Jul. 2015, pp. 611, 813, 825, 829, 1088, 1414 and 1424.

* cited by examiner

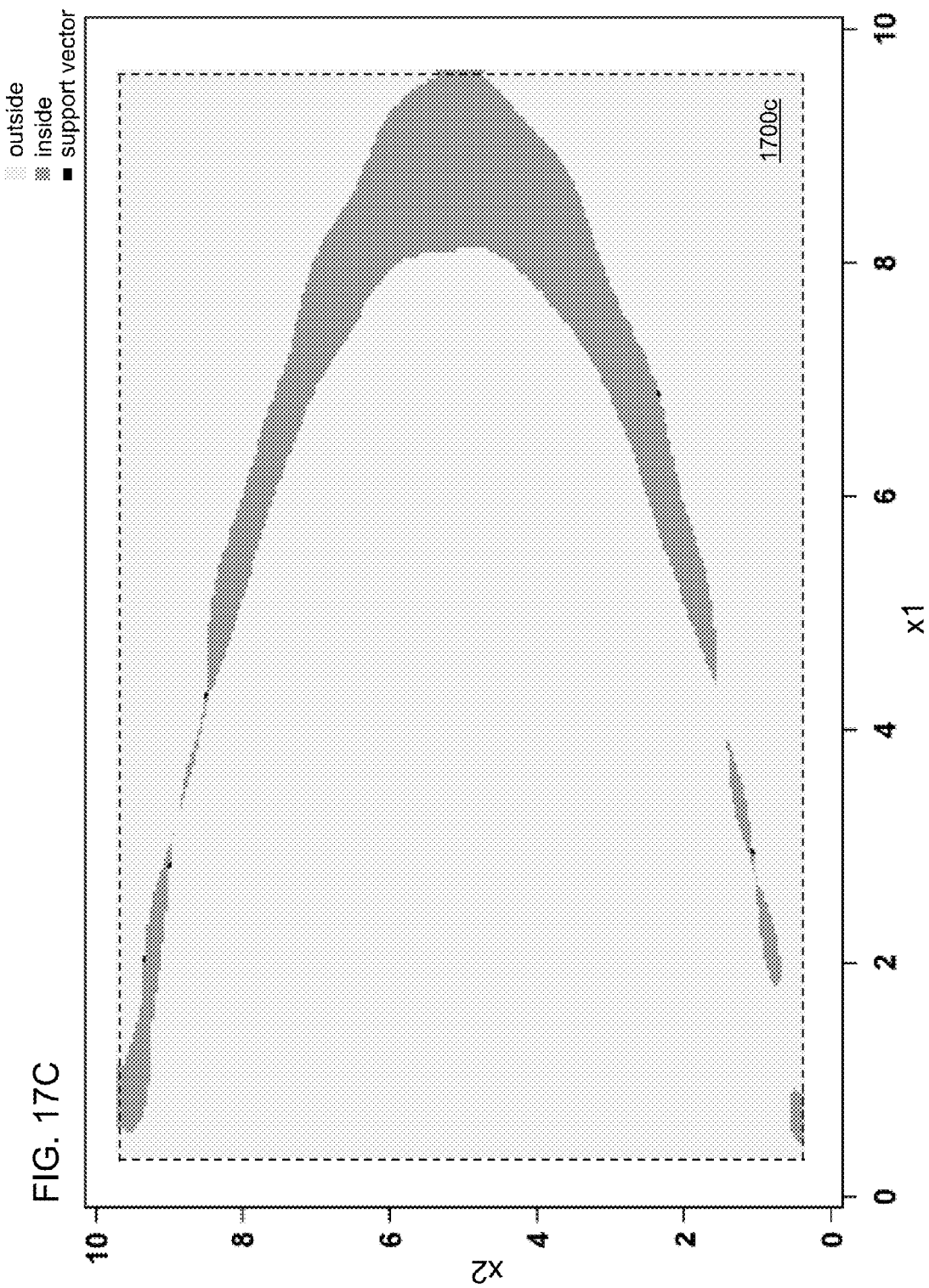

US 9,639,809 B1

MONITORING SYSTEM BASED ON A SUPPORT VECTOR DATA DESCRIPTION

CROSS-REFERENCE TO RELATED APPLICATIONS

The present application claims the benefit of 35 U.S.C. §119(e) to U.S. Provisional Patent Application No. 62/381,624 filed on Aug. 31, 2016, the entire contents of which is hereby incorporated by reference.

The present application is also a continuation-in-part of U.S. patent application Ser. No. 15/185,277 that was filed Jun. 17, 2016, the entire contents of which are hereby incorporated by reference. The present application also claims the benefit of 35 U.S.C. §119(e) to U.S. Provisional Patent Application No. 62/331,084 filed on May 3, 2016, the entire contents of which are hereby incorporated by reference.

The present application is also a continuation-in-part of U.S. patent application Ser. No. 15/096,552 that was filed Apr. 12, 2016, the entire contents of which are hereby incorporated by reference. The present application also claims the benefit of 35 U.S.C. §119(e) to U.S. Provisional Patent Application No. 62/293,494 filed on Feb. 10, 2016, the entire contents of which are hereby incorporated by reference.

BACKGROUND

Support vector data description (SVDD) is a machine-learning technique used for single class classification and outlier detection. SVDD formulation with a kernel function provides a flexible data description around data. The value of kernel function parameters affects the nature of the data boundary.

The SVDD of a dataset is obtained by solving a quadratic programming problem. The time required to solve the quadratic programming problem is directly related to the number of observations in the training dataset resulting in a very high computing time for large training datasets.

SUMMARY

In an example embodiment, a non-transitory computer-readable medium is provided having stored thereon computer-readable instructions that, when executed by a computing device, cause the computing device to determine a support vector data description for outlier identification. A set of support vectors, a Lagrange constant for each support vector of the set of support vectors, a center threshold value, an upper control limit value, and a lower control limit value are received that defines a normal operating condition of a system. The center threshold value, the upper control limit value, and the lower control limit value are computed from the set of support vectors and the plurality of Lagrange constants. A first plurality of observation vectors is received. A number of the first plurality of observation vectors is a predefined window length. A window threshold value and a window center vector are computed by solving an objective function defined for a support vector data description (SVDD) model using the received first plurality of observation vectors. A window distance value is computed between the window center vector and the set of support vectors using the set of support vectors and the plurality of Lagrange constants. When the computed distance value is greater than the center threshold value, the first plurality of observation vectors is identified as an outlier relative to the normal operating condition of the system. When the computed window threshold value is greater than the upper control limit value, the first plurality of observation vectors is identified as the outlier relative to the normal operating condition of the system. When the computed window threshold value is less than the lower control limit value, the first plurality of observation vectors is identified as the outlier relative to the normal operating condition of the system. When the first plurality of observation vectors are identified as the outlier, an alert is output.

In another example embodiment, a computing device is provided. The system includes, but is not limited to, a processor and a non-transitory computer-readable medium operably coupled to the processor. The computer-readable medium has instructions stored thereon that, when executed by the computing device, cause the computing device to determine a support vector data description for outlier identification.

In yet another example embodiment, a method of determining a support vector data description for outlier identification is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 17A to 17E depict SVDD scoring results using the Gaussian kernel function, different Gaussian bandwidth parameter values, and the first sample dataset of FIG. 16 in accordance with an illustrative embodiment.

DETAILED DESCRIPTION

Figure 1:
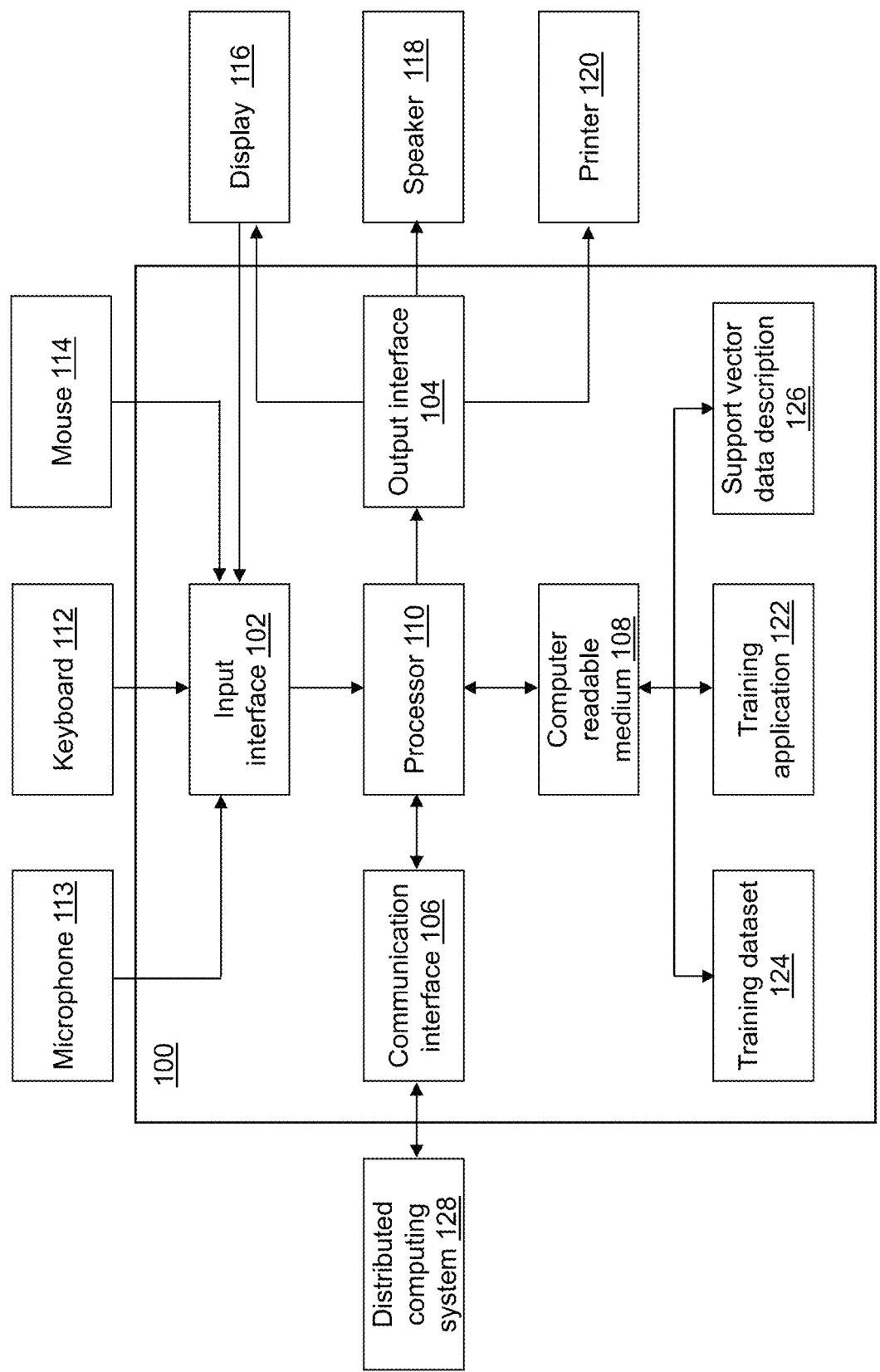
FIG. 1 depicts a block diagram of a support vector data description (SVDD) training device in accordance with an illustrative embodiment.

Referring to FIG. 1, a block diagram of a support vector data description (SVDD) training device 100 is shown in accordance with an illustrative embodiment. SVDD training device 100 may include an input interface 102, an output interface 104, a communication interface 106, a non-transitory computer-readable medium 108, a processor 110, a training application 122, a training dataset 124, and a support vector data description (SVDD) 126. Fewer, different, and/or additional components may be incorporated into SVDD training device 100.

Input interface 102 provides an interface for receiving information from the user or another device for entry into SVDD training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into SVDD training device 100 or to make selections presented in a user interface displayed on display 116. The same interface may support both input interface 102 and output interface 104. For example, display 116 comprising a touch screen provides a mechanism for user input and for presentation of output to the user. SVDD training device 100 may have one or more input interfaces that use the same or a different input interface technology. The input interface technology further may be accessible by SVDD training device 100 through communication interface 106.

Output interface 104 provides an interface for outputting information for review by a user of SVDD training device 100 and/or for use by another application or device. For example, output interface 104 may interface with various output technologies including, but not limited to, display 116, a speaker 118, a printer 120, etc. SVDD training device 100 may have one or more output interfaces that use the same or a different output interface technology. The output interface technology further may be accessible by SVDD training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. SVDD training device 100 may have one or more communication interfaces that use the same or a different communication interface technology. For example, SVDD training device 100 may support communication using an Ethernet port, a Bluetooth antenna, a telephone jack, a USB port, etc. Data and messages may be transferred between SVDD training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. SVDD training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. SVDD training device 100 also may have one or more drives that support the loading of a memory media such as a CD, DVD, an external hard drive, etc. One or more external hard drives further may be connected to SVDD training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. SVDD training device 100 may include a plurality of processors that use the same or a different processing technology.

Training application 122 performs operations associated with defining SVDD 126 from data stored in training dataset 124. SVDD 126 may be used to classify data stored in a dataset 2524 (shown referring to FIG. 25) and to monitor changes in data in the dataset that may be stored in an output dataset 2526 (shown referring to FIG. 25) to support various data analysis functions as well as provide alert/messaging related to the monitored data. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. For example, training application 122 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, training application 122 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Data mining is applicable in a wide variety of industries.

Training application 122 may be integrated with other system processing tools to automatically process data generated as part of operation of an enterprise, device, system, facility, etc., to identify any outliers in the processed data, to monitor changes in the data, and to provide a warning or alert associated with the monitored data using input interface 102, output interface 104, and/or communication interface 106 so that appropriate action can be initiated in response to changes in the monitored data.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Training dataset 124 may be transposed. Training dataset 124 may include unsupervised data. The plurality of variables may define multiple dimensions for each observation vector. An observation vector $x_i$ may include a value for each of the plurality of variables associated with the observation i. Each variable of the plurality of variables describes a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 124 may be stored on computer-readable medium 108 or on one or more computer-readable media of distributed computing system 128 and accessed by SVDD training device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observations per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various structures as known to those skilled in the art including one or more files of a file system, a relational database, one or more tables of a system of tables, a structured query language database, etc. on SVDD training device 100 or on distributed computing system 128. SVDD training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. Some systems may use SAS In-Memory Statistics for Hadoop® to read big data once and analyze it several times by persisting it in-memory for the entire session. Some systems may be of other types and configurations.

An SVDD model is used in domains where a majority of data in training dataset 124 belongs to a single class. An SVDD model for normal data description builds a minimum radius hypersphere around the data. The objective function for the SVDD model for normal data description is $$\max(\Sigma_{i=1}^{n}\alpha_i(x_i \cdot x_i) - \Sigma_{i=1}^{n}\Sigma_{j=1}^{n}\alpha_i\alpha_j(x_i \cdot x_j)), \quad (1)$$

subject to:

$$\Sigma_{i=1}^{n}\alpha_i = 1 \quad (2)$$

$$0 \leq \alpha_i \leq C, \forall i=1,\ldots,n, \quad (3)$$

where $x_i \in \mathbb{R}^m$, $i=1, \ldots, n$ represents n observations in training dataset 124, $\alpha_i \in \mathbb{R}$ are Lagrange constants, $C=1/nf$ is a penalty constant that controls a trade-off between a volume and errors, and f is an expected outlier fraction. The expected outlier fraction is generally known to an analyst. Data preprocessing can ensure that training dataset 124 belongs to a single class. In this case, f can be set to a very low value such as 0.001. SV is the set of support vectors that includes the observation vectors in training dataset 124 that have $C \geq \alpha_i \geq 0$ after solving equation (1) above. $SV_{<C}$ is a subset of the support vectors that includes the observation vectors in training dataset 124 that have $C > \alpha_i > 0$ after solving equation (1) above. The $SV_{<C}$ is a subset of the support vectors are located on a boundary of the minimum radius hypersphere defined around the data.

Depending upon a position of an observation vector, the following results are true:

$$\text{Center position: } \Sigma_{i=1}^{n}\alpha_i x_i = a. \quad (4)$$

$$\text{Inside position: } \|x_i - a\| < R \to \alpha_i = 0. \quad (5)$$

$$\text{Data description position: } \|x_i - a\| = R \to 0 < \alpha_i < C. \quad (6)$$

$$\text{Outside position: } \|x_i - a\| > R \to \alpha_i = C. \quad (7)$$

where a is a center of the hypersphere and R is a radius of the hypersphere. The radius of the hypersphere is calculated using:

$$R^2 = x_k \cdot x_k - 2\Sigma_{i=1}^{NSV}\alpha_i(x_i \cdot x_k) + \Sigma_{i=1}^{NSV}\Sigma_{j=1}^{NSV}\alpha_i\beta_j(x_i \cdot x_j) \quad (8)$$

where any $x_k \in SV_{<C}$, $x_i$ and $x_j$ are the support vectors, $\alpha_i$ and $\alpha_j$ are the Lagrange constants of the associated support vector, and $N_{SV}$ is a number of the support vectors included in the set of support vectors. An observation z is indicated as an outlier when $\text{dist}^2(z) > R^2$, where $$\text{dist}^2(z) = (z \cdot z) - 2\Sigma_{i=1}^{NSV}\alpha_i(x_i \cdot z) + \Sigma_{i=1}^{NSV}\Sigma_{j=1}^{NSV}\alpha_i\alpha_j(x_i \cdot x_j) \quad (9)$$

and z is the observation vector.

Figure 2:
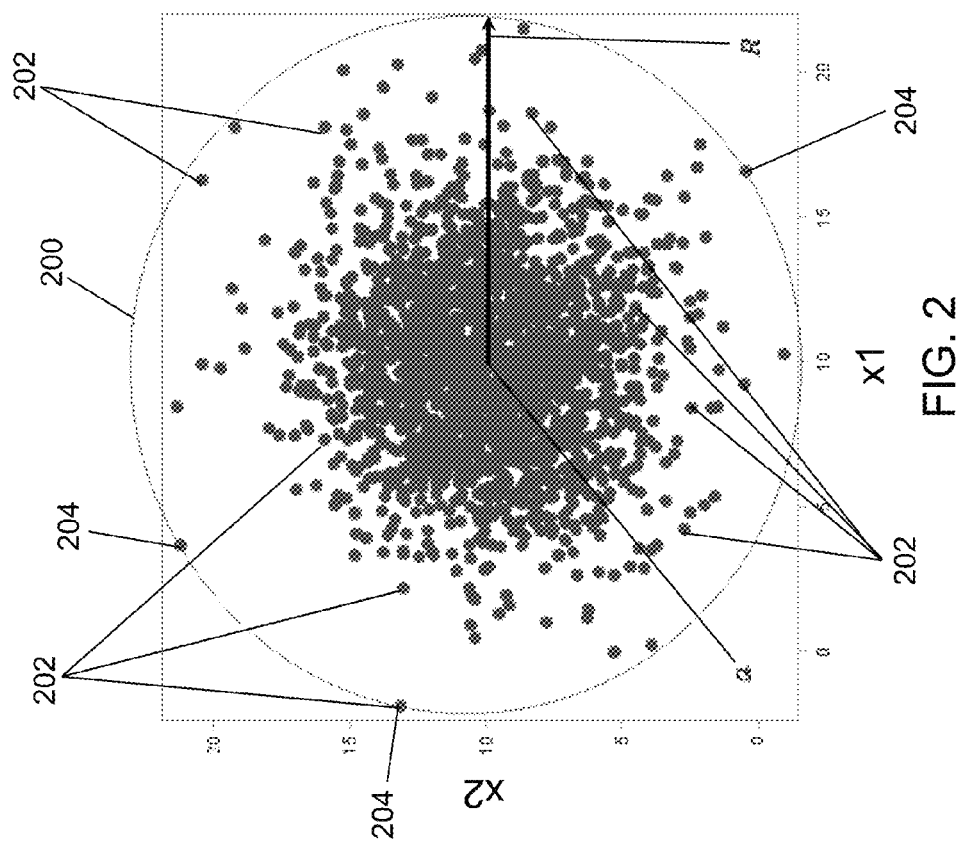
FIG. 2 depicts an SVDD result defining a normal data description in accordance with an illustrative embodiment.

Referring to FIG. 2, an SVDD is illustrated in accordance with an illustrative embodiment that defines a boundary 200 having a radius R from a center a. Boundary 200 is characterized by observation vectors 202 (shown as data points on the graph), which are the set of support vectors SV. For illustration, observation vectors 202 are defined by values of variables x1 and x2 though observation vectors 202 may include a greater number of variables. The $SV_{<C}$ 204 are the subset of support vectors SV on boundary 200.

Normal data description 200 can include a significant amount of space with a very sparse distribution of training observations. Scoring with this model can increase the probability of false positives. Hence, instead of a circular shape, a compact bounded outline around the data that approximates a shape of data in training dataset 124 may be preferred. This is possible using a kernel function. The SVDD is made flexible by replacing the inner product $(x_i \cdot x_j)$ with a suitable kernel function $K(x_i, x_j)$. A Gaussian kernel function is described herein, though this is not intended to be limiting. For example, any exponential function or polynomial function may be used. The Gaussian kernel function may be defined as:

$$K(x_i, x_j) = \exp\frac{-\|x_i - x_j\|^2}{2s^2} \quad (10)$$

where s is a kernel parameter that is termed a Gaussian bandwidth parameter.

The objective function for the SVDD model with the Gaussian kernel function is $$\max(\Sigma_{i=1}^n \alpha_i K(x_i, x_i) - \Sigma_{i=1}^n \Sigma_{j=1}^n \alpha_i \alpha_j K(x_i, x_j)), \quad (11)$$

subject to:

$$\Sigma_{i=1}^n \alpha_i = 1, \quad (12)$$

$$0 \leq \alpha_i \leq C, \forall i=1,\ldots,n \quad (13)$$

where again SV is the set of support vectors that includes the observation vectors in training dataset 124 that have $C \geq \alpha_i > 0$ after solving equation (1) above. $SV_{<C}$ is the subset of the support vectors that includes the observation vectors in training dataset 124 that have $C > \alpha_i > 0$ after solving equation (1) above.

The results from equations (4) to (7) above remain valid. A threshold R is computed using:

$$R^2 = K(x_k, x_k) - 2\Sigma_{i=1}^{N_{SV}} \alpha_i K(x_i, x_k) + \Sigma_{i=1}^{N_{SV}} \Sigma_{j=1}^{N_{SV}} \alpha_i \alpha_j K(x_i, x_j) \quad (14)$$

where any $x_k \in SV_{<C}$, where $x_i$ and $x_j$ are the support vectors, $\alpha_i$ and $\alpha_j$ are the Lagrange constants of the associated support vector, and $N_{SV}$ is a number of the support vectors included in the set of support vectors.

An observation vector z is indicated as an outlier when $dist^2(z) > R^2$, where $$dist^2(z) = K(z,z) - 2\Sigma_{i=1}^{N_{SV}} \alpha_i K(x_i, z) + \Sigma_{i=1}^{N_{SV}} \Sigma_{j=1}^{N_{SV}} \alpha_i \alpha_j K(x_i, x_j). \quad (15)$$

$\Sigma_{i=1}^{N_{SV}} \Sigma_{j=1}^{N_{SV}} \alpha_i \alpha_j K(x_i, x_j)$ is a constant that can be denoted as W and that can be determined from the set of support vectors. $R^2$ is a threshold determined using the set of support vectors. For a Gaussian kernel function, $K(z,z)=1$. Thus, equation (14) can be simplified to $dist^2(z) = 1 - 2 \Sigma_{i=1}^{N_{SV}} \alpha_i K(x_i, z) + W$ for a Gaussian kernel function.

Figure 3:
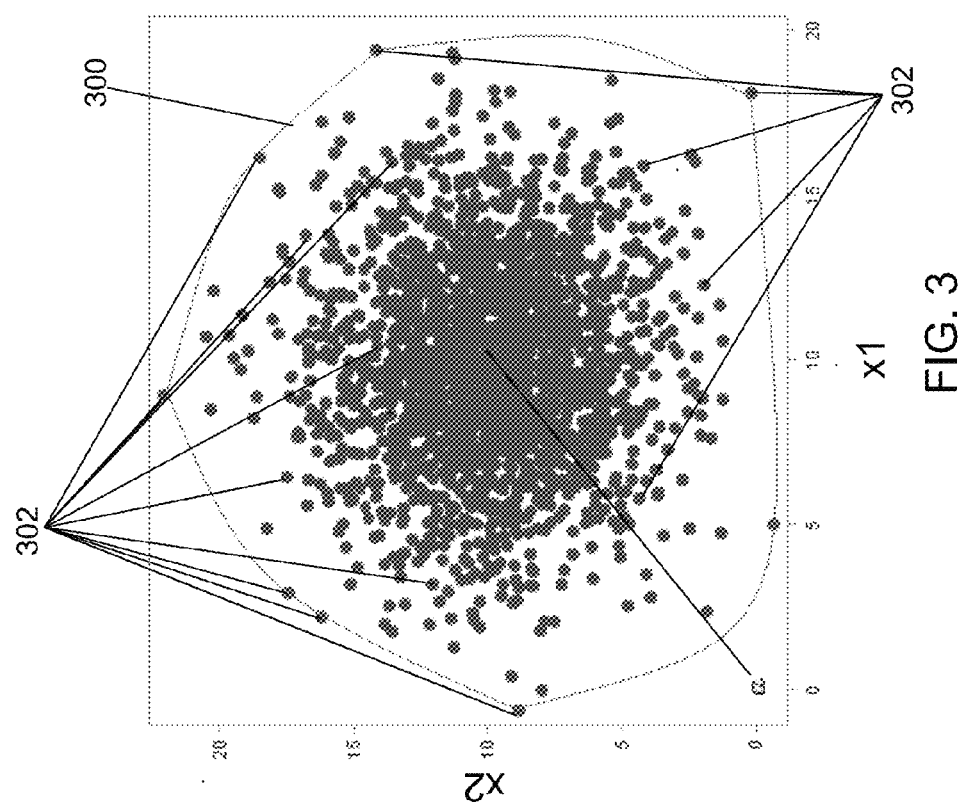
FIG. 3 depicts an SVDD result defining a flexible data description using a Gaussian kernel function in accordance with an illustrative embodiment.

Referring to FIG. 3, a SVDD is shown in accordance with an illustrative embodiment that defines a flexible boundary 300. The SVDD is characterized by support vectors 302, which are the set of support vectors SV. The $SV_{<C}$ are the subset of support vectors SV shown on flexible boundary 300.

Figure 4A:
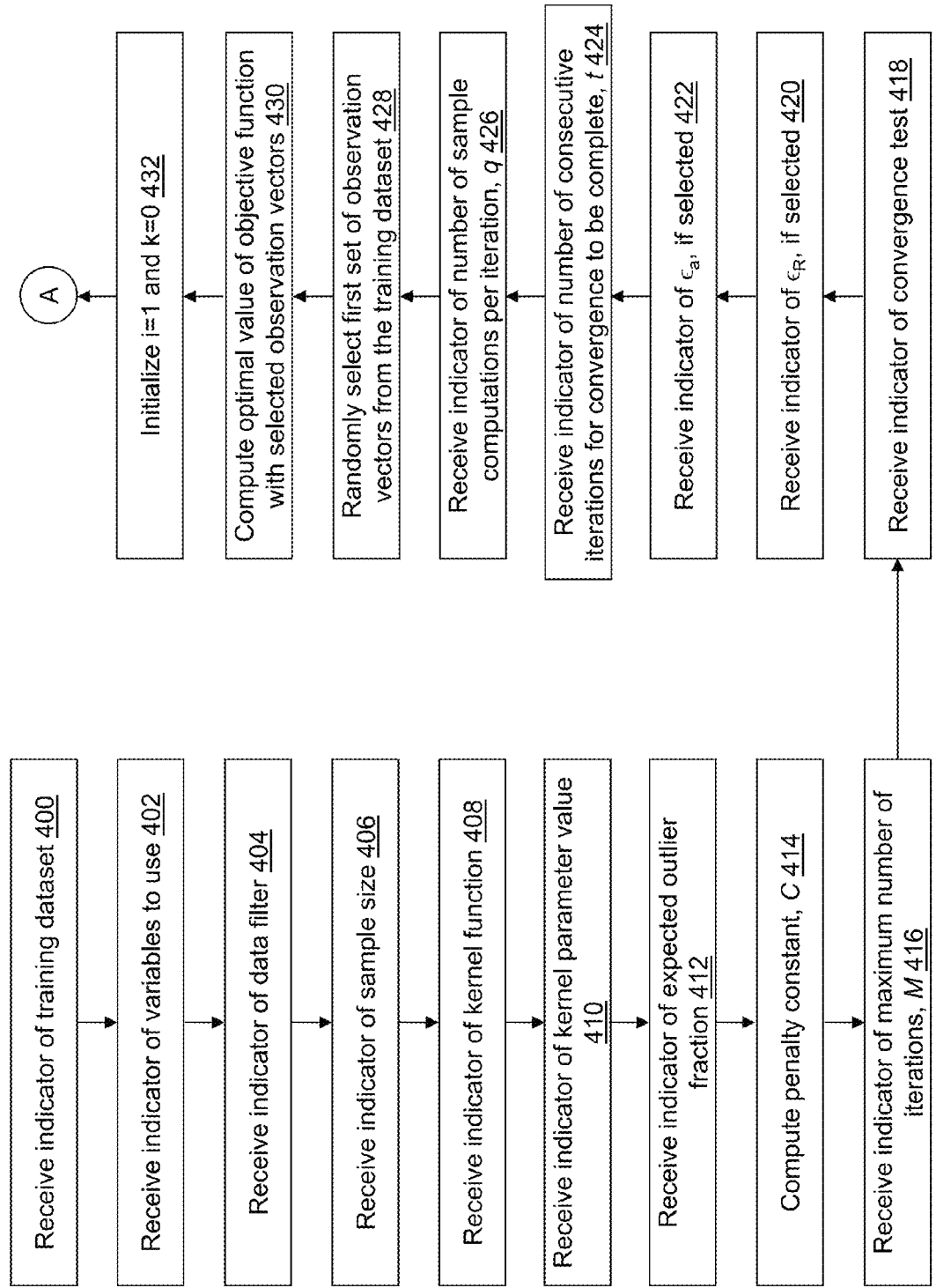
FIGS. 4A, 4B, and 4C depict a flow diagram illustrating examples of operations performed by the SVDD training device of FIG. 1 in accordance with an illustrative embodiment.
Figure 4B:
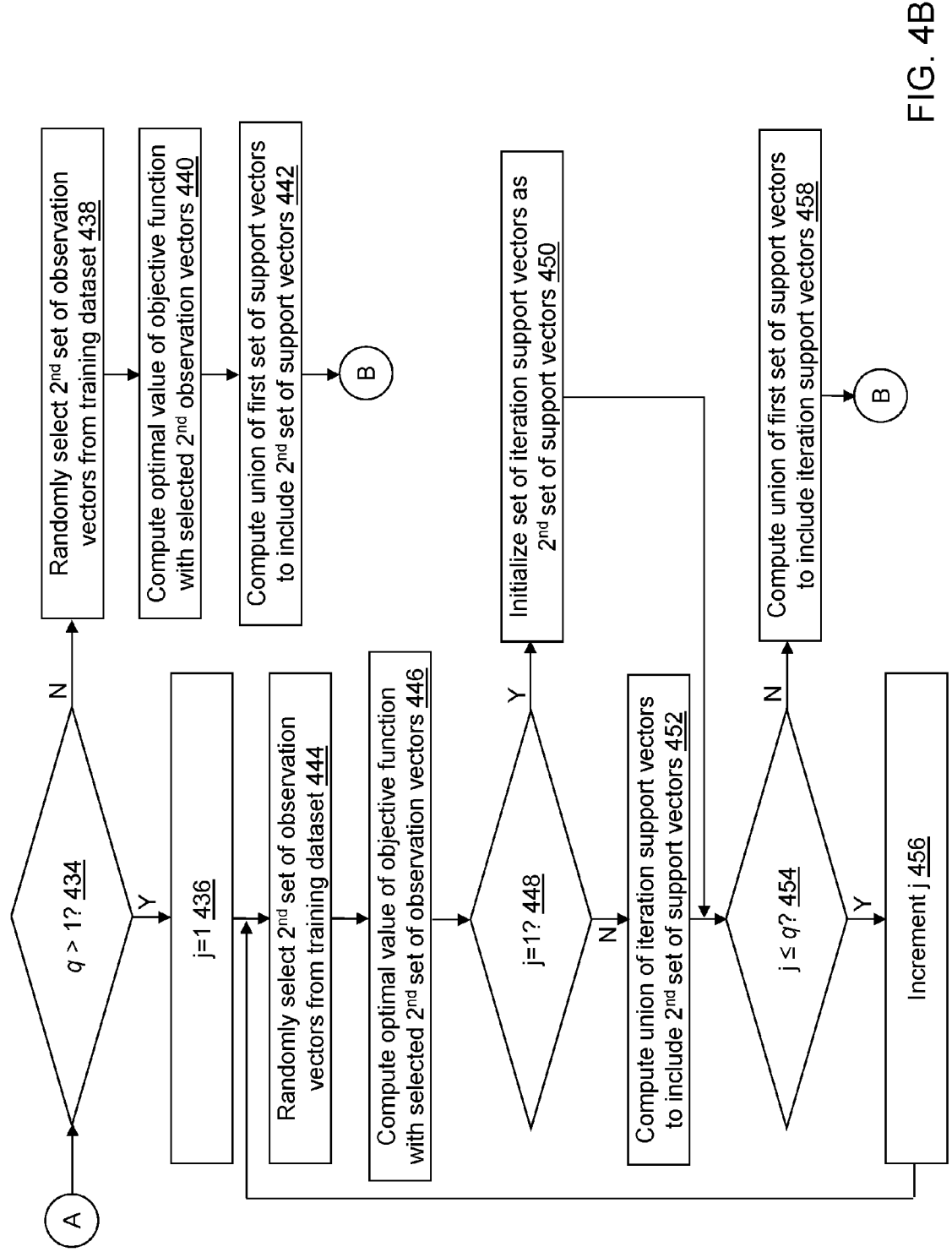
Figure 4C:
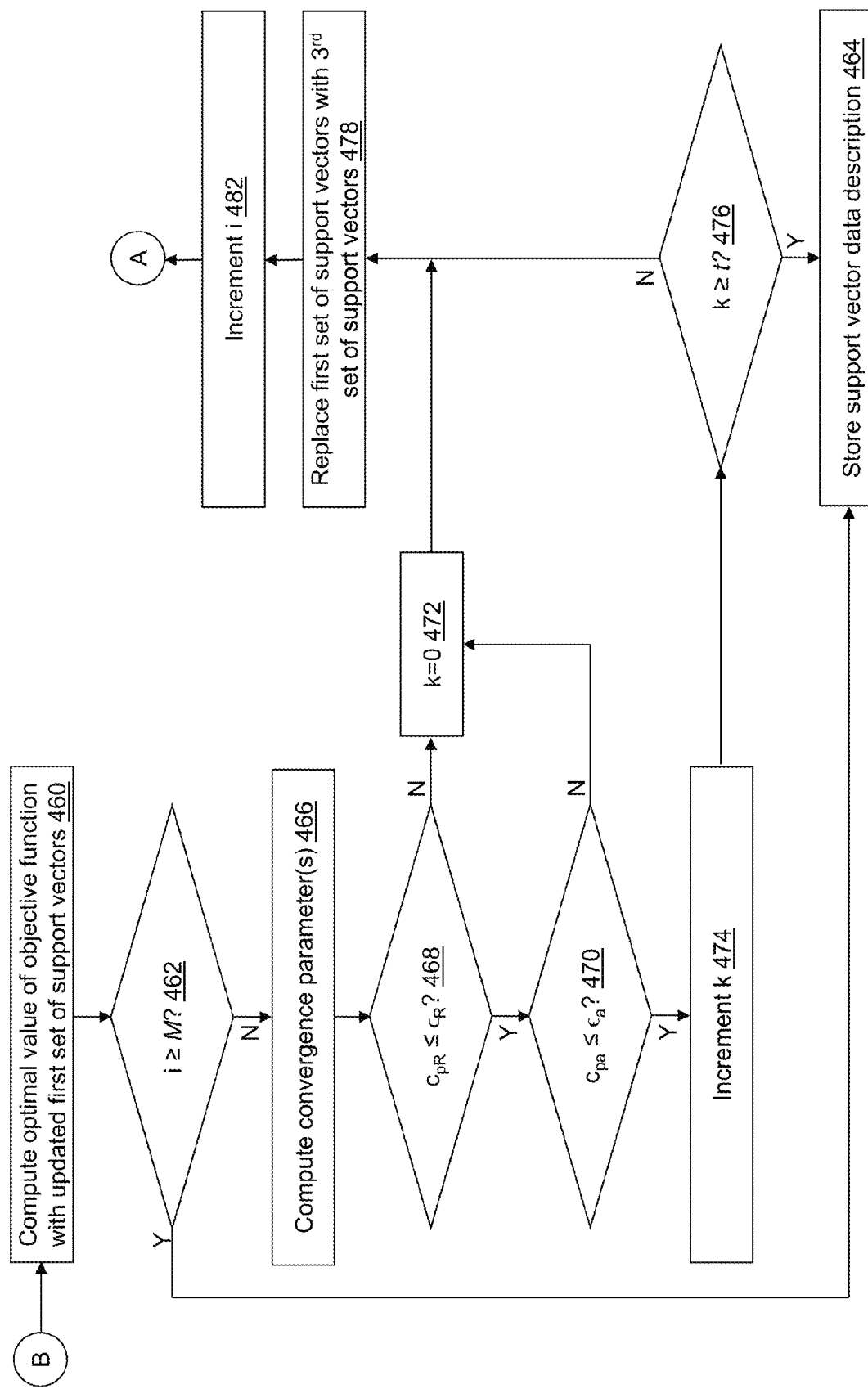

Referring to FIGS. 4A, 4B, and 4C, example operations associated with training application 122 are described. For example, training application 122 may be used to create SVDD 126 from training dataset 124. Instead of using all observations from training dataset 124, training application 122 computes SVDD 126 by iteratively computing an SVDD on independent random samples obtained from training dataset 124 and combining them. Training application 122 has been shown to work well even when the random samples have only a few observations.

Additional, fewer, or different operations may be performed depending on the embodiment of training application 122. The order of presentation of the operations of FIGS. 4A, 4B, and 4C is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute training application 122, which causes presentation of a first user interface window, which may include a plurality of menus and selectors such as drop down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Referring to FIG. 4A, in an operation 400, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically.

In an operation 402, a second indicator may be received that indicates a plurality of variables of training dataset 124 to define $x_i$. The second indicator may indicate that all or only a subset of the variables stored in training dataset 124 be used to define SVDD 126. For example, the second indicator indicates a list of variables to use by name, column number, etc. In an alternative embodiment, the second indicator may not be received. For example, all of the variables may be used automatically.

In an operation 404, a third indicator is received that indicates a data filter for a plurality of observations of training dataset 124. The third indicator may indicate one or more rules associated with selection of an observation from the plurality of observations of training dataset 124. In an alternative embodiment, the third indicator may not be received. For example, no filtering of the plurality of observations may be applied. As an example, data may be captured for a vibration level of a washing machine. A washing machine mode, such as "fill", "wash", "spin", etc. may be captured. Because a "normal" vibration level may be different dependent on the washing machine mode, a subset of data may be selected for a specific washing machine mode setting based on a value in a column of training dataset 124 that defines the washing machine mode. For example, SVDD models may be defined for different modes of the machine such that the data filter identifies a column indicating the washing machine mode and which value(s) is(are) used to define the SVDD model.

In an operation 406, a fourth indicator may be received that indicates a sample size $N_s$, where $n=N_s$. The fourth indicator indicates a number of observations to use from training dataset 124, a percentage of observations to use from training dataset 124, etc. The sample having the sample size $N_s$ may be selected from the filtered plurality of observations. $N_s$ may be very small. For illustration, $N_s$ may be between 3 and 20 for a training dataset that includes greater than 15,000 observations for a dataset with two variables. $N_s$ observations may be created from training dataset 124 by sampling. An example sampling algorithm is uniform sampling though other random sampling algorithms may be used. For illustration, the sample size $N_s$ may be selected to be any value greater than a number of the plurality of variables of training dataset 124 to define $x_i$ indicated in operation 402. In an alternative embodiment, the fourth indicator may not be received. For example, a default value may be stored, for example, in computer-readable medium 108 and used automatically. In another alternative embodiment, the value of the sample size $N_s$ may not be selectable. Instead, a fixed, predefined value may be used.

In an operation 408, a fifth indicator of a kernel function to apply may be received. For example, the fifth indicator indicates a name of a kernel function. The fifth indicator may be received by training application 122 after selection from a user interface window or after entry by a user into a user interface window. A default value for the kernel function may further be stored, for example, in computer-readable medium 108. As an example, a kernel function may be selected from "Gaussian", "Exponential", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in training application 122. For example, the Gaussian kernel function may be used by default or without allowing a selection.

In an operation 410, a sixth indicator of a kernel parameter value to use with the kernel function may be received. For example, a value for s, the Gaussian bandwidth parameter, may be received for the Gaussian kernel function. In an alternative embodiment, the sixth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used. As discussed further below relative to FIGS. 19 and 20, the kernel parameter value may be incrementally selected for evaluation from a range of kernel parameter values.

In an operation 412, a seventh indicator of a value of the expected outlier fraction f may be received. In an alternative embodiment, the seventh indicator may not be received. For example, a default value may be stored, for example, in computer-readable medium 108 and used automatically. In another alternative embodiment, the value of the expected outlier fraction f may not be selectable. Instead, a fixed, predefined value may be used.

In an operation 414, a value of the penalty constant $C=1/N_s f$ may be computed from $N_s$ and f.

In an operation 416, an eighth indicator of a value of a maximum number of iterations M may be received. In an alternative embodiment, the eighth indicator may not be received. For example, a default value may be stored, for example, in computer-readable medium 108 and used automatically or the maximum number of iterations M may not be used. In another alternative embodiment, the value of the maximum number of iterations M may not be selectable. Instead, a fixed, predefined value may be used. The maximum number of iterations M may be identified as a first stop criterion. The maximum number of iterations M may be selected to stop execution when convergence is not being reached. Merely for illustration, the maximum number of iterations M may be set between 10 and 1000 though the user may determine that other values are more suitable for their application as understood by a person of skill in the art, for example, on the accuracy desired, computing resources available, etc.

In an operation 418, a ninth indicator of a convergence test may be received. For example, the ninth indicator indicates a name of a convergence test. The ninth indicator may be received by training application 122 after selection from a user interface window or after entry by a user into a user interface window. A default value for the convergence test may further be stored, for example, in computer-readable medium 108. As an example, a convergence test may be selected from "Max Iterations", "$R^2$ only", "a only", "$R^2$ and a", etc. For example, a default convergence test may be "$R^2$ and a" as discussed further below. Of course, the convergence test may be labeled or selected in a variety of different manners by the user as understood by a person of skill in the art. In an alternative embodiment, the convergence test may not be selectable, and a single convergence test is implemented by training application 122. For example, the convergence test "$R^2$ and a" as discussed further below may be used by default or without allowing a selection.

In an operation 420, a tenth indicator of a value of a distance tolerance value $\in_R$ may be received if the convergence test selected includes an evaluation of changes in value of the threshold $R^2$ from iteration to iteration. In an alternative embodiment, the tenth indicator may not be received. For example, a default value may be stored, for example, in computer-readable medium 108 and used automatically or the distance tolerance value $\in_R$ may not be used. In another alternative embodiment, the value of the distance tolerance parameter may not be selectable. Instead, a fixed, predefined value may be used. The distance tolerance parameter $\in_R$ may be identified as a second stop criterion.

In an operation 422, an eleventh indicator of a value of a center tolerance value $\in_a$ may be received if the convergence test selected includes an evaluation of changes in a center a from iteration to iteration. In an alternative embodiment, the eleventh indicator may not be received. For example, a default value may be stored, for example, in computer-readable medium 108 and used automatically or the center tolerance parameter $\in_a$ may not be used. In another alternative embodiment, the value of the center tolerance parameter may not be selectable. Instead, a fixed, predefined value may be used. The center tolerance parameter $\in_a$ may be identified as a third stop criterion. Values for the tolerance parameters $\in_R$ and/or $\in_a$ may be selected to achieve a representational quality of training dataset 124 by SVDD 126.

In an operation 424, a twelfth indicator of a value of a number of consecutive iterations for convergence to be complete t may be received. In an alternative embodiment, the twelfth indicator may not be received. For example, a default value may be stored, for example, in computer-readable medium 108 and used automatically or the number of consecutive iterations for convergence to be complete t may not be used. In another alternative embodiment, the value of the number of consecutive iterations for convergence to be complete may not be selectable. Instead, a fixed, predefined value may be used. Use of the number of consecutive iterations for convergence to be complete avoids convergence to a local extrema by requiring that the stop criterion be satisfied for a consecutive number of iterations. Merely for illustration, the number of consecutive iterations for convergence to be complete t may be set between 1 and 10 though the user may determine that other values are more suitable for their application. The number of consecutive iterations for convergence to be complete t set to a value of 5 has been used to achieve quality results for SVDD 126.

In an operation 426, a thirteenth indicator of a value of a number of sample computations per iteration q may be received. In an alternative embodiment, the thirteenth indicator may not be received. For example, a default value may be stored, for example, in computer-readable medium 108 and used automatically or the number of sample computations per iteration q may not be used. In another alternative embodiment, the value of the number of sample computations per iteration may not be selectable. Instead, a fixed, predefined value may be used. Merely for illustration, the number of sample computations per iteration q may be set between 1 and 5 though the user may determine that other values are more suitable for their application. The sample computations per iteration q set to a value of 2 or 3 has been used to achieve quality results for SVDD 126.

In an operation 428, a first set of observation vectors $x_i$ are randomly selected from training dataset 124, for example, using uniform random sampling to select the sample size $N_s$ number of observations. The first set of observation vectors $x_i$ further may be selected that satisfy the data filter defined in operation 404. Each observation vector $x_i$ includes values for each of the plurality of variables indicated in operation 402.

In an operation 430, an optimal value for the objective function is computed by optimizing the objective function using the kernel function defined based on the fourth indicator and the selected first set of observation vectors $x_i$, where $n=N_s$. For example, equations (11)-(13) above are used to solve for SV, a first set of support vectors that have $0<\alpha_i \leq C$. As part of the solving for the optimal solution, values for the computed penalty constant C and/or the kernel parameter value may be used as indicated above. Values for the Lagrange constants $\alpha_i$ for each support vector of the first set of support vectors, for $R^2$ using equation (14), and for the center position a using equation (4) are computed as part of the optimal solution. Alternatively, equations (1)-(4) and (8) may be used without a kernel function or a kernel parameter value. Only the $SV_{<C}$ are needed for the computations of $R^2$, and only the SV are needed for the computations of a, which avoids an additional read of training dataset 124 thereby improving performance.

In an operation 432, iteration counter values i and k may be initialized. For example, i may be initialized to one, and k may be initialized to zero. i may be identified as an iteration counter, and k may be identified as a consecutive convergence counter.

Referring to FIG. 4B, in an operation 434, a determination is made concerning whether or not the number of sample computations per iteration q>1. In an alternative embodiment, the number of sample computations per iteration, q may not be used, in which case, operations 434, 436, and 444-458 are not implemented by training application 122. As another option, the sample computations per iteration may be implemented by training application 122, but not selected for use by the user by setting q≤1 to skip operations 434, 436, and 444-458. When q>1, processing continues in an operation 436. When q≤1, processing continues in an operation 438.

In operation 436, a sampling iteration counter value j may be initialized, and processing continues in an operation 444. For example, j may be initialized to one.

In an operation 438, a second set of observation vectors $x_i$ are randomly selected from training dataset 124, for example, using uniform random sampling to select the sample size $N_s$ number of observations a next time. The second set of observation vectors $x_i$ further may be selected that satisfy the data filter defined in operation 404. Each second observation vector $x_i$ includes values for each of the plurality of variables indicated in operation 402.

In an operation 440, an optimal value for the objective function is computed by optimizing the objective function using the kernel function defined based on the fourth indicator and the selected second set of observation vectors $x_i$, where $n=N_s$. For example, equations (11)-(13) above are used to solve for SV, a second set of support vectors that have $0<\alpha_i \leq C$. Values for the Lagrange constants $\alpha_i$ for each support vector of the second set of support vectors, for $R^2$ using equation (14), and for the center position a using equation (4) are computed as part of the optimal solution. Alternatively, equations (1)-(4) and (8) may be used without a kernel function or a kernel parameter value.

In an operation 442, a union of the first set of support vectors and the second set of support vectors SV computed in operation 440 is computed and the first set of support vectors is updated as the union of the support vectors, and processing continues in an operation 460 shown referring to FIG. 4C. $n=n_1+n_2-n_{Dupl}$ where n is a number of vectors of the updated first set of support vectors, $n_1$ is a number of the first set of support vectors SV, $n_2$ is a number of the second set of support vectors SV, and $n_{Dupl}$ is a number of duplicate support vectors of the first set of support vectors SV and the second set of support vectors SV.

In operation 444, the second set of observation vectors $x_i$ are randomly selected from training dataset 124, for example, using uniform random sampling to select the sample size $N_s$ number of observations a next time. The second set of observation vectors $x_i$ further may be selected that satisfy the data filter defined in operation 404. Each second observation vector $x_i$ includes values for each of the plurality of variables indicated in operation 402.

In an operation 446, an optimal value for the objective function is computed by optimizing the objective function using the kernel function defined based on the fourth indicator and the selected second set of observation vectors $x_i$, where $n=N_s$. For example, equations (11)-(14) above are used to solve for SV, a second set of support vectors that have $0<\alpha_i \leq C$. Values for the Lagrange constants $\alpha_i$ for each support vector of the second set of support vectors, for $R^2$ using equation (14), and for the center position a using equation (4) are computed as part of the optimal solution. Alternatively, equations (1)-(4) and (8) may be used without a kernel function or a kernel parameter value.

In an operation 448, a determination is made concerning whether or not sampling iteration counter value j=1. When j=1, processing continues in an operation 450. When j≠1, processing continues in an operation 452.

In operation 450, a set of iteration support vectors is initialized with the second set of support vectors SV computed in operation 446, and processing continues in an operation 454.

In operation 452, a union of the set of iteration support vectors and the second set of support vectors SV computed in operation 446 is computed and the set of iteration support vectors is updated as the union of the support vectors, and processing continues in operation 454.

In operation 454, a determination is made concerning whether or not the number of sample computations per iteration q have been performed by comparing the sampling iteration counter value j to the number of sample computations per iteration q. When j≤q, processing continues in an operation 456. When j>q, processing continues in an operation 458.

In operation 456, the sampling iteration counter value j is incremented by adding one to the current value, and processing continues in operation 444 to process a next sampled set of observation vectors to supplement the set of iteration support vectors.

In operation 458, a union of the first set of support vectors and the set of iteration support vectors is computed and the first set of support vectors is updated as the union of the support vectors, and processing continues in operation 460 shown referring to FIG. 4C. $n=n_1+n_i-n_{Dupl2}$, where n is a number of vectors of the updated first set of support vectors, $n_1$ is a number of the first set of support vectors SV, $n_i$ is a number of the iteration support vectors, and $n_{Dupl2}$ is a number of duplicate support vectors of the first set of support vectors SV and the set of iteration support vectors.

Referring to FIG. 4C, in operation 460, an optimal value for the objective function is computed by optimizing the objective function using the kernel function defined based on the fourth indicator and the updated first set of support vectors from operation 442 or operation 458. For example, equations (11)-(14) above are used to solve for SV, a third set of support vectors that have $0<\alpha_i\leq C$. Values for the Lagrange constants $\alpha_i$ for each support vector of the third set of support vectors, for $R^2$ using equation (14), and for the center position a using equation (4) are computed as part of the optimal solution. Alternatively, equations (1)-(4) and (8) may be used without a kernel function or a kernel parameter value. The penalty constant C=1/nf may be computed for n equal to a number of vectors of the updated first set of support vectors.

In an operation 462, a determination is made concerning whether or not i≥M. In an alternative embodiment, the maximum number of iterations M may not be used, in which case, operation 462 is not implemented by training application 122. When i≥M, processing continues in an operation 464. When i<M, processing continues in an operation 466. i≥M is a first stop condition.

In operation 464, the third set of support vectors, $\alpha_i$ the Lagrange constants for each of the third set of support vectors, the center position a, and/or $R^2$ computed from the third set of support vectors are stored as SVDD 126, and processing is complete for defining SVDD 126. Any other constants associated with the third set of support vectors may be stored. For example, K(z,z)=1 may be stored when the Gaussian kernel function is used and/or $W=\Sigma_{i=1}^{N_{SV}}\Sigma_{j=1}^{N_{SV}}\alpha_i\alpha_jK(x_i,x_j)$ may be stored for use in computing $dist^2(z)$ when scoring is performed as discussed further below where $N_{SV}$ is a number of support vectors of the third set of support vectors.

In operation 466, one or more convergence parameters may be computed as additional stop conditions dependent on the convergence test indicated in operation 418. For example, when "Max Iterations" is indicated, none of operations 466-476 may be performed and no convergence parameters are computed. When "$R^2$" is indicated, operation 470 may be skipped, and only an $R^2$ convergence parameter is computed. When "a" is indicated, operation 468 may be skipped and only an a convergence parameter is computed. When "$R^2$ and a" is indicated, $R^2$ and a convergence parameters are both computed.

The $R^2$ convergence parameter may be computed as $c_{pR}=\|R_j^2-R_{j-1}^2\|/R_{j-1}^2$, where $R_j^2$ is the threshold computed using the third set of support vectors that have $0<\alpha_i<C$ computed in operation 460, and $R_{j-1}^2$ is the threshold computed using the first set of support vectors that have $0<\alpha_i<C$. Prior to computing $c_{pR}$, a value of $R_{j-1}^2$ may be tested to determine if the value is zero. If so, $c_{pR}$ may be set to a very large value.

The a convergence parameter may be computed as $c_{pa}=\|a_j-a_{j-1}\|/\|a_{j-1}\|$, where $a_j=\Sigma_{i=1}^{N_{SVi}}\alpha_ix_i$ is computed using the third set of support vectors as $x_i$, and $a_{j-1}=\Sigma_{i=1}^{N_{SV1}}\alpha_ix_i$ is computed using the first set of support vectors as $x_i$, $N_{SVi}$ is a number of support vectors of the third set of support vectors, and $N_{SV1}$ is a number of support vectors of the first set of support vectors. Prior to computing $c_{pa}$, a value of $a_{j-1}$ may be tested to determine if the value is zero. If so, $c_{pa}$ may be set to a very large value.

In an operation 468, a determination is made concerning whether or not $c_{pR}\leq\in_R$. $c_{pR}\leq\in_R$ is a second stop condition. When $c_{pR}\leq\in_R$, processing continues in an operation 470. When $c_{pR}>\in_R$, processing continues in an operation 472.

In operation 470, a determination is made concerning whether or not $c_{pa}\leq\in_a$. $c_{pa}\leq\in_a$ is a third stop condition. When $c_{pa}\leq\in_a$, processing continues in an operation 474. When $c_{pa}>\in_a$, processing continues in operation 472.

In operation 472, the consecutive convergence counter k is reset to zero to indicate that convergence has not occurred, and processing continues in an operation 478.

In operation 474, the consecutive convergence counter k is incremented by adding one to the current value, and processing continues in an operation 476.

In operation 476, a determination is made concerning whether or not k≥t. When k≥t, processing continues in operation 464 to complete processing because convergence has occurred for the indicated number of consecutive iterations. When k<t, processing continues in operation 478. k≥t is a fourth stop condition.

In operation 478, the first set of support vectors is replaced with the third set of support vectors computed in operation 460.

In an operation 482, the iteration counter i is incremented by adding one to the current value, and processing continues in operation 434 shown referring to FIG. 4B to perform another iteration.

Figure 5:
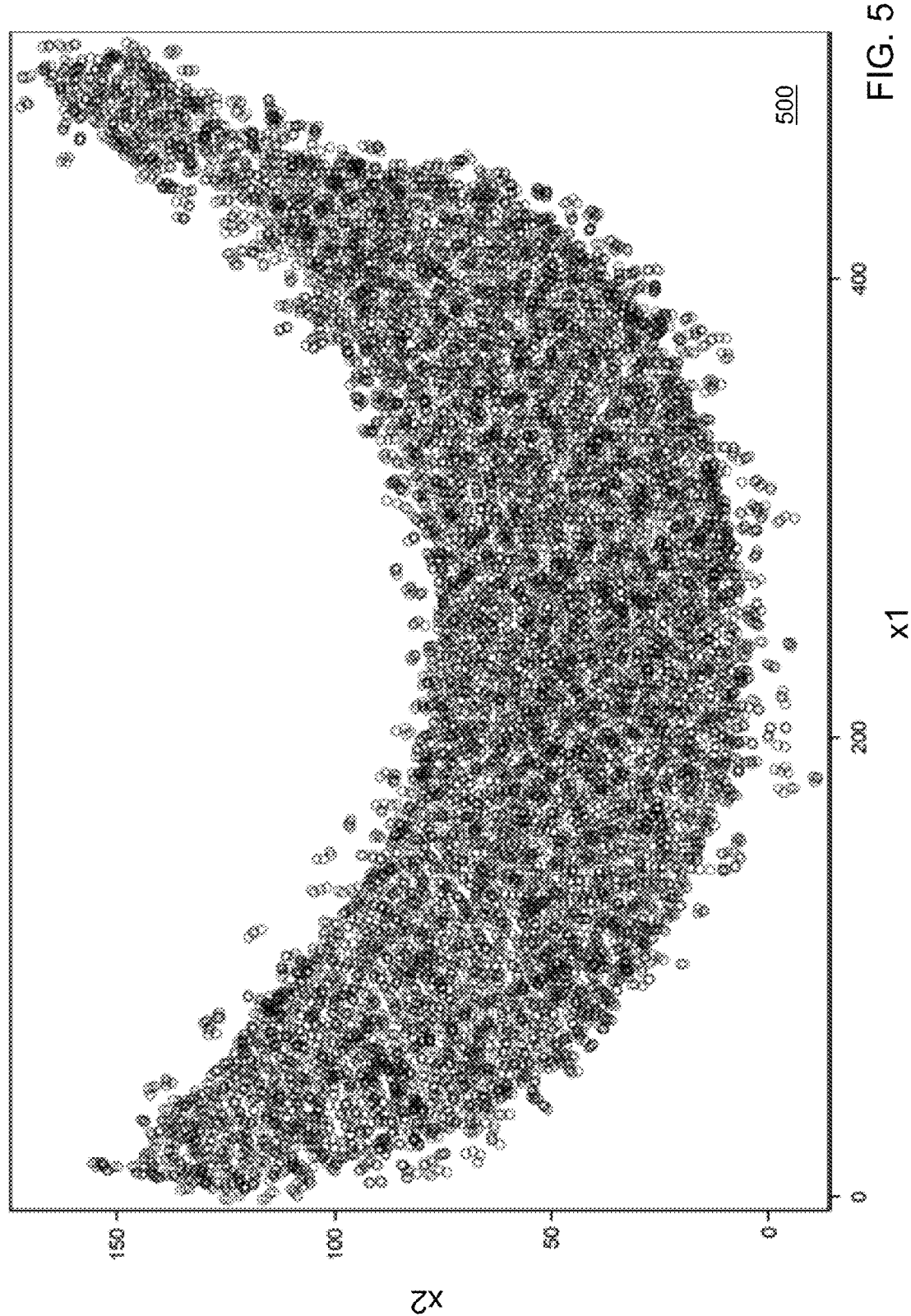
FIG. 5 depicts a first example dataset having a banana shape in accordance with an illustrative embodiment.

Referring to FIG. 5, a first example dataset 500 including a first dimension (variable) x1 and a second dimension (variable) x2 having a banana shape is shown for training dataset 124 in accordance with an illustrative embodiment. First example dataset 500 included 11,016 observations.

Figure 6:
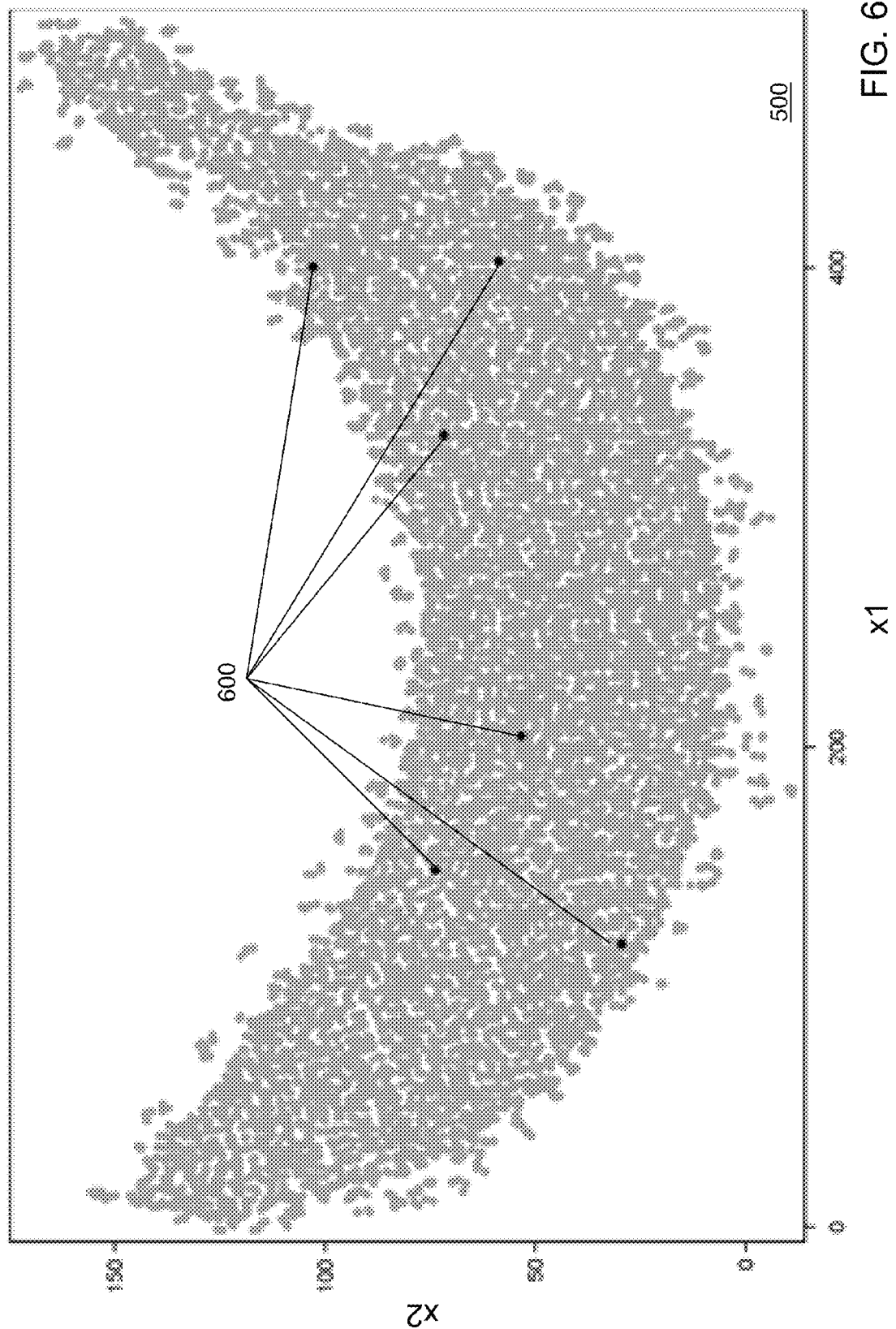
FIGS. 6-12 depict SVDD results using a Gaussian kernel function at different iterations of the operations of FIGS. 4A, 4B, and 4C using the first example dataset of FIG. 5 in accordance with an illustrative embodiment.

FIGS. 6-12 show the development of a final solution for first example dataset 500 using training application 122 and the operations of FIGS. 4A, 4B, and 4C with sample size $N_s$=4. The Gaussian kernel function was used with a value of s=50. The remaining parameters were: $\in_a=\in_R$=1e-5, M=1000, f=0.0001, q=1, and t=10. For example, FIG. 6 shows a first plurality of support vectors 600 that are the third set of support vectors computed in operation 460 for i=1. The first plurality of support vectors 600 are indicated by black dots, and the remaining observations of first example dataset 500 are shown with gray dots. The first plurality of support vectors 600 includes six support vectors.

Figure 7:
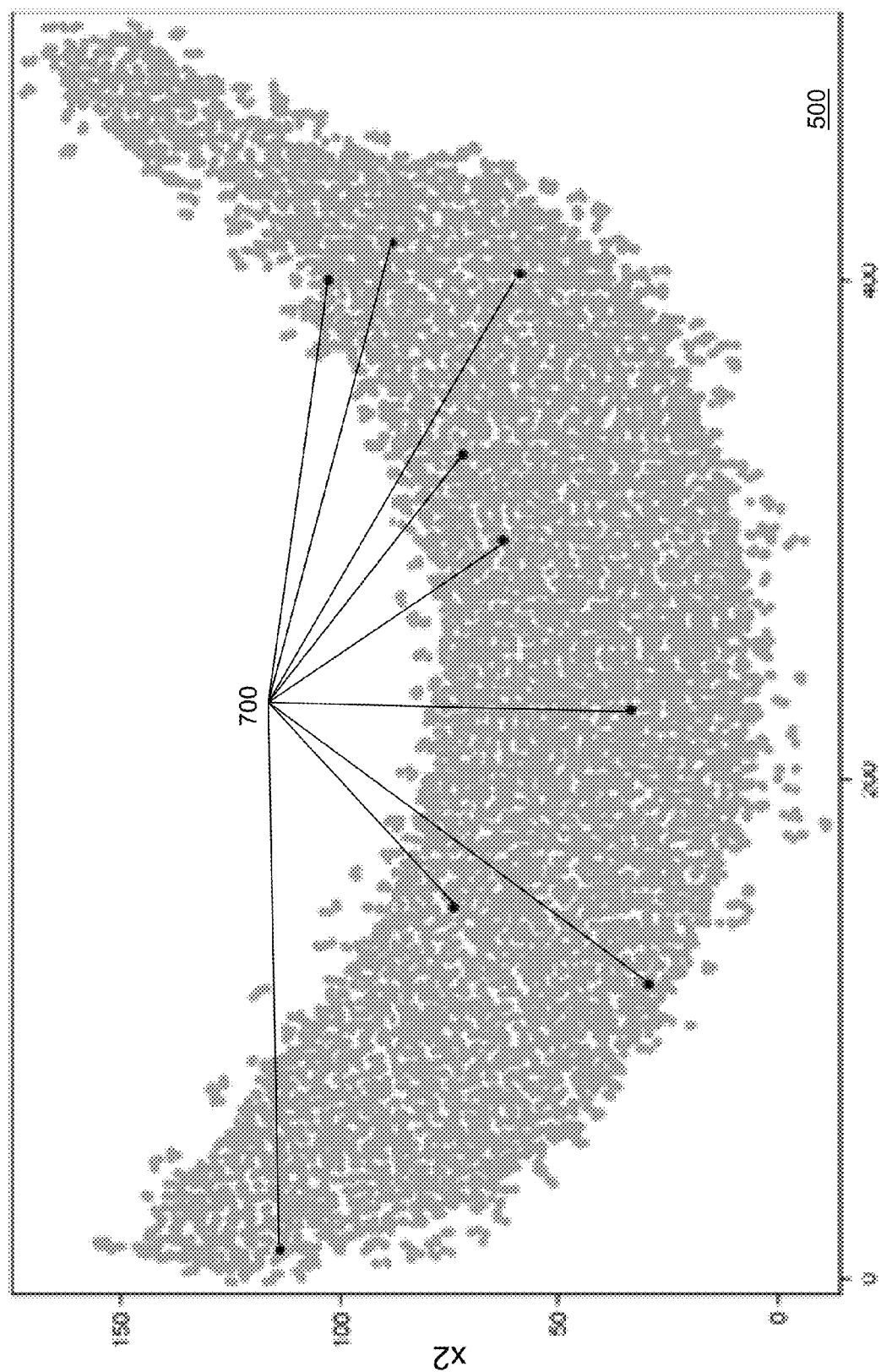

FIG. 7 shows a second plurality of support vectors 700 that are the third set of support vectors computed in operation 460 for i=2. The second plurality of support vectors 700 are again indicated by black dots. The second plurality of support vectors 700 includes nine support vectors.

Figure 8:
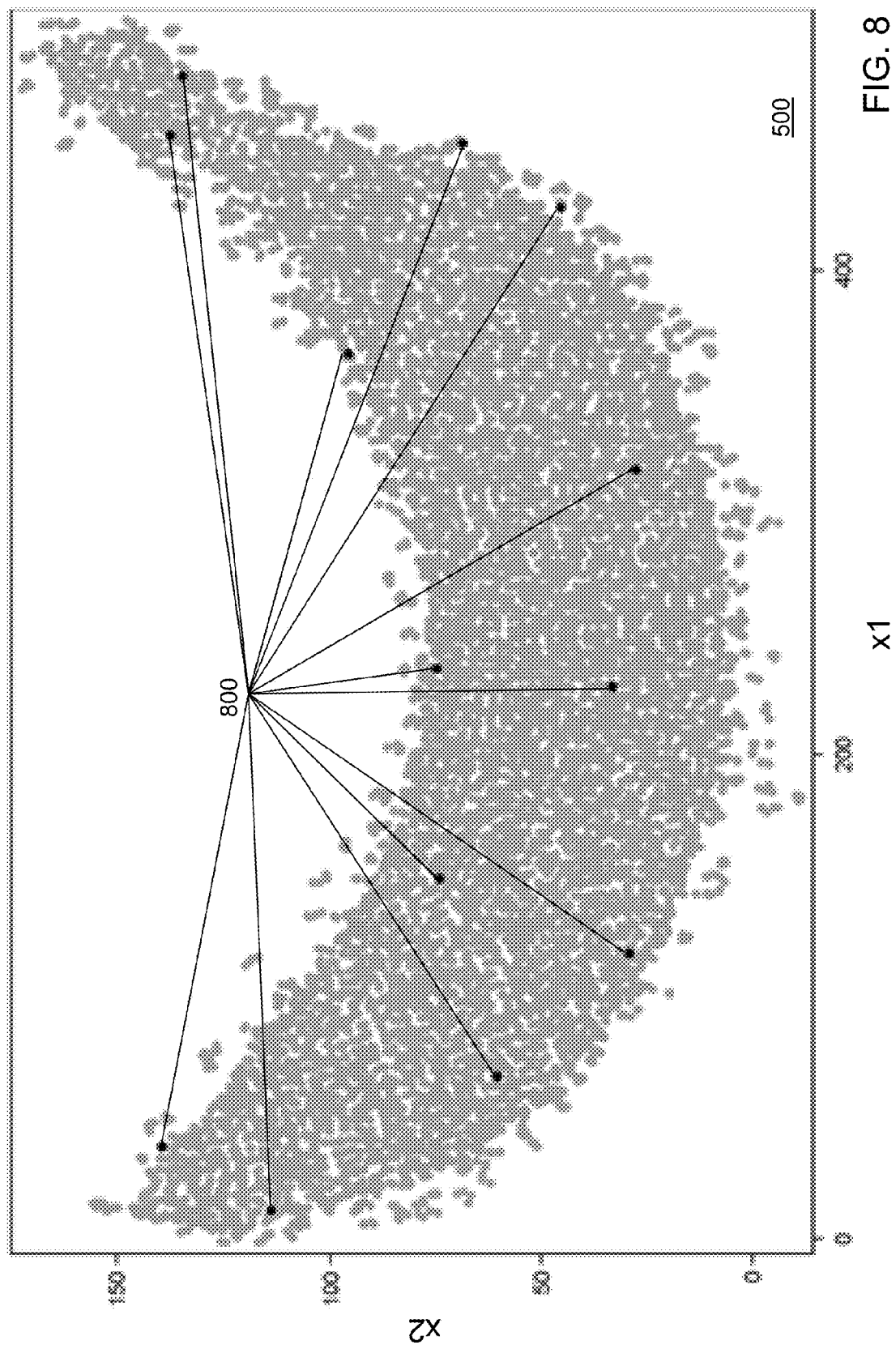

FIG. 8 shows a third plurality of support vectors 800 that are the third set of support vectors computed in operation 460 for i=10. The third plurality of support vectors 800 are again indicated by black dots. The third plurality of support vectors 800 includes thirteen support vectors.

Figure 9:
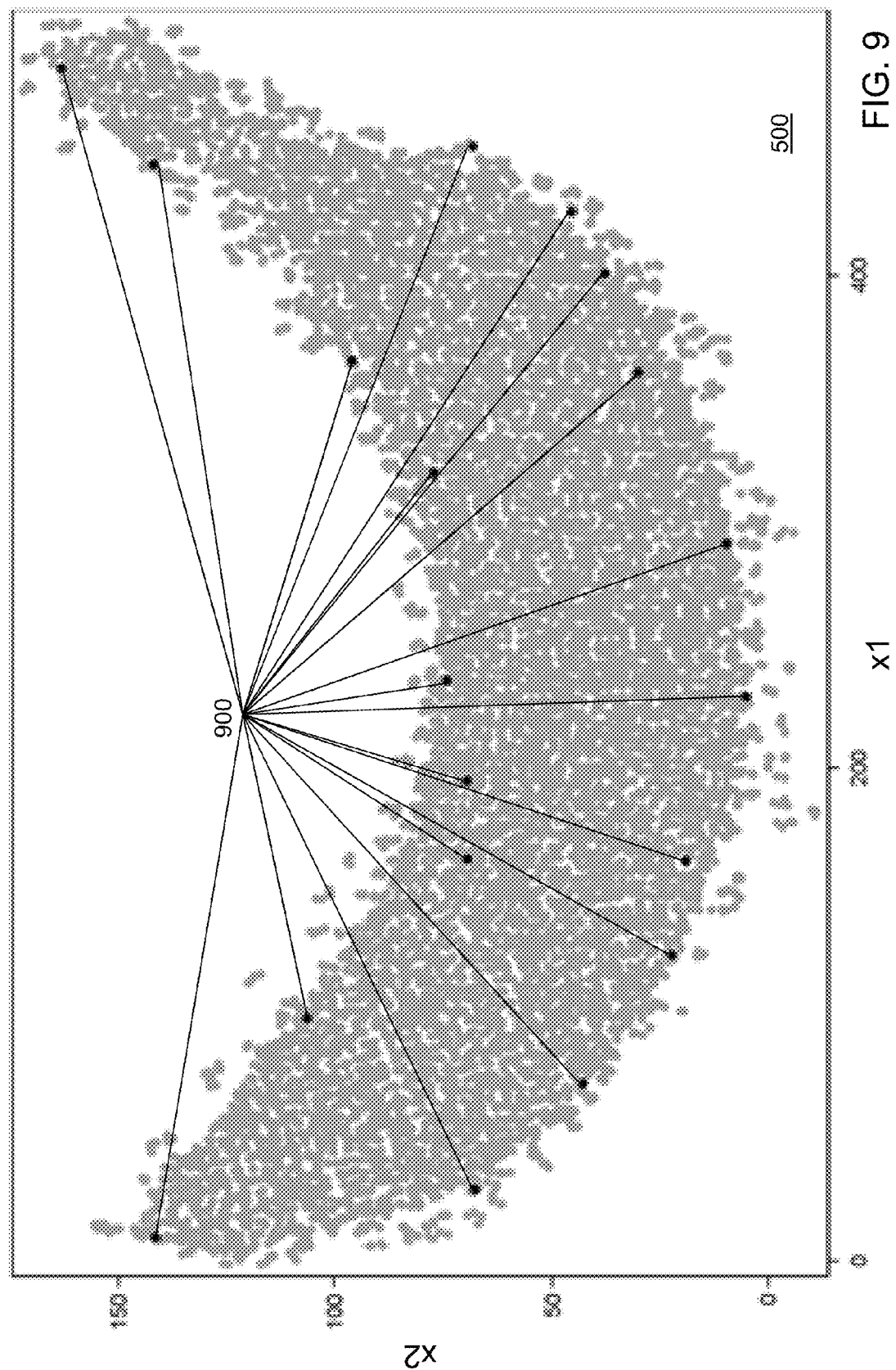

FIG. 9 shows a fourth plurality of support vectors 900 that are the third set of support vectors computed in operation 460 for i=30. The fourth plurality of support vectors 900 are again indicated by black dots. The fourth plurality of support vectors 900 includes nineteen support vectors.

Figure 10:
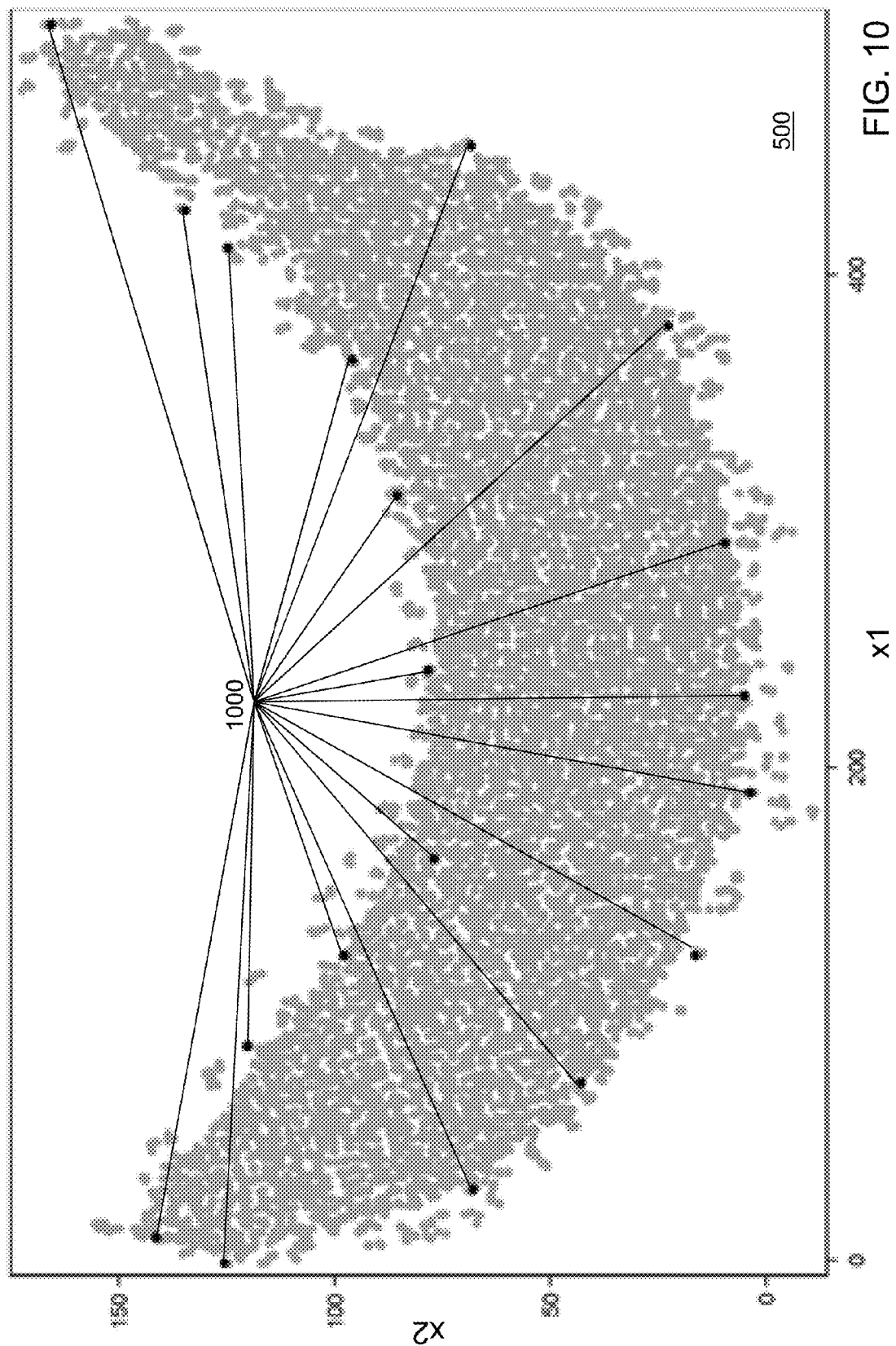

FIG. 10 shows a fifth plurality of support vectors 1000 that are the third set of support vectors computed in operation 460 for i=70. The fifth plurality of support vectors 1000 are again indicated by black dots. The fifth plurality of support vectors 1000 includes nineteen support vectors.

Figure 11:
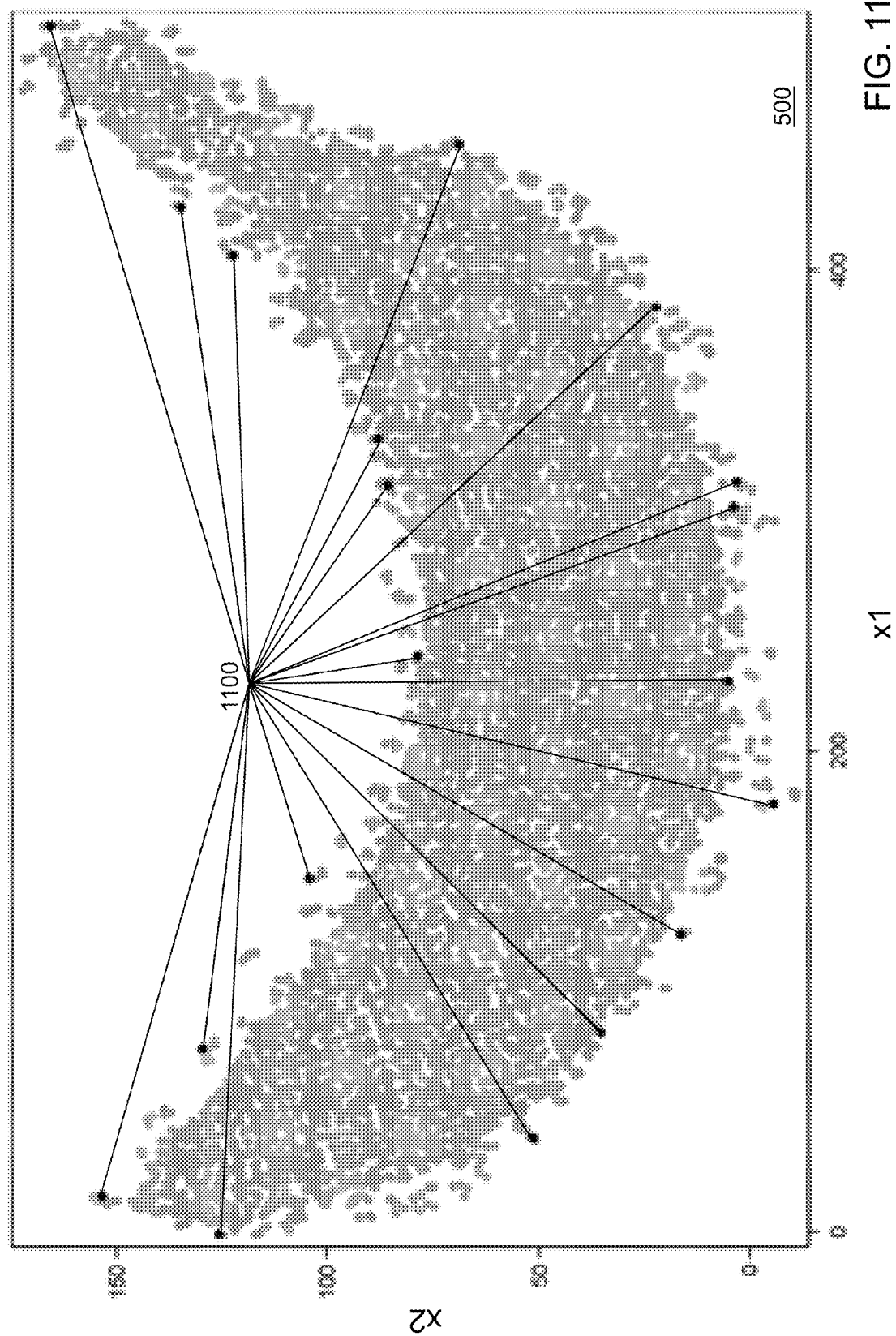

FIG. 11 shows a sixth plurality of support vectors 1100 that are the third set of support vectors computed in operation 460 for i=140. The sixth plurality of support vectors 1100 are again indicated by black dots. The sixth plurality of support vectors 1100 includes nineteen support vectors.

Figure 12:
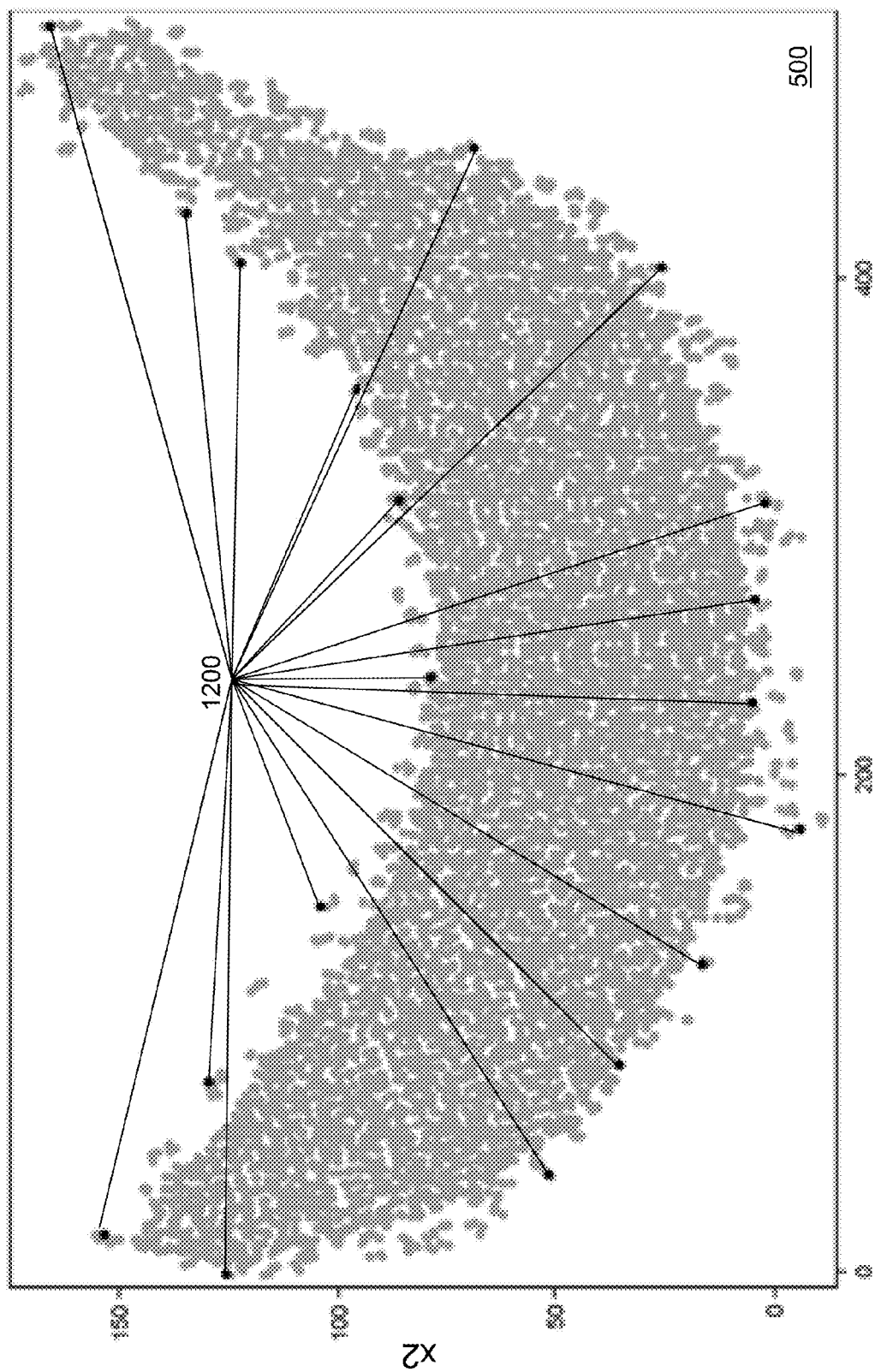

FIG. 12 shows a seventh plurality of support vectors 1200 that are the third set of support vectors computed in operation 460 for i=170. The seventh plurality of support vectors 1200 are again indicated by black dots. The seventh plurality of support vectors 1200 includes nineteen support vectors.

As illustrated by FIGS. 6-12, at lower iteration numbers, the plurality of support vectors were in the interior of first example dataset 500. As the number of iterations increased, the operations of training application 122 moved the plurality of support vectors toward a boundary of the data description. At and near convergence, the plurality of support vectors were primarily along the boundary of the data description.

Figure 13:
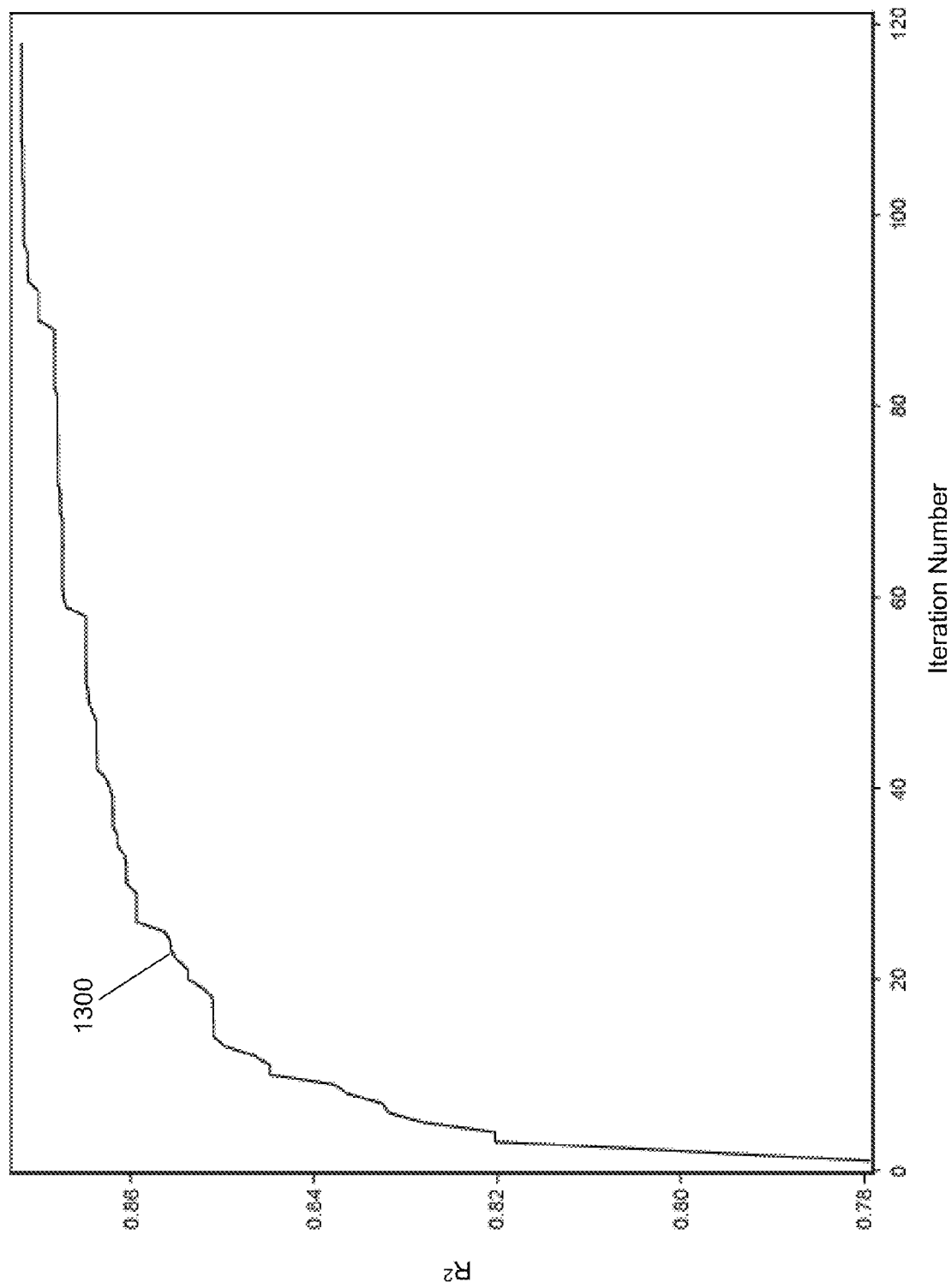
FIG. 13 depicts a value of a threshold $R^2$ as a function of an iteration number of the operations of FIGS. 4A, 4B, and 4C using the first example dataset of FIG. 5 in accordance with an illustrative embodiment.

Referring to FIG. 13, an $R^2$ curve 1300 shows a variation in $R^2$ computed using the third set of support vectors computed in operation 460 in successive iterations of operation 460 from i=1 to i=120.

For comparison, an SVDD' was computed using all of the observations in first example dataset 500. After solving for the optimal solution using all of the observations in first example dataset 500, SVDD' included 21 support vectors and resulted in $R^2$=0.8789 and required 1.98 seconds of computing time. In comparison, SVDD 126 included 19 support vectors and resulted in $R^2$=0.872 and required only 0.32 seconds of computing time for $N_s$=6.

Figure 14:
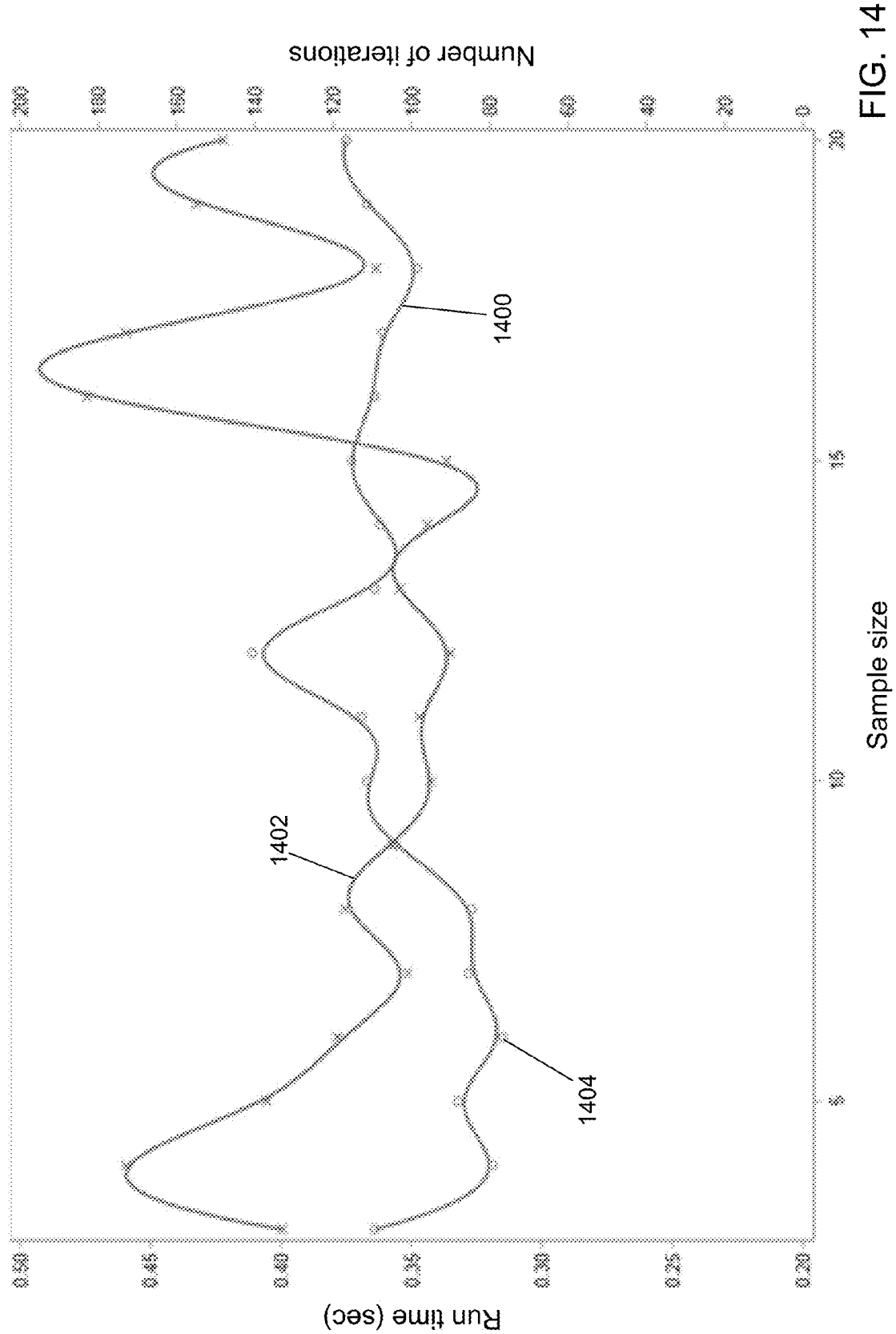
FIG. 14 depicts a value of a run time and a number of iterations as a function of a sample size for the operations of FIGS. 4A, 4B, and 4C using the first example dataset of FIG. 5 in accordance with an illustrative embodiment.

Referring to FIG. 14, a run time curve 1400 and a number of iterations curve 1402 are shown as a function of sample size $N_s$, which ranged from 3 to 20. Run time curve 1400 and number of iterations curve 1402 are b-spline curve fits to the data points for each sample size $N_s$. For example, run time curve data points are shown with "o", and number of iterations curve data points are shown with an "x". A minimum run time data point 1404 indicates a minimum run time occurred for $N_s$=6.

Figure 15A:
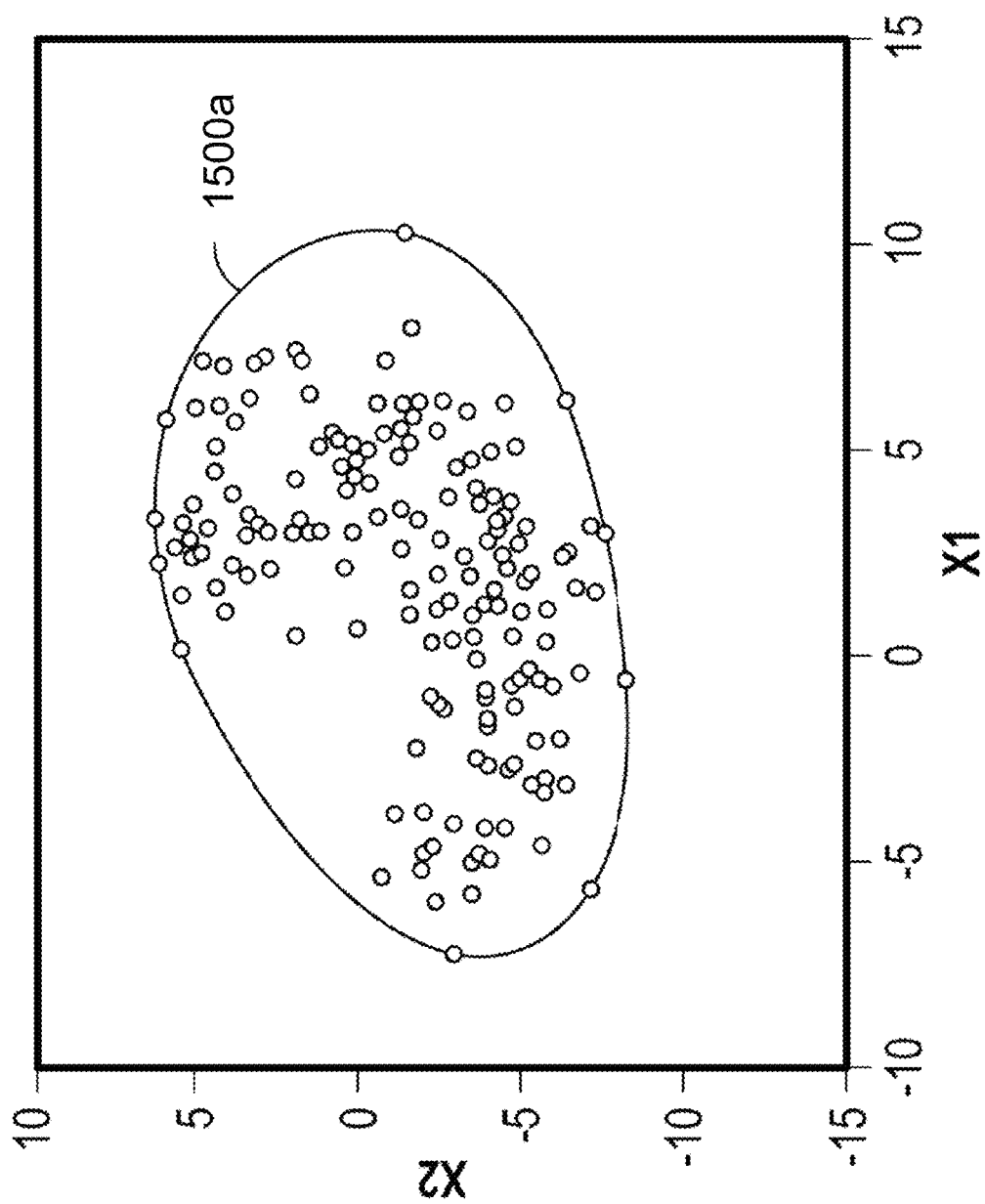
FIGS. 15A to 15C depict SVDD results for a dataset using the Gaussian kernel function and different kernel parameter values in accordance with an illustrative embodiment.
Figure 15B:
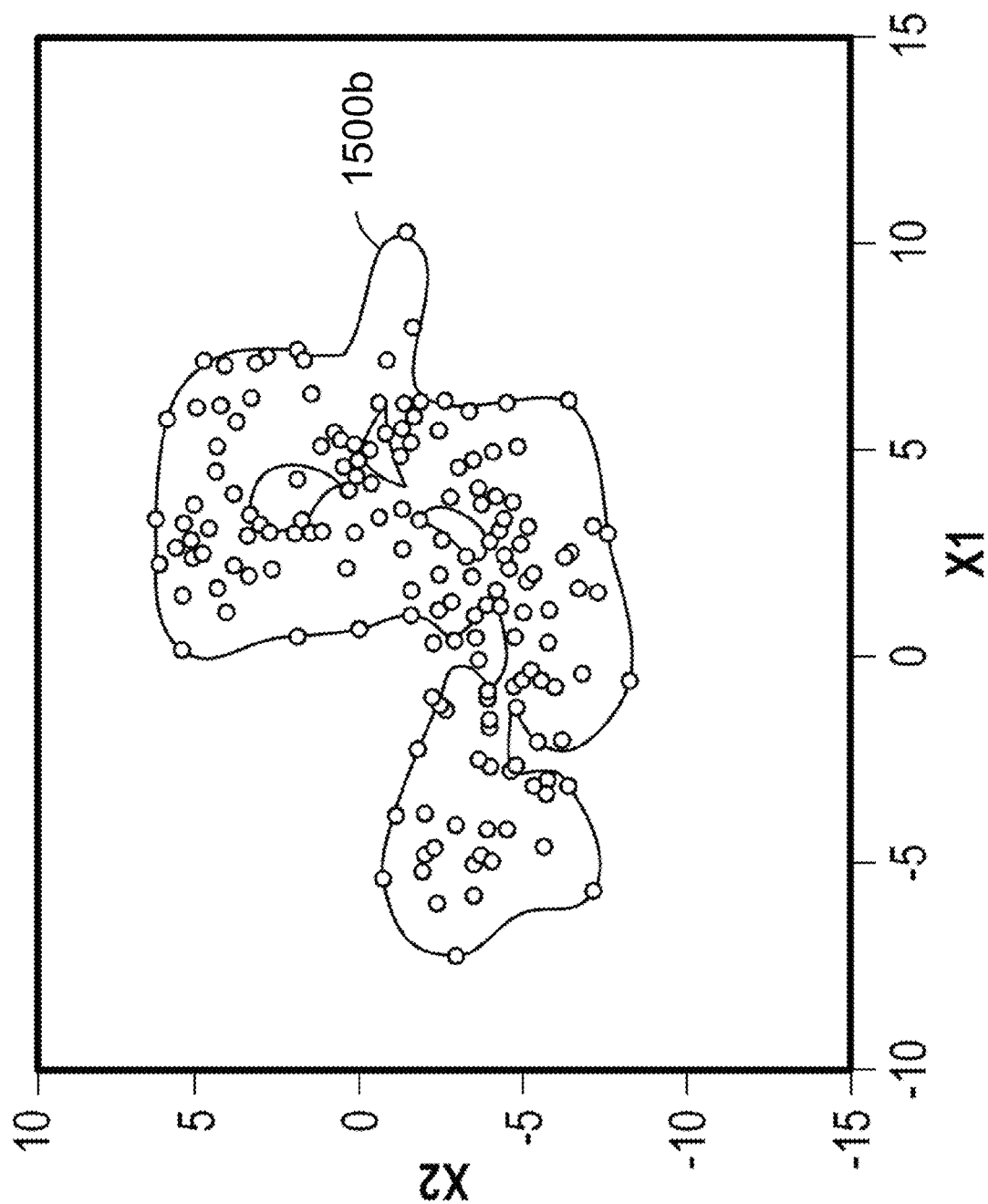
Figure 15C:
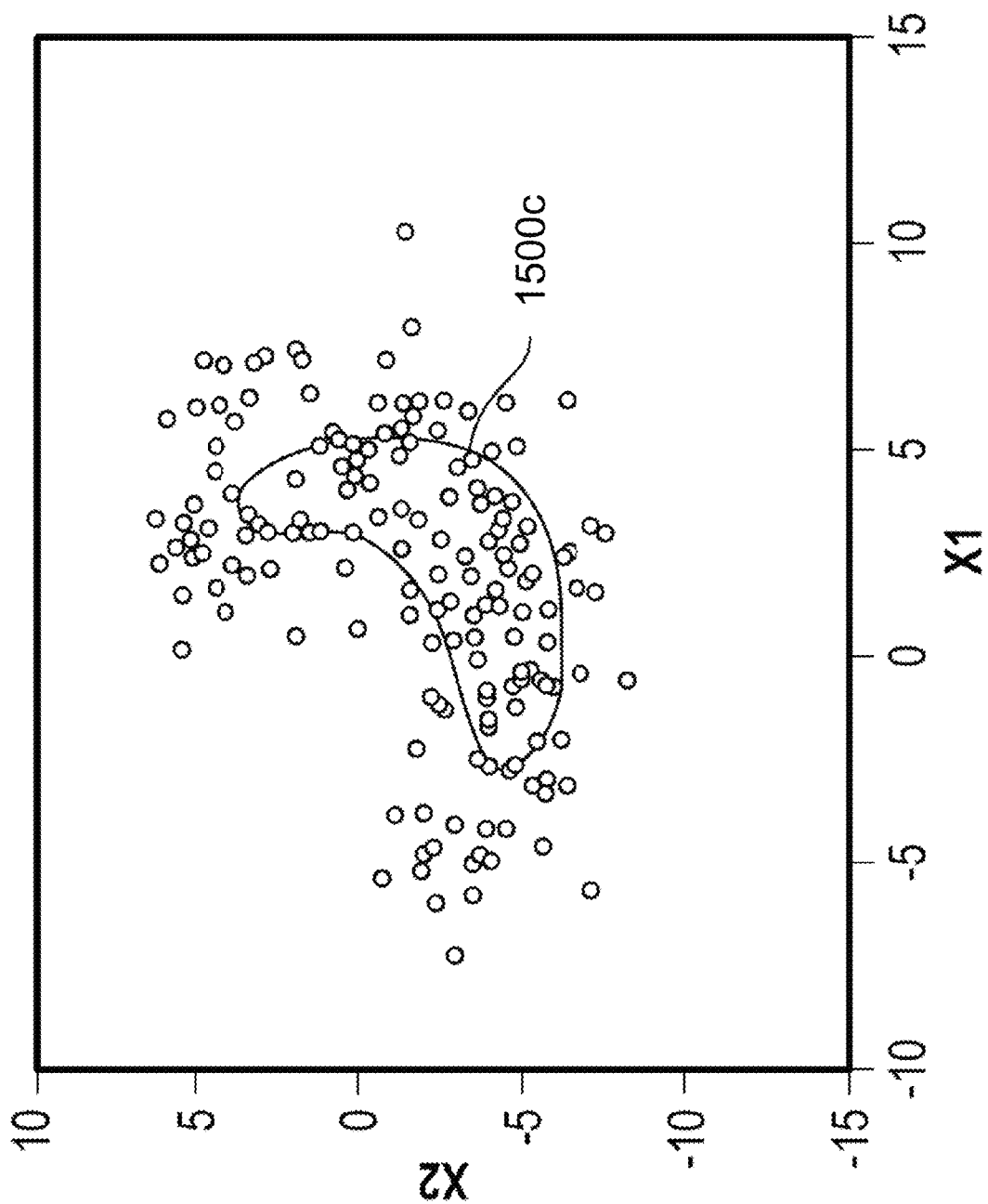

A variation in SVDD was determined for an illustrative dataset using the Gaussian kernel function and based on selection of a value of the kernel parameters and selection of a value of the expected outlier fraction f. The results were generated by and described in a paper by Thuntee Sukchotrata, Seoung Bum Kimb and Fugee Tsgung, *One-class classification-based control charts for multivariate process monitoring*, IIE Transactions, Volume 42, Issue 2, 2009. Referring to FIGS. 15A to 15C, illustrative results from that paper are shown. Referring to FIG. 15A, a first SVDD 1500a is defined for s=10 and f=0.01 by optimizing the objective function. Referring to FIG. 15B, a second SVDD 1500b is defined for s=3 and f=0.01 by optimizing the objective function. Referring to FIG. 15C, a third SVDD 1500c is defined for s=3 and f=0.8 by optimizing the objective function. A low value of s makes the data boundary wiggly to provide a better fit to the data; whereas, a high value of s approaches a spherical data boundary. Selecting a value of s that provides a good quality SVDD requires examination of different values of s.

Figure 16:
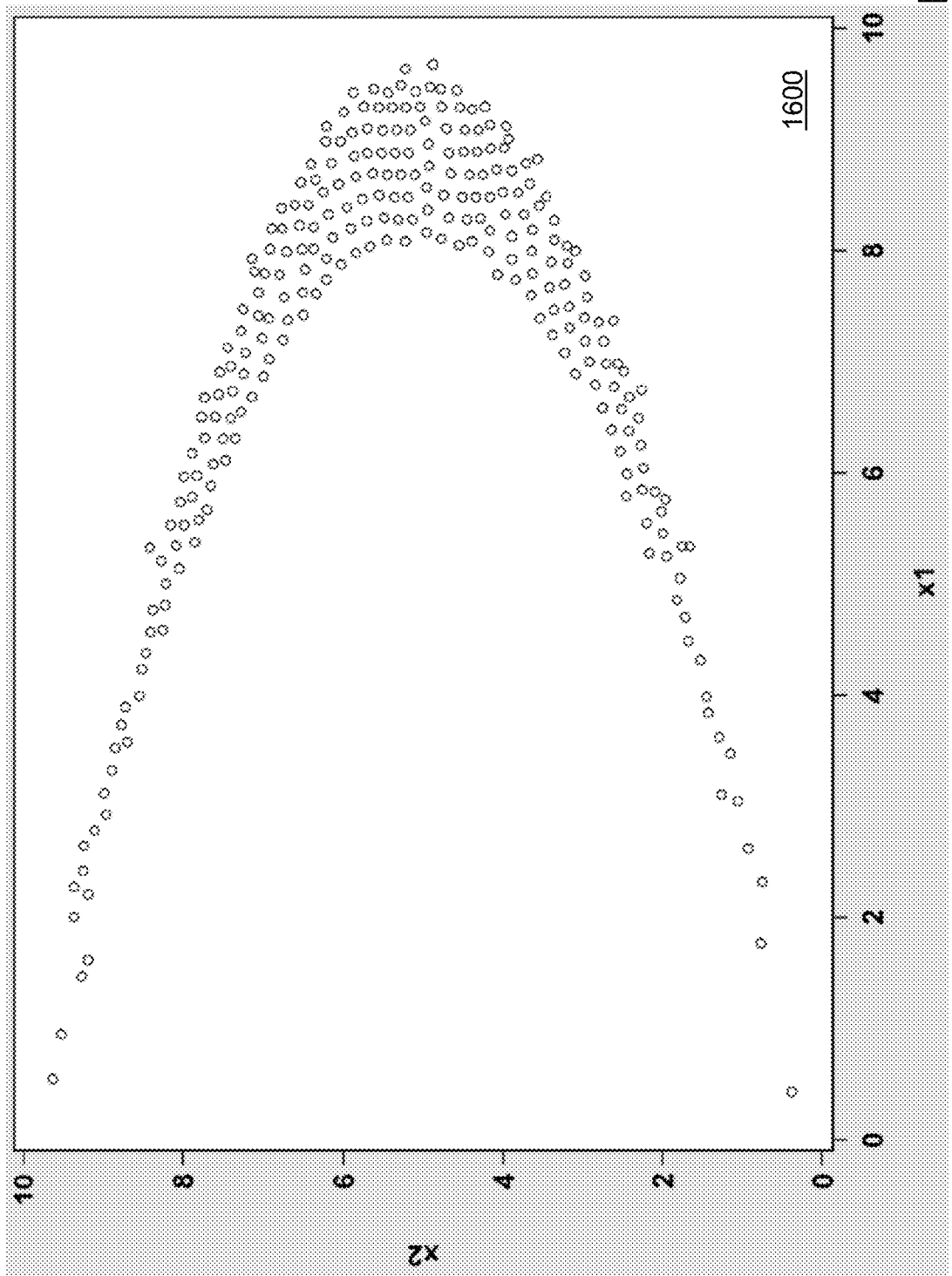
FIG. 16 depicts a first sample dataset having a banana shape in accordance with an illustrative embodiment.

Referring to FIG. 16, a second example dataset 1600 including a first dimension x1 and a second dimension x2 having a banana shape is shown for training dataset 124 in accordance with an illustrative embodiment.

Figure 17A:
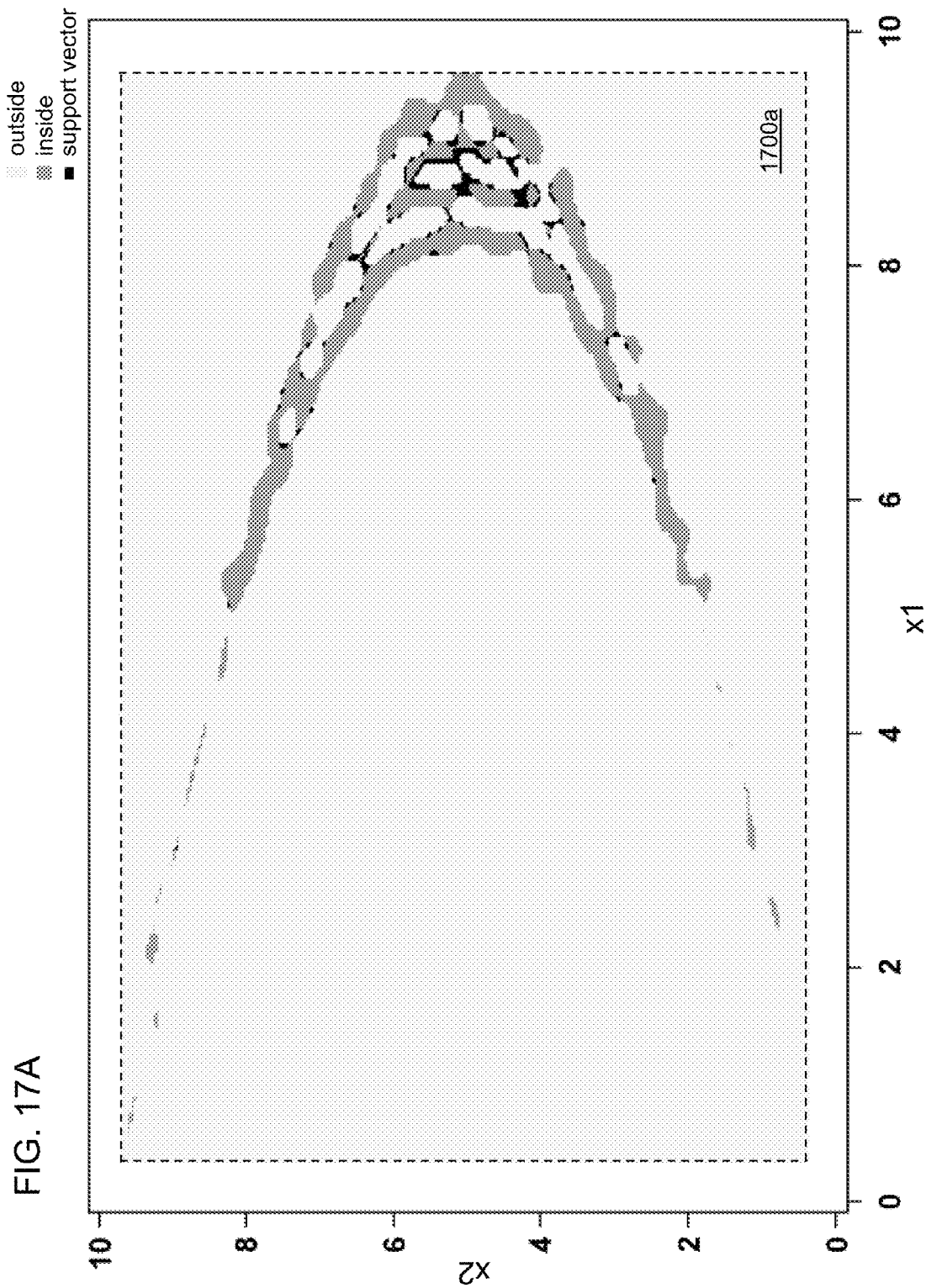

Referring to FIGS. 17A to 17E, variations in SVDD were determined for second example dataset 1600 using the Gaussian kernel function and different values for the kernel parameter s and scoring on a 200×200 data grid are shown. For each SVDD determination shown in FIGS. 17A to 17E, f=0.001 was used as part of optimizing the objective function. Referring to FIG. 17A, a first SVDD 1700a is shown for s=0.2 after optimizing the objective function. A black dot indicates a support vector (boundary position), a dark gray dot indicates an inside data point, and a light gray dot indicates an outside data point based on a mathematical description of first SVDD 1700a.

Figure 17B:
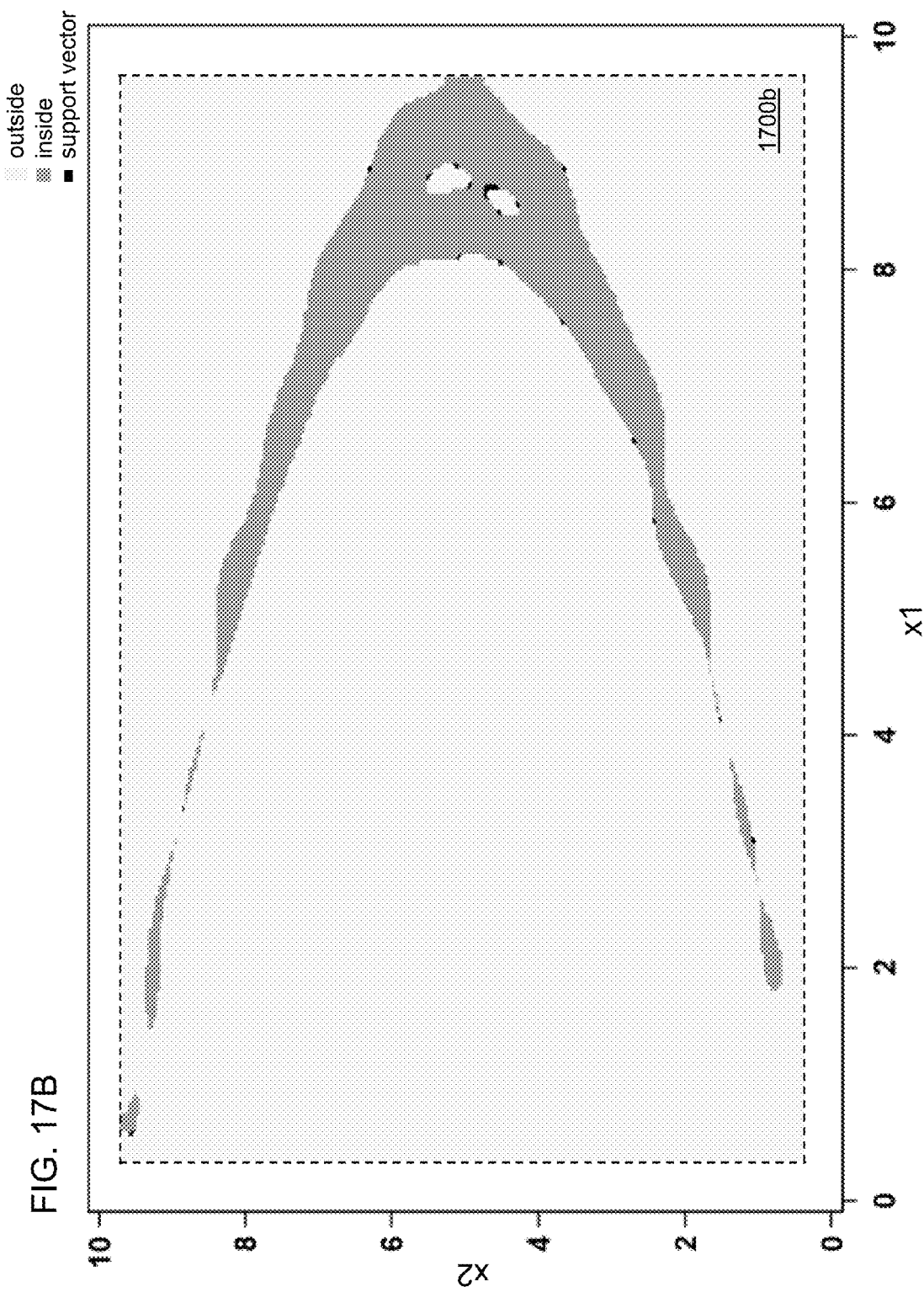

Referring to FIG. 17B, a second SVDD 1700b is shown for s=0.5 after optimizing the objective function. A black dot indicates a support vector (boundary position), a dark gray dot indicates an inside data point, and a light gray dot indicates an outside data point based on a mathematical description of second SVDD 1700b.

Referring to FIG. 17C, a third SVDD 1700c is shown for s=0.7 after optimizing the objective function. A black dot indicates a support vector (boundary position), a dark gray dot indicates an inside data point, and a light gray dot indicates an outside data point based on a mathematical description of third SVDD 1700c.

Figure 17D:
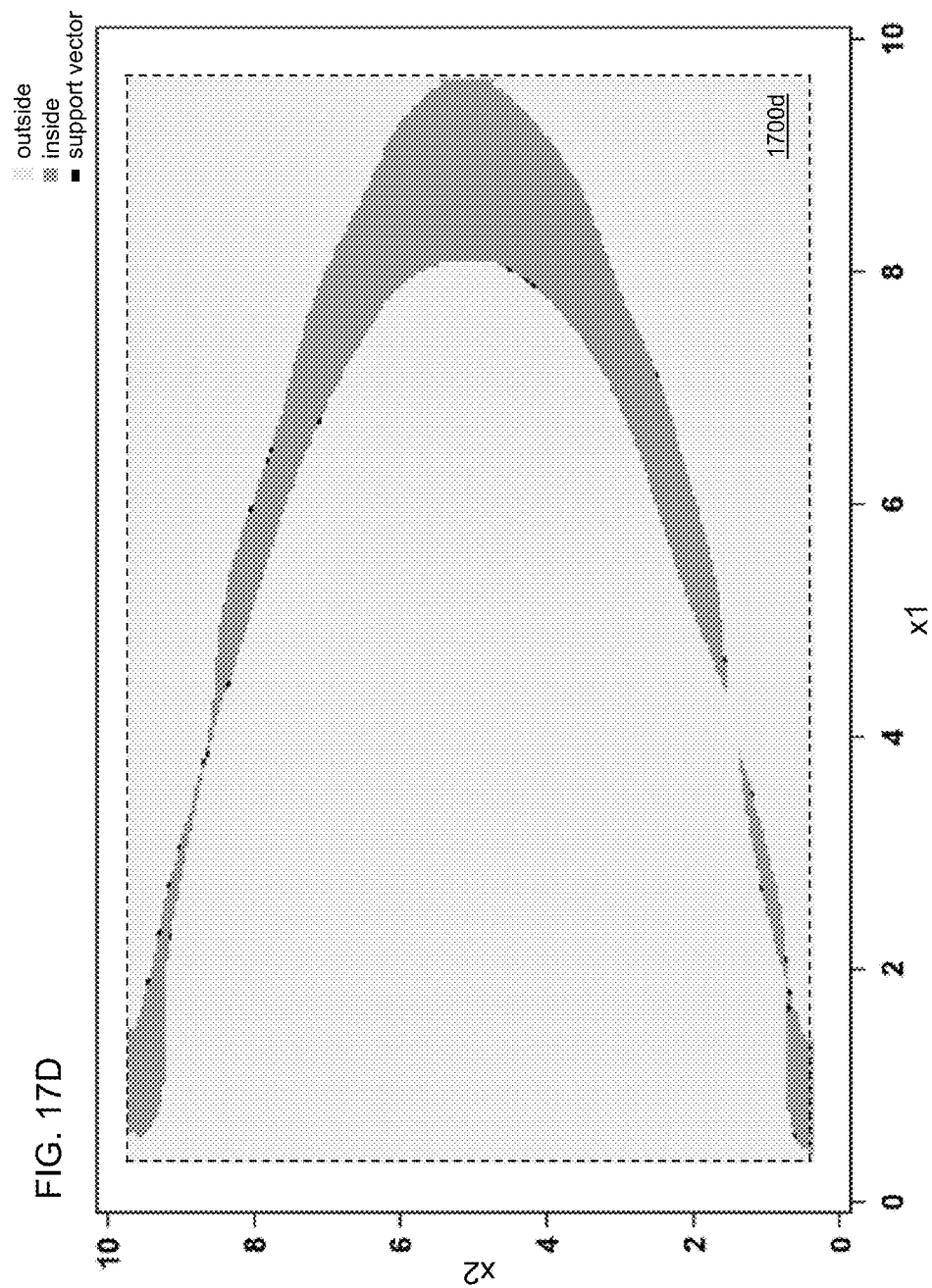

Referring to FIG. 17D, a fourth SVDD 1700d is shown for s=0.9 after optimizing the objective function. A black dot indicates a support vector (boundary position), a dark gray dot indicates an inside data point, and a light gray dot indicates an outside data point based on a mathematical description of fourth SVDD 1700d.

Figure 17E:
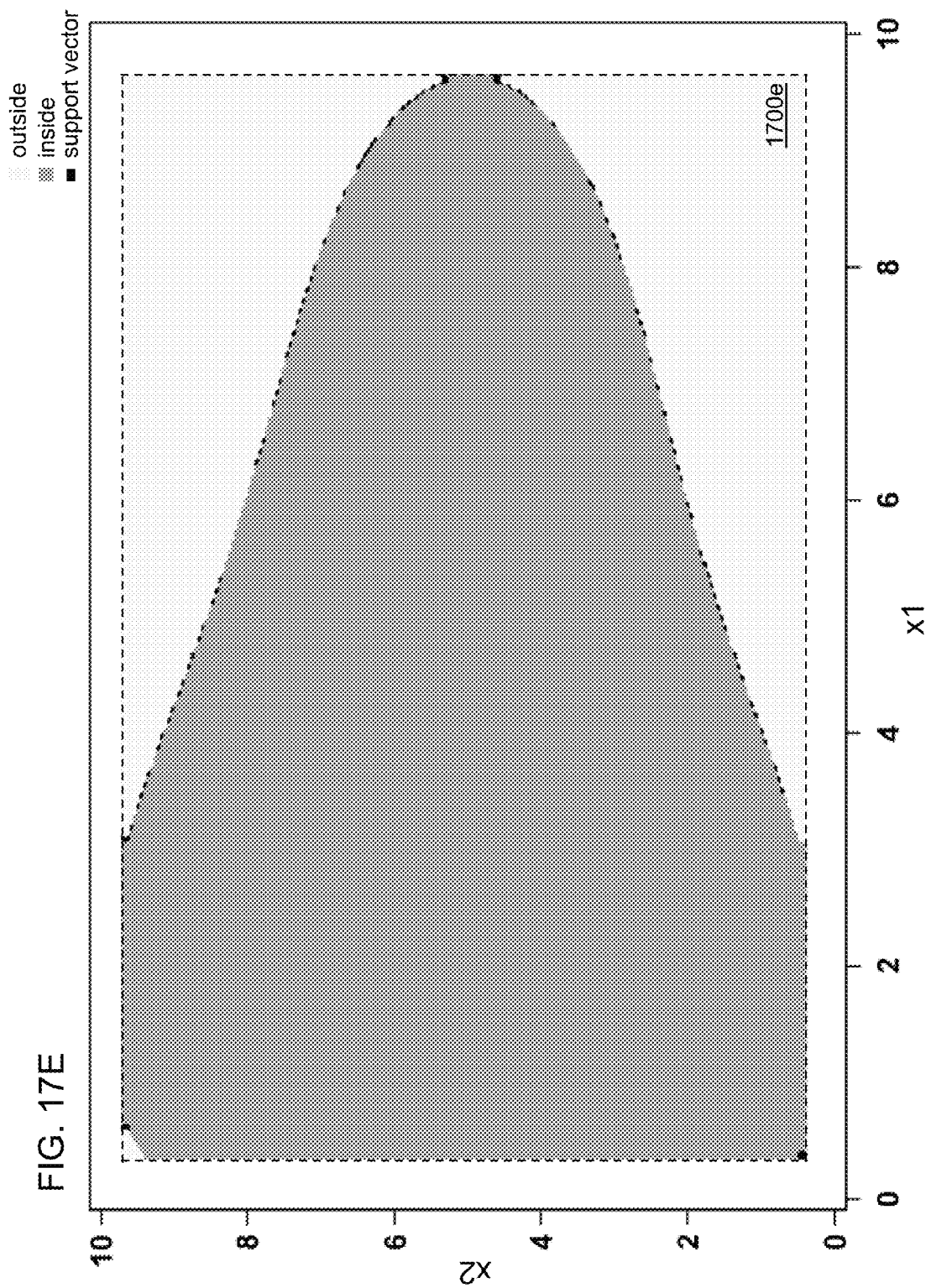

Referring to FIG. 17E, a fifth SVDD 1700e is shown for s=4.1 after optimizing the objective function. A black dot indicates a support vector (boundary position), a dark gray dot indicates an inside data point, and a light gray dot indicates an outside data point based on a mathematical description of fifth SVDD 1700e. As discussed previously, a lower value of s makes the data boundary wiggly to provide a better fit to the data; whereas, a higher value of s approaches a spherical data boundary. The values of s used to create the results shown in FIGS. 17B, 17C, 17D visually appear to provide a good quality SVDD.

Figure 18:
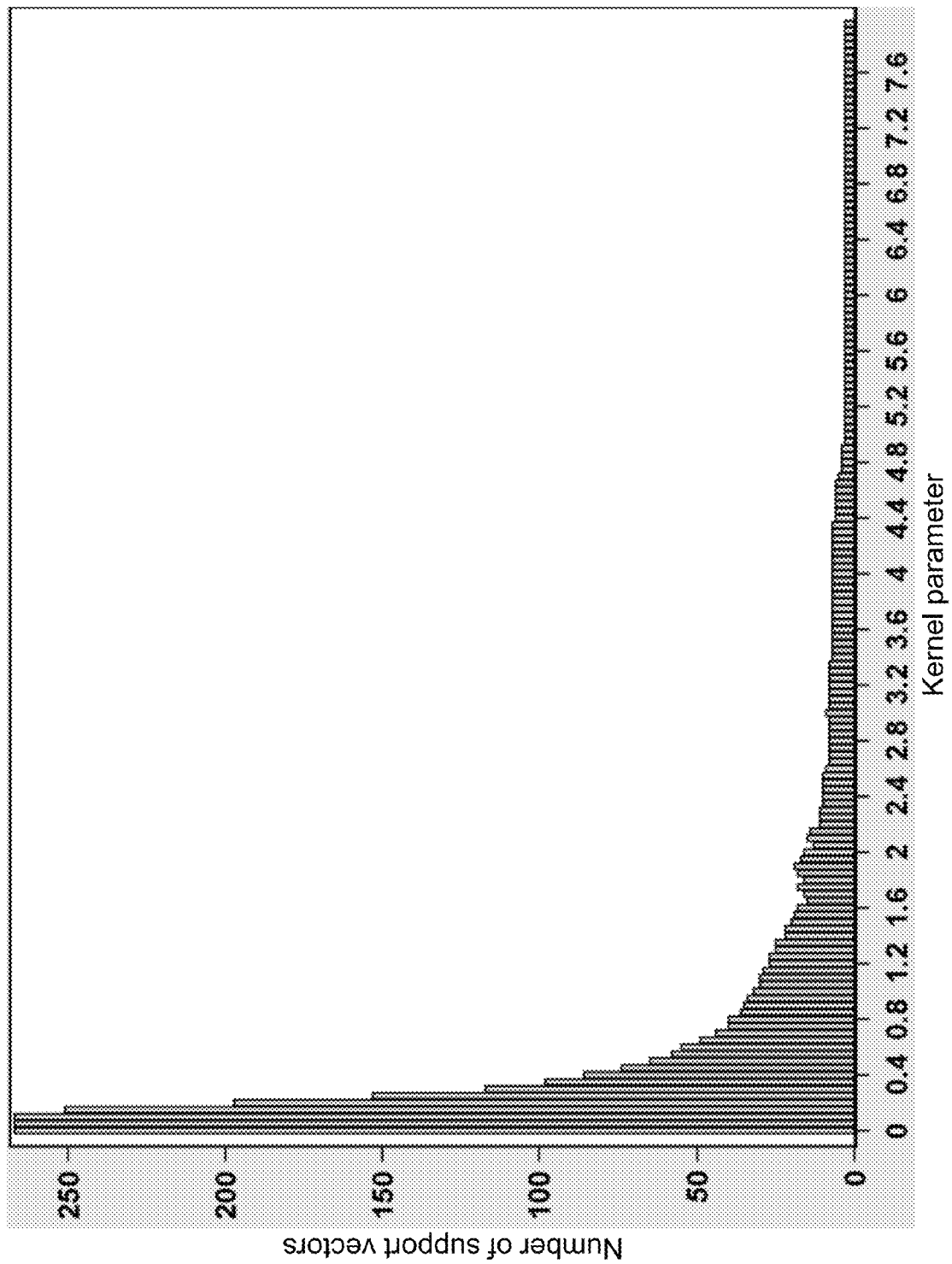
FIG. 18 depicts a number of support vectors as a function of the Gaussian bandwidth parameter value determined using the Gaussian kernel function and the first sample dataset of FIG. 16 in accordance with an illustrative embodiment.

Referring to FIG. 18, a number of support vectors as a function of the kernel parameter s determined by optimizing the objective function using the Gaussian kernel function and second example dataset 1600 is shown in accordance with an illustrative embodiment. The flexible SVDD is preferred when the data boundary needs to closely follow a shape of the data. The tightness of the boundary is a function of the number of support vectors. In the case of a Gaussian kernel function, if the value of the expected outlier fraction f is kept constant, the number of support vectors identified by the SVDD algorithm is a function of the kernel parameter s. At a very low value of s, the number of support vectors is very high, approaching the number of observations. As the value of s increases, the number of support vectors reduces. Training application 122 provides an empirical criterion for selecting a good value of the kernel parameter s such that a corresponding data boundary is smooth and captures essential visual features of the data included in training dataset 124.

Figure 19:
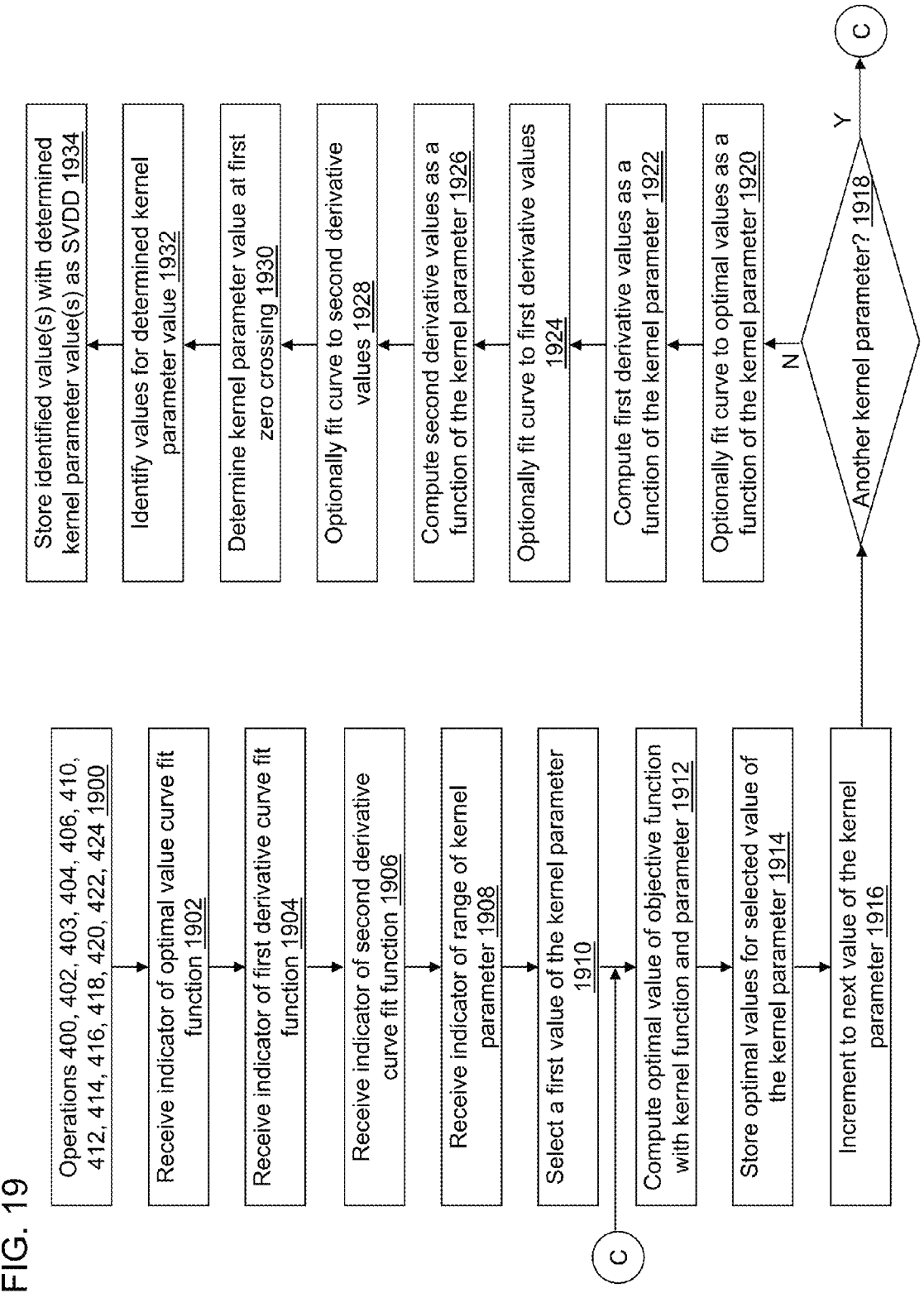
FIG. 19 depicts a flow diagram illustrating additional examples of operations performed by the SVDD training device of FIG. 1 in accordance with an illustrative embodiment.
Figure 20:
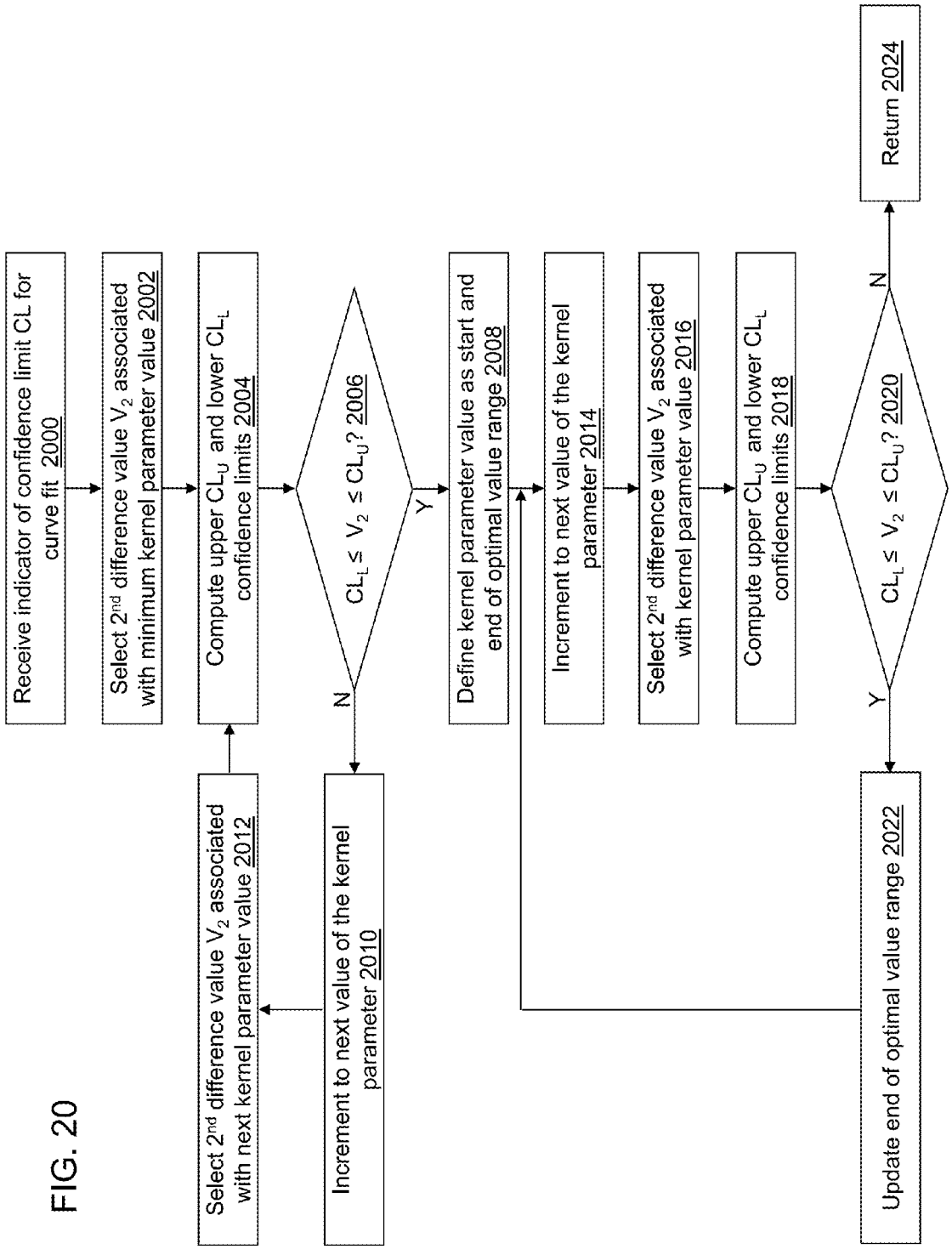
FIG. 20 depicts a flow diagram illustrating additional examples of operations performed by the SVDD training device of FIG. 1 in accordance with an illustrative embodiment.

Referring to FIGS. 19 and 20, additional example operations associated with training application 122 are described. Additional, fewer, or different operations may be performed depending on the embodiment. The order of presentation of the operations of FIGS. 19 and 20 is not intended to be limiting. Although some of the operational flows are presented in sequence, the various operations may be performed in various repetitions, concurrently (in parallel, for example, using threads and/or distributed computing system 128), and/or in other orders than those that are illustrated.

Referring to FIG. 19, in an operation 1900, one or more of operations 400, 402, 404, 406, 408, 412, 414, 416, 418, 420, 422, 424, and 426 described referring to FIG. 4A may be performed.

In an operation 1902, a fourteenth indicator of an optimal value curve fit function to apply is received. For example, the fourteenth indicator indicates a name of an optimal value curve fit function. The fourteenth indicator may be received by training application 122 after selection from a user interface window or after entry by a user into a user interface window. A default value for the optimal value curve fit function may further be stored, for example, in computer-readable medium 108. As an example, an optimal value curve fit function may be selected from "None", "Linear", "Penalized B-spline", etc. Of course, the optimal value curve fit function may be labeled or selected in a variety of different manners by the user as understood by a person of skill in the art. In an alternative embodiment, the optimal value curve fit function may not be selectable, and a single optimal value curve fit function is implemented in training application 122. For example, a penalized B-spline function may be used by default or without allowing a selection.

In an operation 1904, a fifteenth indicator of a first derivative curve fit function to apply is received. For example, the fifteenth indicator indicates a name of a first derivative curve fit function. The fifteenth indicator may be received by training application 122 after selection from a user interface window or after entry by a user into a user interface window. A default value for the first derivative curve fit function may further be stored, for example, in computer-readable medium 108. As an example, a first derivative curve fit function may be selected from "None", "Linear", "Penalized B-spline", etc. Of course, the first derivative curve fit function may be labeled or selected in a variety of different manners by the user as understood by a person of skill in the art. In an alternative embodiment, the first derivative curve fit function may not be selectable, and a single first derivative curve fit function is implemented in training application 122. For example, a penalized B-spline function may be used by default or without allowing a selection.

In an operation 1906, a sixteenth indicator of a second derivative curve fit function to apply is received. For example, the sixteenth indicator indicates a name of a second derivative curve fit function. The sixteenth indicator may be received by training application 122 after selection from a user interface window or after entry by a user into a user interface window. A default value for the second derivative curve fit function may further be stored, for example, in computer-readable medium 108. As an example, a second derivative curve fit function may be selected from "None", "Linear", "Penalized B-spline", etc. Of course, the second derivative curve fit function may be labeled or selected in a variety of different manners by the user as understood by a person of skill in the art. In an alternative embodiment, the second derivative curve fit function may not be selectable, and a single second derivative curve fit function is implemented in training application 122. For example, a penalized B-spline function may be used by default or without allowing a selection. In an alternative embodiment, a single curve fit function may be defined using a single indicator. The single curve fit function is used for the optimal value curve fit function, the first derivative curve fit function, and the second derivative curve fit function.

In an operation 1908, a seventeenth indicator of a range of kernel parameter values to test with the indicated kernel function is received instead of receiving a single value as described in operation 410 of FIG. 4A. For example, a minimum kernel parameter value, a maximum kernel parameter value, and an incremental kernel parameter value are received. In an alternative embodiment, the seventeenth indicator may not be received. For example, default values for the range of kernel parameter values may be stored, for example, in computer-readable medium 108 and used automatically. In another alternative embodiment, the value of the expected range of kernel parameter values may not be selectable. Instead, fixed, predefined values may be used.

In an operation 1910, a first value for the kernel parameter is selected. For example, the kernel parameter may be s when the kernel function selected is the Gaussian kernel function. For example, the first value may be selected as the minimum kernel parameter value defined based on the seventeenth indicator. In an alternative embodiment, the first value may be selected as the maximum kernel parameter value defined based on the seventeenth indicator.

In an operation 1912, an optimal value for the objective function is computed by optimizing the objective function using the kernel function defined based on the fifth indicator and the selected value for the kernel parameter. For example, equations (11)-(14) above are used to solve for SV, a set of support vectors that have $0 < \alpha_i \leq C$. Values for the Lagrange constants $\alpha_i$ for each support vector of the set of support vectors, for $R^2$ using equation (14), and for the center position a using equation (4) are computed as part of the optimal solution. Alternatively, equations (1)-(4) and (8) may be used without a kernel function or a kernel parameter value. As another alternative, one or more of operations 428, 430, 432, 434, 436, 438, 440, 442, 444, 446, 448, 450, 452, 454, 456, 458, 460, 462, 466, 468, 470, 472, 474, 476, 478, 480, and 482 described referring to FIGS. 4A-4C may be performed with parameters defined by one or more of operations of 400, 402, 404, 406, 408, 412, 414, 416, 418, 420, 422, 424, and 426 to use the sampling method to solve for SV.

In an operation 1914, the set of support vectors that have $0 < \alpha_i \leq C$, $\alpha_i$ the Lagrange constants for each support vector of the set of support vectors, the center position a, $R^2$, and/or the optimal value computed in operation 1912 are stored, for example, in computer-readable medium 108, in association with the selected value for the kernel parameter. As another example, the third set of support vectors, $\alpha_i$ the Lagrange constants for each of the third set of support vectors, the center position a, $R^2$, and/or the optimal value computed in operation 460 and stored in operation 464 may be stored in operation 1914 in association with the selected value for the kernel parameter. Depending on the kernel function used, one or more constant values included in a subsequent computation of $dist^2(z)$ may also be stored. For example, using the Gaussian kernel function, $K(z,z)=1$ may be stored. As another example, using the Gaussian kernel function, the value of $\sum_{i=1}^{N_{SV}} \sum_{j=1}^{N_{SV}} \alpha_i \alpha_j K(x_i, x_j)$ is constant and already determined so the value may be stored. These values can also be stored in association with the selected value for the kernel parameter. $N_{SV}$ is a number of support vectors of the set of support vectors or a number of support vectors of the third set of support vectors depending on the computation in operation 1914.

In an operation 1916, a next value of the kernel parameter is determined by incrementing the current value using the incremental kernel parameter value. For example, when the first value in operation 1910 was the minimum kernel parameter value, the next value is the current value plus the incremental kernel parameter value. When the first value in operation 1910 was the maximum kernel parameter value, the next value is the current value minus the incremental kernel parameter value.

In an operation 1918, a determination is made concerning whether or not there is another kernel parameter value to evaluate. For example, the next value is compared to the maximum kernel parameter value or to the minimum kernel parameter value. When the first value in operation 1910 was the minimum kernel parameter value, the next value is compared to the maximum kernel parameter value. When the next value is greater than the maximum kernel parameter value, processing continues in an operation 1920. When the next value is less than or equal to the maximum kernel parameter value, processing continues in operation 1912 to compute the optimal values using the next value for the kernel parameter.

When the first value in operation 1910 was the maximum kernel parameter value, the next value is compared to the minimum kernel parameter value. When the next value is less than the minimum kernel parameter value, processing continues in operation 1920. When the next value is greater than or equal to the minimum kernel parameter value, processing continues in operation 1912 to compute the optimal values using the next value for the kernel parameter. Of course, the evaluations may be inclusive or exclusive of the maximum/minimum kernel parameter values.

Optionally, in operation 1920, a first curve may be fit to the optimal values computed in operation 1912 as a function of the kernel parameter, such as s using the Gaussian kernel function and the optimal value curve fit function indicated in operation 1902. For illustration, a penalized B-spline can be fit to the optimal values computed in operation 1912. A result of fitting the first curve is an optimal value equation that can be used to define the optimal values as a function of the kernel parameter instead of the optimal values themselves computed in operation 1912.

Figure 21:
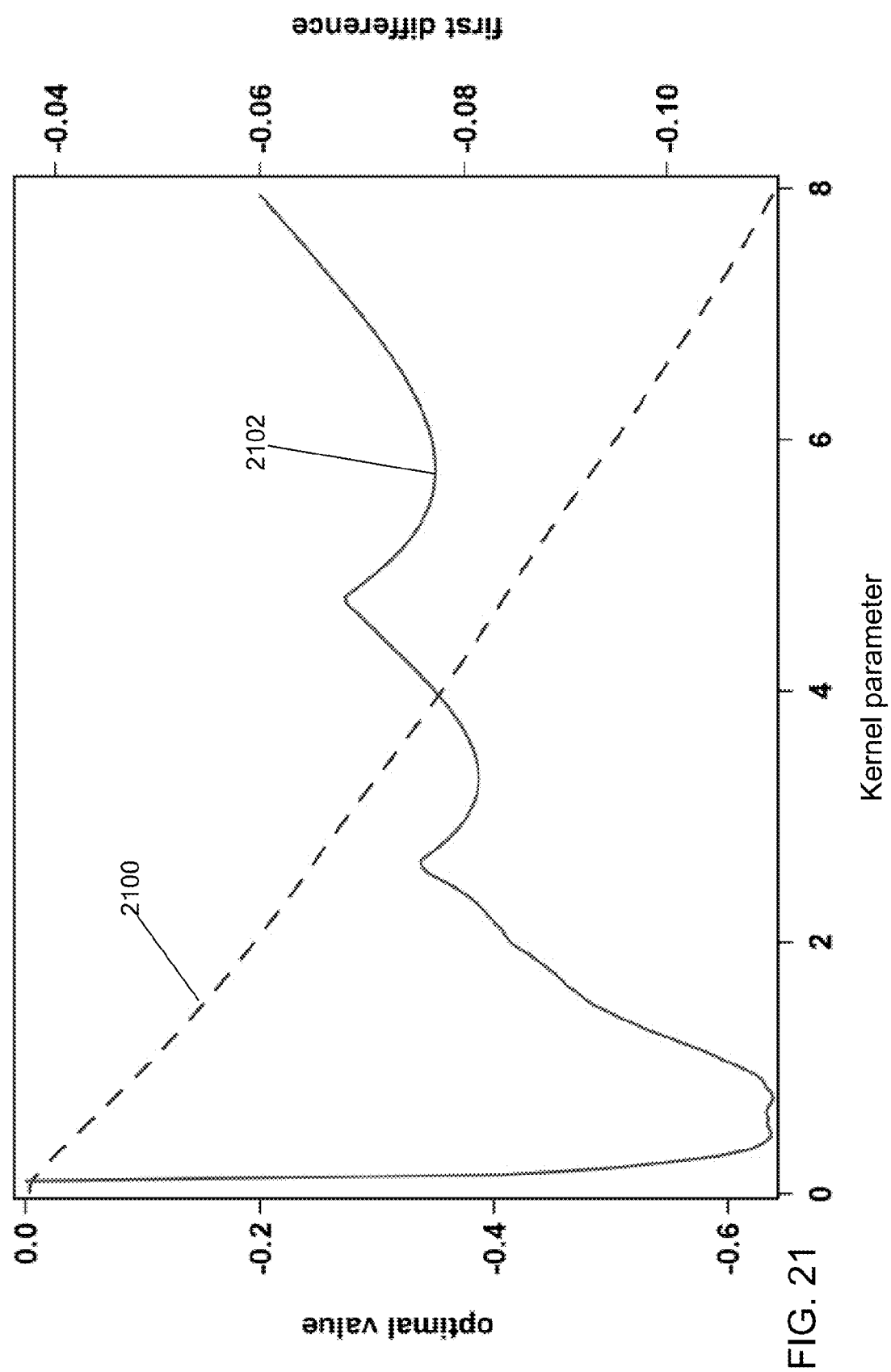
FIG. 21 depicts an optimal value and a first difference between the optimal values as a function of the Gaussian bandwidth parameter value determined using the Gaussian kernel function and the first sample dataset of FIG. 16 in accordance with an illustrative embodiment.

In operation 1922, a first derivative of the optimal values computed in operation 1912 or in operation 1920 is computed. For example, the first derivative may be computed using the method of finite differences to compute a first difference value for each value for the kernel parameter. Referring to FIG. 21, for example, an optimal value curve 2100 depicts the optimal values computed in operation 1912 as a function of the kernel parameter s using the Gaussian kernel function. A first difference curve 2102 depicts the first derivative of the optimal values computed using the method of finite differences as a function of the kernel parameter.

As another example, a first derivative may be taken of the optimal value equation to define a first derivative equation. The first difference value may be computed for each value for the kernel parameter using the defined first derivative equation.

Optionally, in operation 1924, a second curve may be fit to the first difference values as a function of the kernel parameter using the first derivative curve fit function indicated in operation 1904. For illustration, a penalized B-spline can be fit to the first difference values computed in operation 1922. A result of fitting the second curve is a first derivative equation that can be used to define the first difference values as a function of the kernel parameter instead of the first difference values themselves.

Figure 22A:
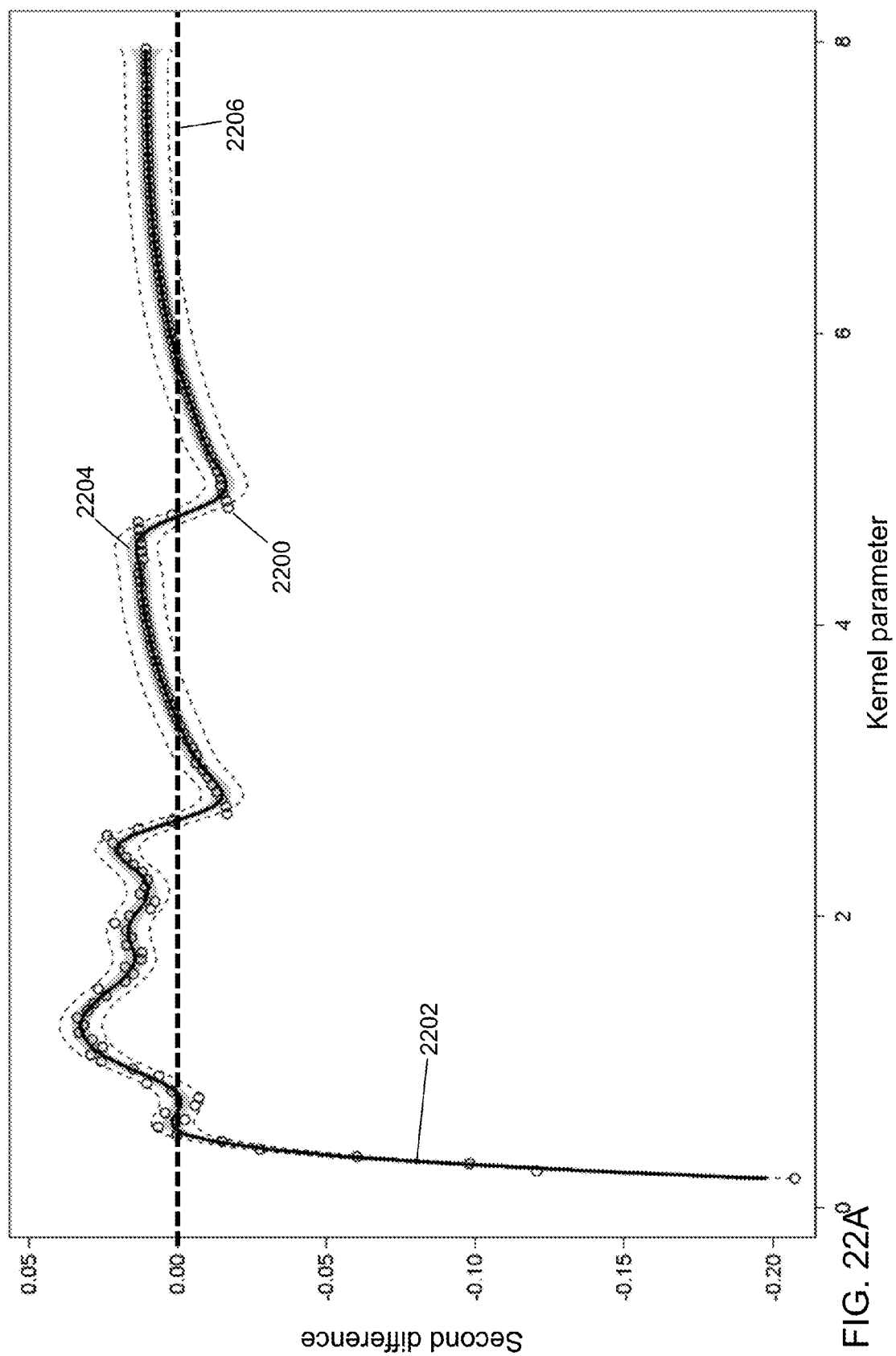
FIG. 22A depicts a second difference between the first difference values of FIG. 21 (a second derivative) as a function of the Gaussian bandwidth parameter value in accordance with an illustrative embodiment.

In operation 1926, a second derivative of the optimal values computed in operation 1912 or in operation 1920 is computed. For example, the second derivative may be computed for the first difference values computed in operation 1922 or in operation 1924 using the method of finite differences to compute a second difference value for each value for the kernel parameter. For example, referring to FIG. 22A, a second difference curve 2200 depicts the second derivative of the optimal values computed using the method of finite differences as a function of the kernel parameter s using the Gaussian kernel function. The "o" symbols define the data points computed as the second difference curve 2200 in operation 1926. A zero crossing line 2206 defines a zero value for the second difference.

As another example, a derivative may be taken of the first derivative equation to define a second derivative equation. The second difference value may be computed for each value for the kernel parameter using the defined second derivative equation.

In operation 1928, a second curve may optionally be fit to the second difference values as a function of the kernel parameter using the second derivative curve fit function indicated in operation 1906. For illustration, a penalized B-spline can be fit to the second difference values computed in operation 1926. A result of fitting the second curve is a second derivative equation that can be used to define the second difference values as a function of the kernel parameter instead of the second derivative values themselves.

Referring again to FIGS. 22A and 22B, a second derivative curve fit line 2202 depicts a curve fit to the second derivative of the optimal objective function values. For illustration, a penalized B-spline curve fit function was used to define second derivative curve fit line 2202 that represents the second curve.

In an operation 1930, a value of the kernel parameters at a first zero crossing of the second difference values is determined when the first value in operation 1910 was the minimum kernel parameter value. A confidence limit may be used to define a value that is considered zero (i.e., 1.0e-6 may be the value of the confidence limit and is considered approximately zero). For example, a first data point of the data points that define second difference curve 2200 that crosses zero is identified.

Figure 22B:
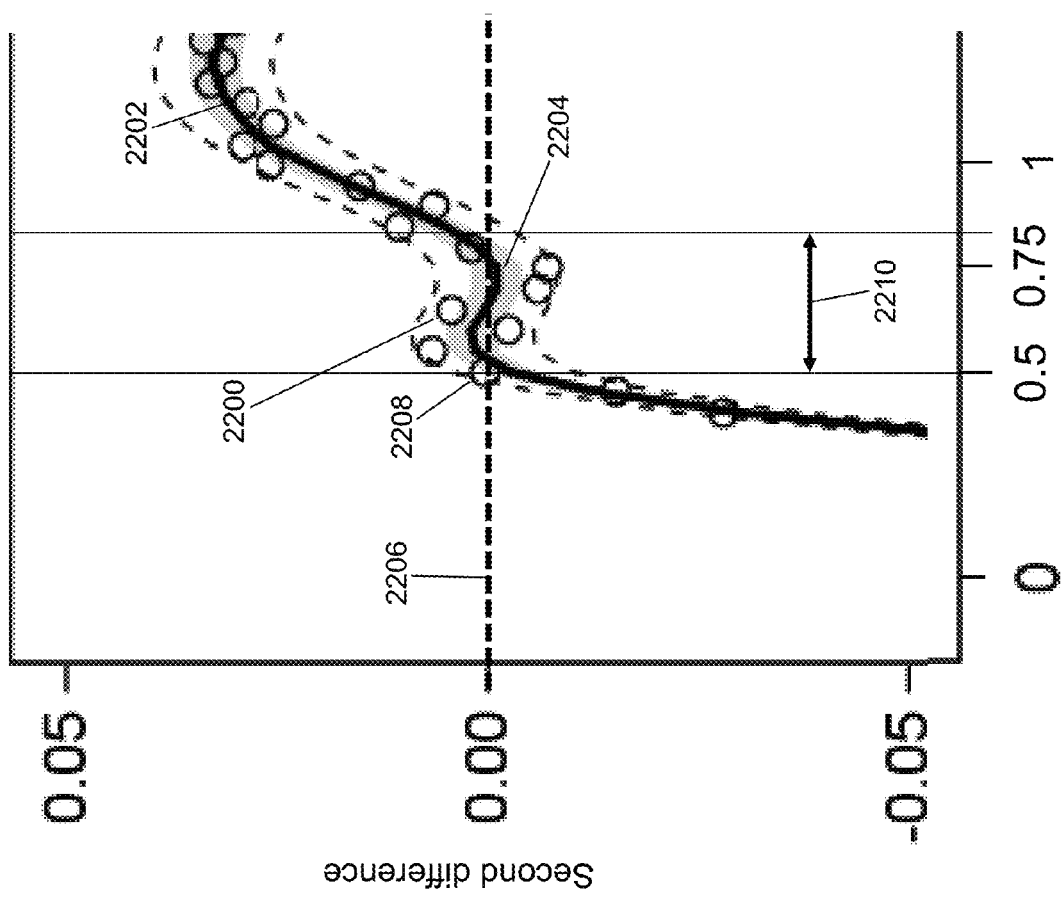
FIG. 22B depicts a zoomed view of a first zero crossing of the second difference of FIG. 22A in accordance with an illustrative embodiment.

Referring to FIG. 22B, for example, a zoomed view of a first zero crossing of the second difference values is shown in accordance with an illustrative embodiment. A first zero crossing data point 2208 may be determined at the kernel parameter value s=0.5.

In an alternative embodiment, the second derivative equation may be used to determine the first zero crossing value of the kernel parameter such as s by solving for the kernel parameter value that results in a first value of zero for the second derivative equation.

Referring to FIG. 20, example operations of training application 122 to determine a range of values for the kernel parameter using the second derivative equation and a confidence limit are described.

In an operation 2000, an eighteenth indicator of a value of a confidence limit CL is received. In an alternative embodiment, the eighteenth indicator may not be received. For example, a default value may be stored, for example, in computer-readable medium 108 and used automatically. In another alternative embodiment, the value of the confidence limit may not be selectable. Instead, a fixed, predefined value may be used.

In an operation 2002, a second difference value $V_2$ associated with the minimum kernel parameter value as a current kernel parameter value is selected. For example, a curve fit value may be computed using the defined second derivative equation with the minimum kernel parameter value.

In an operation 2004, an upper confidence limit $CL_U$ and a lower confidence limit $CL_L$ are computed using the confidence limit and the heuristics computed for the second derivative equation at the current kernel parameter value.

In an operation 2006, a determination is made concerning whether or not the second difference value is between the upper and lower confidence limits. When $CL_L \leq V_2 \leq CL_U$, processing continues in an operation 2008. When $CL_L > V_2$ or $V_2 > CL_U$, processing continues in an operation 2010.

In operation 2008, a start and an end of an optimal value range for the kernel parameter value is defined as the current kernel parameter value, and processing continues in operation 2014.

In operation 2010, a next value of the current kernel parameter value is determined by incrementing the current kernel parameter value using the incremental kernel parameter value.

In an operation 2012, a second difference value $V_2$ associated with the current kernel parameter value is selected and processing continues in operation 2004 to compute new upper and lower confidence limits and determine whether or not the second difference value is between the upper and lower confidence limits.

In an operation 2014, the next value of the current kernel parameter value is determined by incrementing the current kernel parameter value using the incremental kernel parameter value.

In an operation 2016, a second difference value $V_2$ associated with the current kernel parameter value is selected.

In an operation 2018, an upper confidence limit $CL_U$ and a lower confidence limit $CL_L$ are computed using the confidence limit and the heuristics computed for the second derivative equation at the current kernel parameter value.

In an operation 2020, a determination is made concerning whether or not the second difference value is between the upper and lower confidence limits. When $CL_L \leq V_2 \leq CL_U$, processing continues in an operation 2022. When $CL_L > V_2$ or $V_2 > CL_U$, processing continues in an operation 2024.

In operation 2022, a value of the end of the optimal value range for the kernel parameter is updated with the current kernel parameter value. Processing continues in operation 2014 to evaluate the next value of the current kernel parameter value.

In operation 2024, processing is complete for defining a range of values for the kernel parameter as the start and the end of the optimal value range. The optimal value range defines second derivative values within the confidence limit of zero. Processing continues in an operation 1932 shown referring to FIG. 19. The range of values may include a single value for the kernel parameter.

Referring again to FIGS. 22A and 22B, a confidence interval 2204 may define a confidence area about each data point of the second derivative curve fit line 2202 based on the value of the confidence limit and the heuristics computed as part of defining second derivative curve fit line 2202. For illustration, the value of the confidence limit in FIGS. 22A and 22B was 95%.

A range 2210 of values for the kernel parameters was defined as the start and the end of the optimal value range based on the confidence limit of 95% including zero. The value of the kernel parameter s at the first zero crossing was ~0.5 and the value of the kernel parameter s at the last zero crossing was ~0.85. Range 2210 from s=0.5 to s=0.85 defines a range of values for kernel parameters that provide a data boundary that is smooth and captures essential visual features of the data.

From s=0.5 to s=0.85, the second derivative was approximately zero for the first time. Based on a review of FIGS. 17A-17E, value(s) of s between 0.5 and 0.85 provided a data boundary of good quality. The interval [0.5, 0.85] appears to form a set of critical points. To select a single value for the kernel parameter from range 2210, an average can be computed for range 2210 as $$\frac{0.85 - 0.5}{2} + 0.5 = 0.675 \sim 0.7$$

shown in FIG. 17C. This data boundary captures the essential geometric properties of second example dataset 1600 as compared to any other values of s outside the [0.5, 0.85] interval, and this value of s is from the first set of critical points.

Referring again to FIG. 19, in operation 1932, the values stored in operation 114 for the determined kernel parameter value or range of kernel parameter value(s) determined in operation 1930 are identified.

In an operation 1934, the identified values are stored, for example, in computer-readable medium 108, as SVDD 126. For example, SVDD 126 includes the set of support vectors that have $0 < \alpha_i \leq C$, $\alpha_i$ the Lagrange constants for each support vector of the set of support vectors, the center position a, $R^2$, the optimal value, and/or any constant values previously computed and stored for the determined kernel parameter value or range of kernel parameter value(s).

Figure 23A:
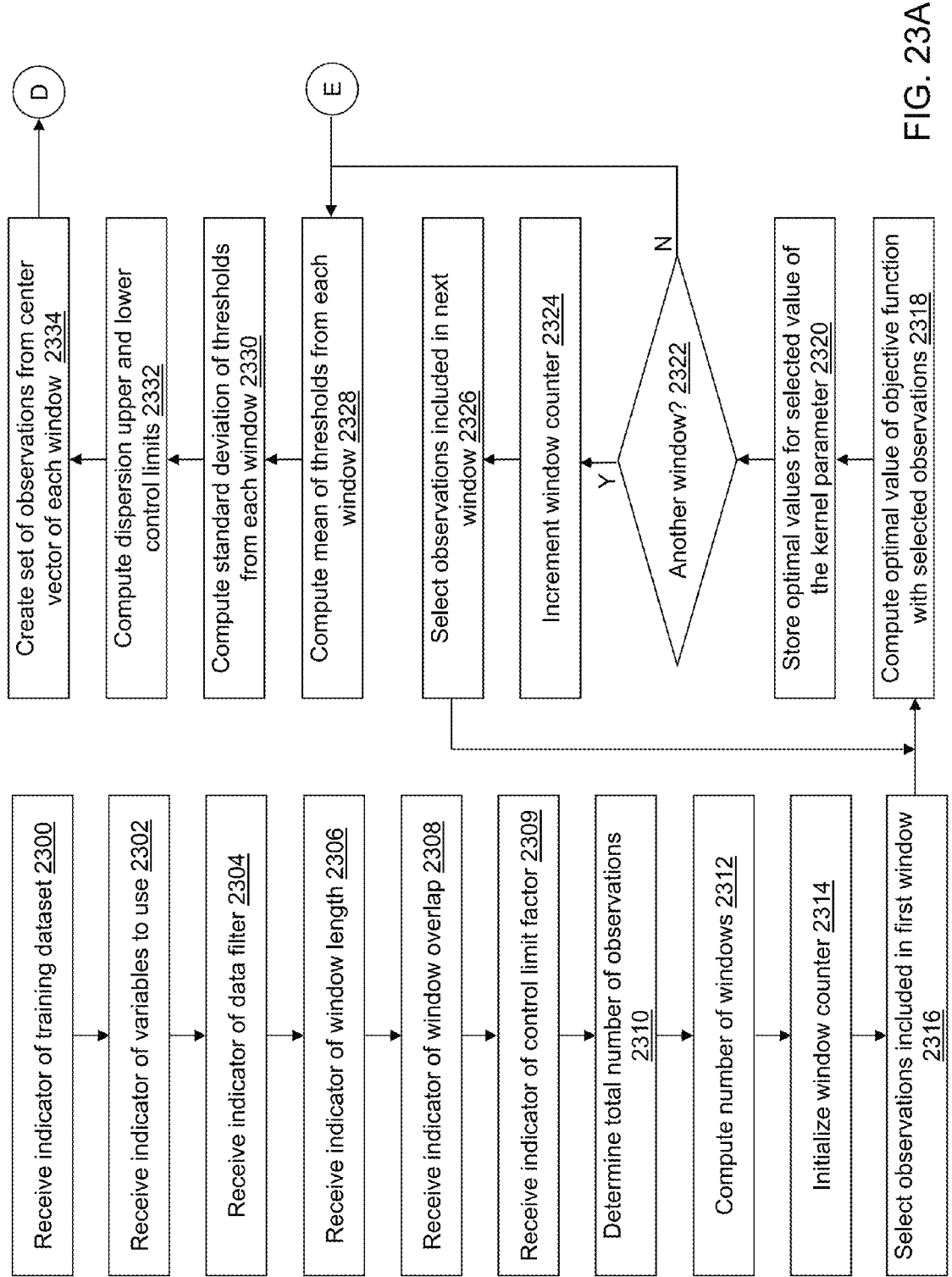
FIGS. 23A and 23B depict a flow diagram illustrating additional examples of operations performed by the SVDD training device of FIG. 1 in accordance with an illustrative embodiment.
Figure 23B:
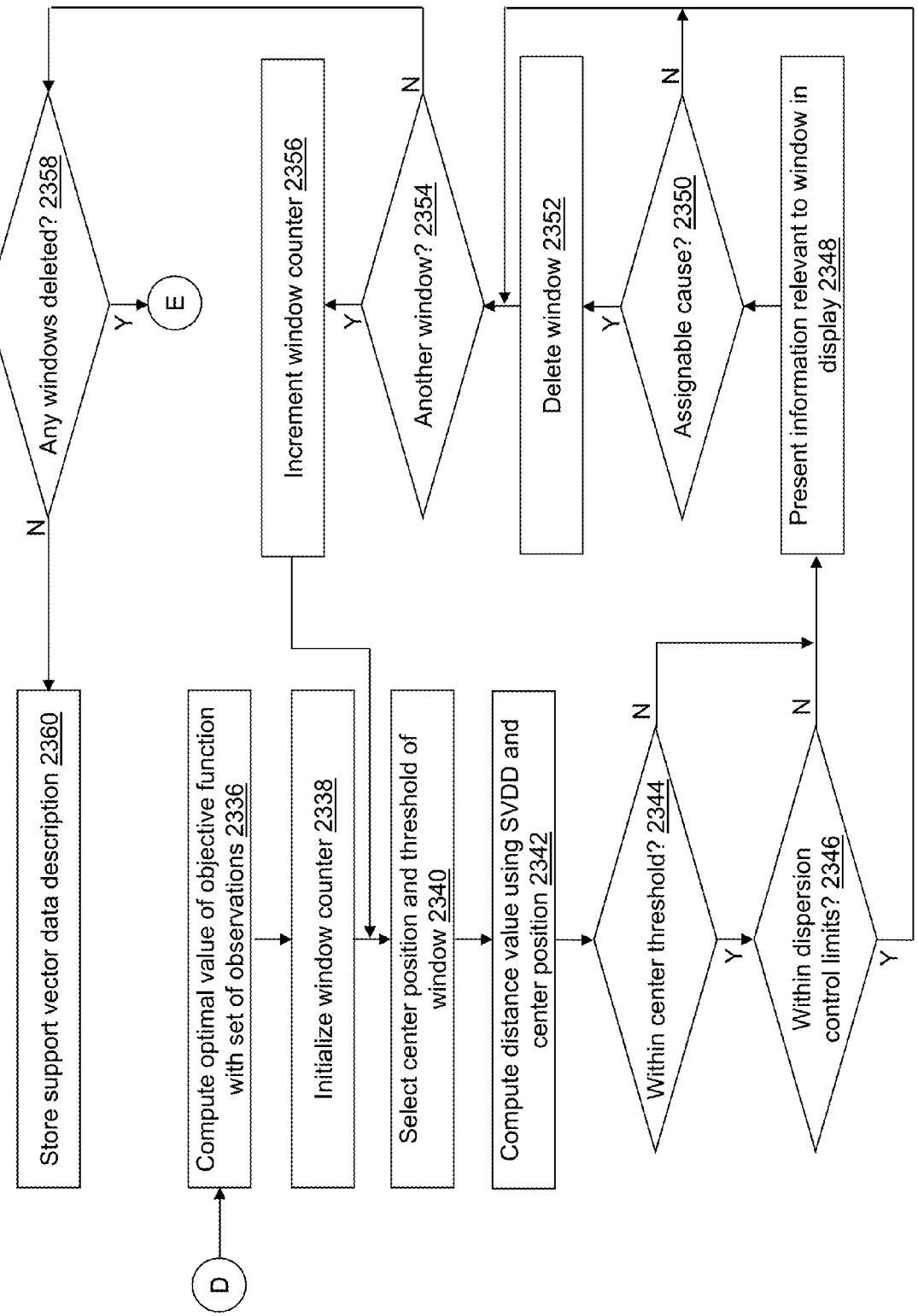

Referring to FIGS. 23A and 23B, additional example operations associated with training application 122 are described. Additional, fewer, or different operations may be performed depending on the embodiment. The order of presentation of the operations of FIGS. 23A and 23B is not intended to be limiting. Although some of the operational flows are presented in sequence, the various operations may be performed in various repetitions, concurrently (in parallel, for example, using threads and/or distributed computing system 128), and/or in other orders than those that are illustrated.

Referring to FIG. 23A, similar to operation 400, in an operation 2300, the first indicator may be received that indicates training dataset 124.

Similar to operation 402, in an operation 2302, the second indicator may be received that indicates the plurality of variables of training dataset 124 to define $x_i$.

Similar to operation 404, in an operation 2304, the third indicator is received that indicates a data filter for a plurality of observations of training dataset 124.

In an operation 2306, a nineteenth indicator may be received that indicates a window length $W_L$. The nineteenth indicator indicates a number of observations to use from training dataset 124 in each window. Each window defines a group of observations used to define a SVDD for that window. In an alternative embodiment, the nineteenth indicator may not be received. For example, a default value may be stored, for example, in computer-readable medium 108 and used automatically. In another alternative embodiment, the value of the window length $W_L$ may not be selectable. Instead, a fixed, predefined value may be used.

In an operation 2308, a twentieth indicator may be received that indicates a window overlap $W_o$. The twentieth indicator indicates a number of observations of overlap between successive windows. In an alternative embodiment, the twentieth indicator may not be received. For example, a default value may be stored, for example, in computer-readable medium 108 and used automatically. In another alternative embodiment, the value of the window overlap $W_o$ may not be selectable. Instead, a fixed, predefined value may be used. For illustration, the window overlap $W_o$ may be selected between $0 \leq W_o < W_L$. Merely for illustration, $W_L=500$ and $W_o=300$ may be selected. As another illustration, $W_L=10,000$ and $W_o=2,000$ may be selected.

In an operation 2309, a twenty-first indicator may be received that indicates a control limit factor $CL_F$. The twenty-first indicator indicates a number of deviations to use in setting a dispersion control limit. In an alternative embodiment, the twenty-first indicator may not be received. For example, a default value may be stored, for example, in computer-readable medium 108 and used automatically. In another alternative embodiment, the value of the control limit factor $CL_F$ may not be selectable. Instead, a fixed, predefined value may be used. For illustration, the control limit factor $CL_F$ may be selected between $2 \leq CL_F \leq 3$ though a different number of deviations may be used to relax ($3 < CL_F$) or narrow ($CL_F < 2$) the control limit.

In an operation 2310, a total number of observations $N_{TO}$ included in training dataset 124 and not excluded by any data filter indicated by the third indicator is determined. For example, total number of observations $N_{TO}$ may be determined by reading training dataset 124, as a received input, as an input read from computer-readable medium 108, etc.

In an operation 2312, a number of windows k is computed as $$k = \left\lfloor \frac{N_{TO}}{W_L - W_o} \right\rfloor + 1.$$

In an operation 2314, a window counter $W_C$ is initialized. For example, $W_C$ may be initialized as $W_C=1$.

In an operation 2316, a first $W_L$ number of observations are selected from training dataset 124.

In an operation 2318, an optimal value for the objective function is computed by optimizing the objective function with the selected $W_L$ observations. For example, equations (1)-(4) and (8) may be used without a kernel function or a kernel parameter value to solve for SV, the set of support vectors that have $0 < \alpha_i \leq C$. Values for the Lagrange constants $\alpha_1$ for each support vector of the set of support vectors, for $R^2$ using equation (8), and for the center position a using equation (4) also may be computed as part of computing the optimal value for the objective function.

As another example, equations (11)-(14) above are used to solve for SV, the set of support vectors that have $0 < \alpha_i \leq C$ in addition to values for the Lagrange constants $\alpha_1$ for each support vector of the set of support vectors, for $R^2$ using equation (14), and for the center position a using equation (4) based on a defined kernel function and kernel parameter.

As yet another example, a kernel function may be defined and a value for the associated kernel parameter determined using the operations of FIG. 19 to solve for SV, the set of support vectors that have $0 < \alpha_i \leq C$ in addition to values for the Lagrange constants $\alpha_i$ for each support vector of the set of support vectors, for $R^2$ using equation (14), and for the center position a using equation (4) based on a defined kernel function and kernel parameter.

As still another example, a kernel function may be defined and a value for the associated kernel parameter input using the operations of FIGS. 4A-4C to solve for SV, the set of support vectors that have $0 < \alpha_i \leq C$ in addition to values for the Lagrange constants $\alpha_i$ for each support vector of the set of support vectors, for $R^2$ using equation (14), and for the center position a using equation (4) based on a defined kernel function and kernel parameter.

In an operation 2320, the set of support vectors that have $0 < \alpha_i \leq C$, $\alpha_i$ the Lagrange constants for each support vector of the set of support vectors, the center position a, and/or $R^2$ are stored, for example, in computer-readable medium 108, in association with the window counter $W_C$. Center position $a_{W_C}$ and threshold $R_{W_C^2}$ may denote the values for each window counter $W_C$.

In an operation 2322, a determination is made concerning whether or not there is another window to process, i.e., $W_C < k$. When $W_C < k$, processing continues in an operation 2324 to process a next window. When $W_C \geq k$, processing continues in an operation 2328.

In operation 2324, the value of $W_C$ is incremented as $W_C = W_C + 1$.

In an operation 2326, a next $W_L$ number of observations are selected from training dataset 124, and processing continues in operation 2318 to compute an SVDD for the current window.

In operation 2328, a mean $\overline{R}^2$ of the $R_i^2$ threshold computed for each window i in operation 2318 is computed as $$\overline{R}^2 = \frac{\sum_{i=1}^{k} R_i^2}{k}.$$

$\overline{R}^2$ may be denoted a mean threshold value.

In an operation 2330, a standard deviation $\sigma_{R^2}$ of the $R_i^2$ threshold computed for each window i in operation 2318 is computed as a $$\sigma_{R^2} = \sqrt{\frac{\sum_{i=1}^{k} \left(R_i^2 - \overline{R}^2\right)^2}{k-1}}.$$

a A suitable function such as logit function may be used to transform $R_i^2$.

In an operation 2332, dispersion upper $U_{DCL}$ and lower $L_{DCL}$ control limits are computed for a dispersion of the k windows where $U_{DCL} = \overline{R}^2 + CL_F \times \sigma_{R^2}$ and $L_{DCL} = \overline{R}^2 - CL_F \times \sigma_{R^2}$.

In an operation 2334, a set of observation vectors is created from the center position $a_i$ computed for each window i in operation 2318.

Referring to FIG. 23B, in an operation 2336, an optimal value for the objective function is computed by optimizing the objective function with the set of observation vectors created in operation 2334 and may be denoted as $SVDD_{center} < SV_{center}, \alpha_{icenter}, R_{center}^2, a^* >$. For example, equations (1)-(4) and (8) may be used without a kernel function or a kernel parameter value to solve for $SV_{center}$, the set of support vectors that have $0 < \alpha_{icenter} \leq C$. Values for the Lagrange constants $\alpha_{icenter}$ for each support vector of $SV_{center}$, for $R_{center}^2$ using equation (8), and for the center position a* using equation (4) also may be computed as part of computing the optimal value for the objective function.

As another example, equations (11)-(13) above are used to solve for $SV_{center}$, the set of support vectors that have $0<\alpha_{icenter}\le C$. in addition to values for the Lagrange constants $\alpha_{icenter}$ for each support vector of $SV_{center}$, for $R_{center}^2$ using equation (14), and for the center position a* using equation (4) based on a defined kernel function and kernel parameter.

As yet another example, a kernel function may be defined and a value for the associated kernel parameter determined using the operations of FIG. 19 to solve for $SV_{center}$, the set of support vectors that have $0<\alpha_{icenter}\le C$. in addition to values for the Lagrange constants $\alpha_{icenter}$ for each support vector of $SV_{center}$, for $R_{center}^2$ using equation (14), and for the center position a* using equation (4) based on a defined kernel function and kernel parameter.

As still another example, a kernel function may be defined and a value for the associated kernel parameter input using the operations of FIGS. 4A-4C to solve for $SV_{center}$, the set of support vectors that have $0<\alpha_{icenter}\le C$. in addition to values for the Lagrange constants $\alpha_{icenter}$ for each support vector of $SV_{center}$, for $R_{center}^2$ using equation (14), and for the center position a* using equation (4) based on a defined kernel function and kernel parameter.

In an operation 2338, window counter $W_C$ is initialized again. For example, $W_C$ may be reinitialized as $W_C=1$.

In an operation 2340, center position $a_{W_C}$ and threshold $R_{W_C}^2$ computed for window $W_C$ in operation 2318 are selected.

In an operation 2342, a distance is computed using $SVDD_{center}$ and $a_{W_C}$ as $dist^2(z)=(z\cdot z)-2\Sigma_{i=1}^{N_{SV}}\alpha_{icenter}(x_i\cdot z)+\Sigma_{i=1}^{N_{SV}}\Sigma_{j=1}^{N_{SV}}\alpha_{icenter}\alpha_{jcenter}(x_i\cdot x_j)$ using equation (9) if no kernel function is selected or as $dist^2(z)=K(z,z)-2\Sigma_{i=1}^{N_{SV}}\alpha_{icenter}K(x_i,z)+\Sigma_{i=1}^{N_{SV}}\Sigma_{j=1}^{N_{SV}}\alpha_{icenter}\alpha_{jcenter}K(x_i,x_j)$ using equation (15) with kernel function $K(z,z)$, where $z=a_{W_C}$, $x_i$ and $x_j$ are selected from $SV_{center}$, $N_{SV}$ is a number of support vectors of $SV_{center}$, and $\alpha_{icenter}$ and $\alpha_{jcenter}$ are the Lagrange constants for the associated support vector of $SV_{center}$. Of course, because some of the segments of $dist^2(z)$ are constant, the values may be stored with $SVDD_{center}$ in operation 2336.

In an operation 2344, a determination is made concerning whether or not the computed distance is within the threshold computed for $SVDD_{center}$ in operation 2336, i.e., $dist^2(z)\le R_{center}^2$. When $dist^2(z)\le R_{center}^2$, processing continues in an operation 2346. When $dist^2(z)>R_{center}^2$, processing continues in an operation 2348.

In operation 2346, a determination is made concerning whether or not threshold $R_{W_C}^2$ is within the dispersion control limits, i.e., $L_{DCL}\le R_{W_C}^2\le U_{DCL}$. When $L_{DCL}\le R_{W_C}^2\le U_{DCL}$, processing continues in an operation 2354. When $L_{DCL}>R_{W_C}^2$ or $R_{W_C}^2>U_{DCL}$, processing continues in operation 2348.

In operation 2348, information relevant to determining an assignable cause for the deviation of window number $W_C$ in either dispersion or relative to the center a* is presented to a user, for example, in display 116 or on printer 120. For example, the observation vectors included in window number $W_C$ may be presented to a user to determine if a value indicates a basis for the deviation, such as a spurious sensor reading.

In an operation 2350, a determination is made concerning whether or not the user identified an assignable cause. When the user identified an assignable cause, processing continues in an operation 2352. When the user failed to identify an assignable cause, processing continues in operation 2354. For example, the user may select a "Yes" button or a "No" button to indicate the determination. As another example, the user may select from a list of potential causes based on the type of data included in the observation vectors to indicate the determination.

In operation 2352, the observation vectors included in window number $W_C$ are deleted because they are not associated with a normal operation of a system from which training dataset 124 was created.

In operation 2354, a determination is made concerning whether or not there is another window to process, i.e., $W_C<k$. When $W_C<k$, processing continues in an operation 2356 to process a next window. When $W_C\ge k$, processing continues in an operation 2358.

In operation 2356, the value of $W_C$ is incremented as $W_C=W_C+1$, and processing continues in operation 2340 to compare center position $a_{W_C}$ and threshold $R_{W_C}^2$ for the current window with the control limits to evaluate whether or not the current window includes observations associated with the normal operation of the system.

In operation 2358, a determination is made concerning whether or not any windows were deleted in operation 2352. When one or more windows were deleted, processing continues in operation 2328 to compute $SVDD_{center}<SV_{center}$, $\alpha_{icenter}$, $R_{center}^2$, a*> without the deleted one or more windows. When no windows were deleted in operation 2352, processing continues in an operation 2360.

Figure 24:
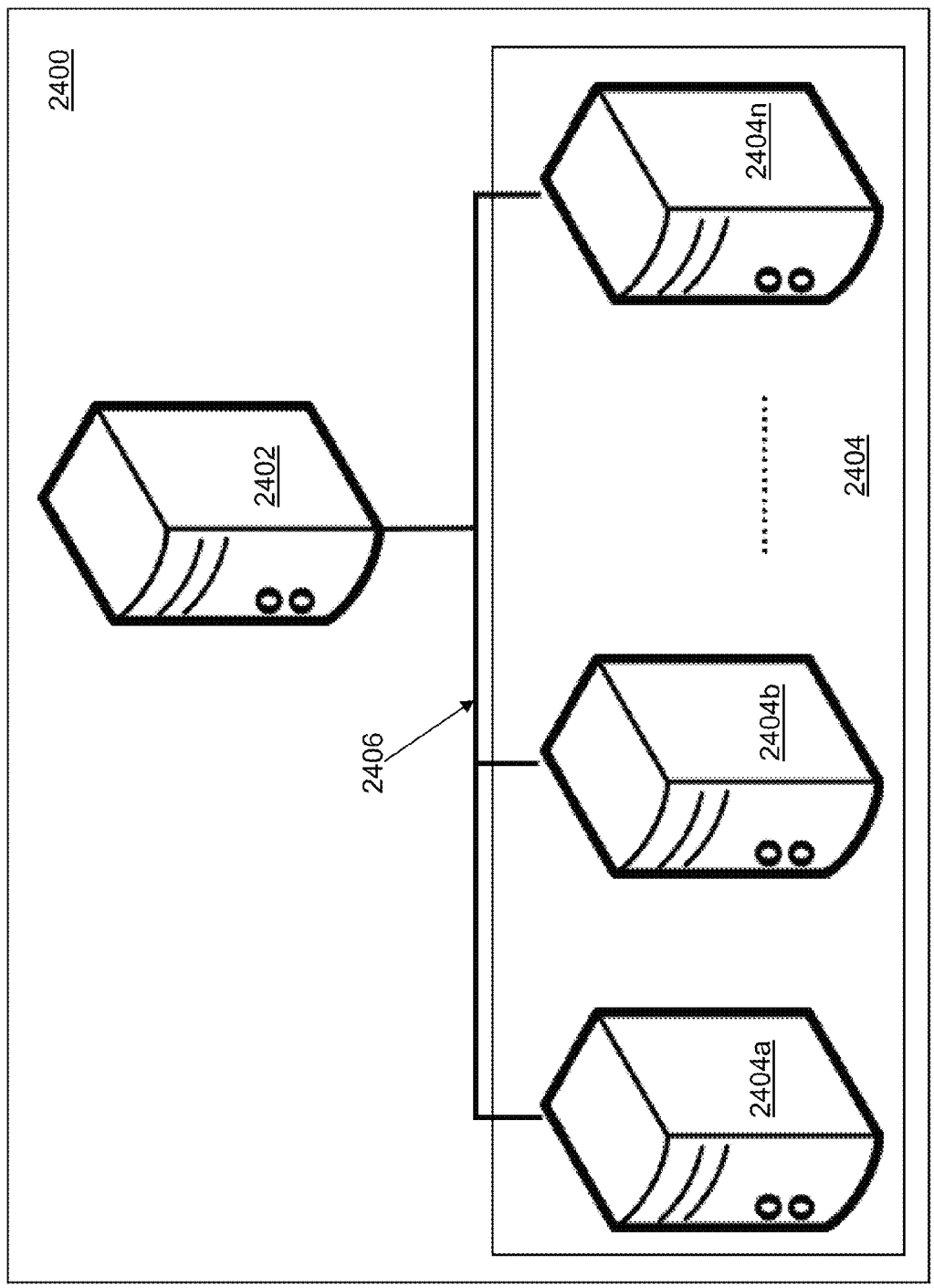
FIG. 24 depicts a block diagram of an SVDD training system in accordance with an illustrative embodiment.

In operation 2360, $SVDD_{center}<SV_{center},\alpha_{icenter},R_{center}^2$, a*>, $L_{DCL}$, $U_{DCL}$, $\bar{R}^2$ and/or $\sigma_{R^2}$ are stored for example, in computer-readable medium 108 as SVDD center 126a, which is an example SVDD 126. Additional constant values computed from $SVDD_{center}$ further may be stored in SVDD center 126a. $SVDD_{center}$ represents an SVDD indicative of a normal operating state of a system that generated data stored in training dataset 124.

Where training dataset 124 is very large, efficiency gains can be realized using a distributed implementation. Referring to FIG. 24, a block diagram of an SVDD training system 2400 is shown in accordance with an illustrative embodiment. In an illustrative embodiment, SVDD training system 2400 may include a controller device 2402, one or more worker devices 2404, and a network 2406. For illustration, the one or more worker devices 2404 may include a first worker device 2404a, a second worker device 2404b, . . . , and an nth worker device 2404n. Controller device 2402 and the one or more worker devices 2404 are in communication through network 2406.

Network 2406 may include one or more networks of the same or different types. Network 2406 can be any type of wired and/or wireless public or private network including a cellular network, a local area network, a wide area network such as the Internet or the World Wide Web, etc. Network 2406 further may comprise sub-networks and consist of any number of communication devices.

Controller device 2402 and the one or more worker devices 2404 may include computers of any form factor such as a server computer, a desktop, a smart phone, a laptop, a personal digital assistant, an integrated messaging device, a tablet computer, etc. For illustration, controller device 2402 and the one or more worker devices 2404 are each an instance of SVDD training device 100. One or more of the operations of FIGS. 23A and 23B may be performed at each worker device of the one or more worker devices 2404; whereas, a subset of the operations of FIGS. 23A and 23B may be performed by controller device 2402 using, for example, interim SVDD 126 computed at each worker device.

Figure 25:
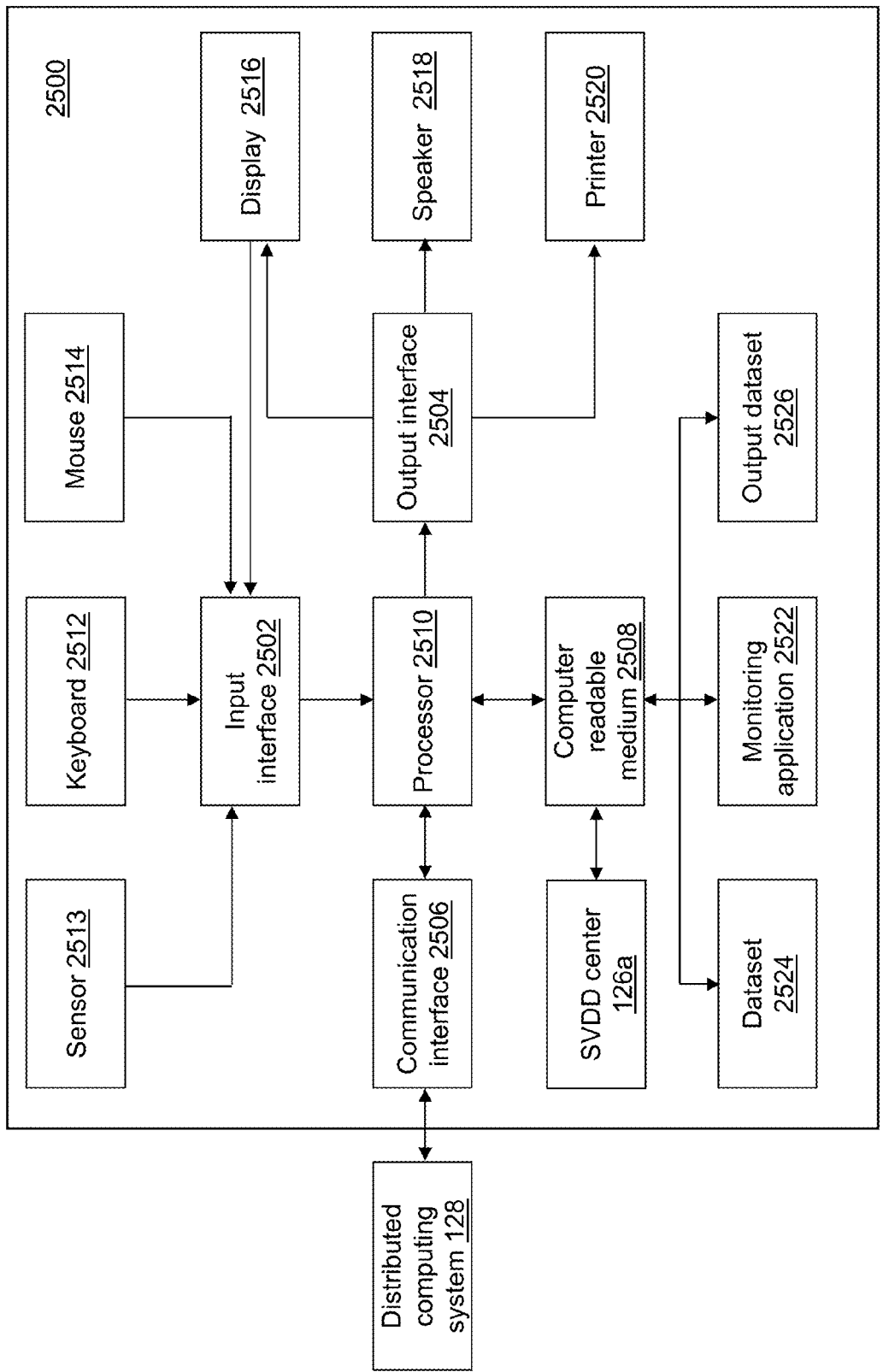
FIG. 25 depicts a block diagram of a monitoring device in accordance with an illustrative embodiment.

Referring to FIG. 25, a block diagram of a monitoring device 2500 is shown in accordance with an illustrative embodiment. Monitoring device 2500 may include a second input interface 2502, a second output interface 2504, a second communication interface 2506, a second non-transitory computer-readable medium 2508, a second processor 2510, monitoring application 2522, SVDD center 126a, a dataset 2524, and an output dataset 2526. Fewer, different, and/or additional components may be incorporated into monitoring device 2500. Monitoring device 2500 and SVDD training device 100 may be the same or different devices.

Second input interface 2502 provides the same or similar functionality as that described with reference to input interface 102 of SVDD training device 100 though referring to monitoring device 2500. Second output interface 2504 provides the same or similar functionality as that described with reference to output interface 104 of SVDD training device 100 though referring to monitoring device 2500. Second communication interface 2506 provides the same or similar functionality as that described with reference to communication interface 106 of SVDD training device 100 though referring to monitoring device 2500. Data and messages may be transferred between monitoring device 2500 and distributed computing system 128 using second communication interface 2506. Second computer-readable medium 2508 provides the same or similar functionality as that described with reference to computer-readable medium 108 of SVDD training device 100 though referring to monitoring device 2500. Second processor 2510 provides the same or similar functionality as that described with reference to processor 110 of SVDD training device 100 though referring to monitoring device 2500.

Monitoring application 2522 performs operations associated with creating output dataset 2526 from data stored in dataset 2524 using $SVDD_{center}$ stored in SVDD center 126a. $SVDD_{center}$ may be used to classify data stored in dataset 2524, to identify outliers in dataset 2524, and to monitor for changes in the data in dataset 2524 that are then stored in output dataset 2526 to support various data analysis functions as well as provide alert/messaging related to the identified outliers and/or monitored data stored in output dataset 2526. Dependent on the type of data stored in training dataset 124 and dataset 2524, output dataset 2526 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in monitoring application 2522. The operations may be implemented using hardware, firmware, software, or any combination of these methods.

Referring to the example embodiment of FIG. 25, monitoring application 2522 is implemented in software (comprised of computer-readable and/or computer-executable instructions) stored in second computer-readable medium 2508 and accessible by second processor 2510 for execution of the instructions that embody the operations of monitoring application 2522. Monitoring application 2522 may be written using one or more programming languages, assembly languages, scripting languages, etc. Monitoring application 2522 may be integrated with other analytic tools. As an example, monitoring application 2522 may be part of an integrated data analytics software application and/or software architecture such as that offered by SAS Institute Inc. of Cary, N.C., USA. For example, monitoring application 2522 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, monitoring application 2522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of monitoring application 2522 further may be performed by an ESPE. Monitoring application 2522 and training application 122 further may be integrated applications.

Monitoring application 2522 may be implemented as a Web application. Monitoring application 2522 may be integrated with other system processing tools to automatically process data generated as part of operation of an enterprise, to identify any outliers in the processed data, to monitor the data, and to provide a warning or alert associated with the outlier identification using second input interface 2502, second output interface 2504, and/or second communication interface 2506 so that appropriate action can be initiated in response to the outlier identification. For example, a warning or an alert may be presented using a second display 2516, a second speaker 2518, a second printer 2520, etc. or sent to one or more computer-readable media, display, speaker, printer, etc. of distributed computing system 128.

Training dataset 124 and dataset 2524 may be generated, stored, and accessed using the same or different mechanisms. Similar to training dataset 124, dataset 2524 may include a plurality of rows and a plurality of columns with the plurality of rows referred to as observations or records, and the columns referred to as variables that are associated with an observation. Dataset 2524 may be transposed.

Similar to training dataset 124, dataset 2524 may be stored on second computer-readable medium 2508 or on one or more computer-readable media of distributed computing system 128 and accessed by monitoring device 2500 using second communication interface 2506. Data stored in dataset 2524 may be a sensor measurement or a data communication value, for example, from a sensor 2513, may be generated or captured in response to occurrence of an event or a transaction, generated by a device such as in response to an interaction by a user with the device, for example, from a second keyboard 2512 or a second mouse 2514, etc. The data stored in dataset 2524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in dataset 2524 may be captured at different time points periodically, intermittently, when an event occurs, etc. One or more columns may include a time value. Similar to training dataset 124, data stored in dataset 2524 may be generated as part of the IoT, and some or all data may be pre- or post-processed by an ESPE.

Similar to training dataset 124, dataset 2524 may be stored in various compressed formats such as a coordinate format, a compressed sparse column format, a compressed sparse row format, etc. Dataset 2524 further may be stored using various structures as known to those skilled in the art including a file system, a relational database, a system of tables, a structured query language database, etc. on SVDD training device 100, on monitoring device 2500, and/or on distributed computing system 128. Monitoring device 2500 and/or distributed computing system 128 may coordinate access to dataset 2524 that is distributed across a plurality of computing devices. For example, dataset 2524 may be stored in a cube distributed across a grid of computers as understood by a person of skill in the art. As another example, dataset 2524 may be stored in a multi-node Hadoop® cluster. As another example, dataset 2524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in dataset 2524.

Figure 26:
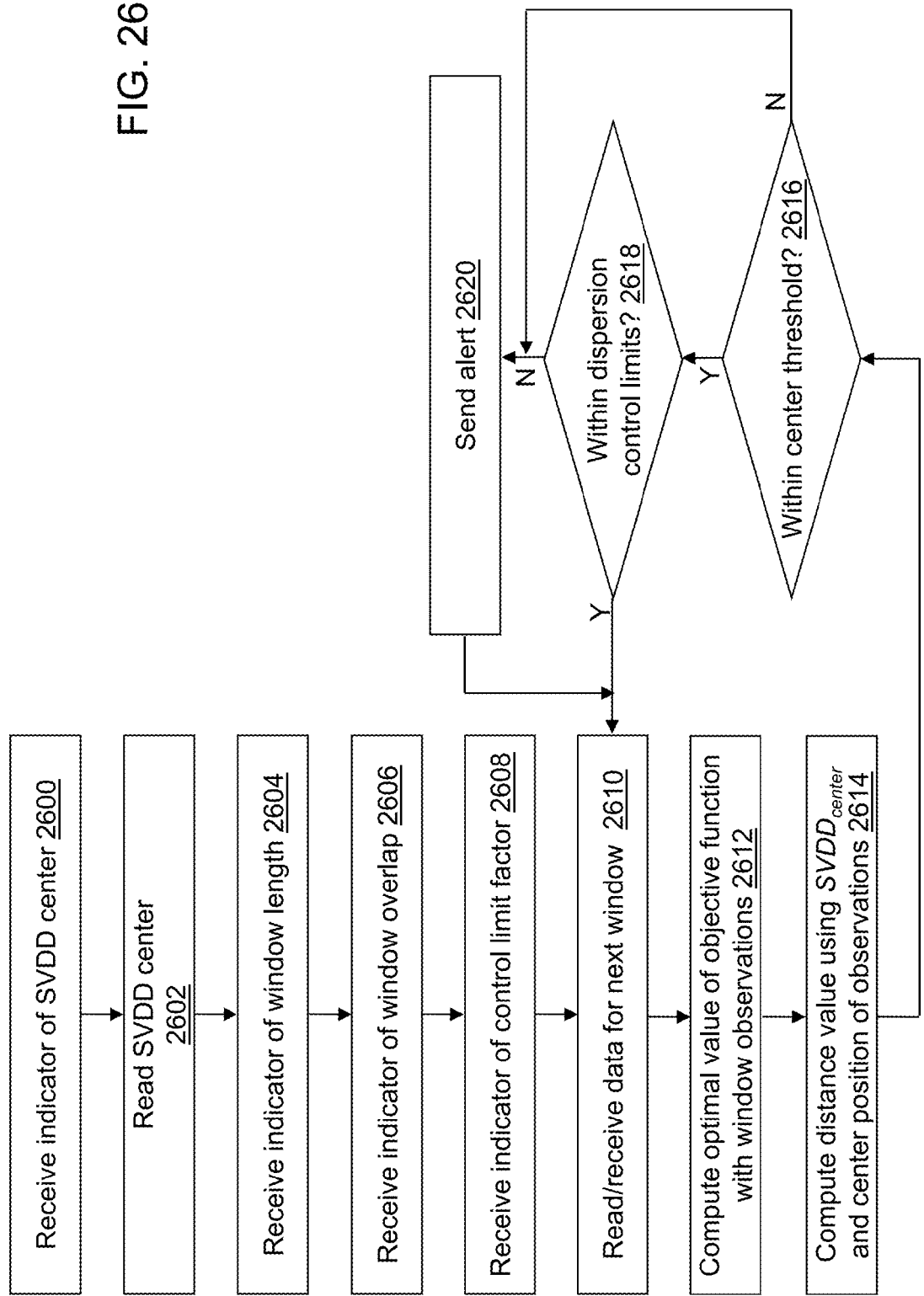
FIG. 26 depicts a flow diagram illustrating examples of operations performed by the monitoring device of FIG. 25 in accordance with an illustrative embodiment.

Referring to FIG. 26, example operations of monitoring application 2522 to use $SVDD_{center}$ to classify dataset 2524 and create output dataset 2526 are described. Additional, fewer, or different operations may be performed depending on the embodiment of monitoring application 2522. The order of presentation of the operations of FIG. 26 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 2600, a twenty-second indicator may be received that indicates SVDD center 126a. For example, the twenty-second indicator indicates where $SVDD_{center} < SV_{center}, \alpha_{icenter}, R_{center}^2, a^*>$ and any other parameters associated with $SVDD_{center}$ were stored in operation 2360.

In an operation 2602, $SVDD_{center} < SV_{center}, \alpha_{icenter}, R_{center}^2, a^*>$ is read from SVDD center 126a.

Similar to operation 2306, in an operation 2604, the nineteenth indicator may be received that indicates the window length $W_L$. The window length $W_L$ further may be read from SVDD center 126a.

Similar to operation 2308, in an operation 2606, the twentieth indicator may be received that indicates the window overlap $W_o$. The window overlap $W_o$, further may be read from SVDD center 126a.

Similar to operation 2309, in an operation 2608, the twenty-first indicator may be received that indicates the control limit factor $CL_F$. The control limit factor $CL_F$ further may be read from SVDD center 126a. The control limit factor $CL_F$ indicated in operation 2309 may the same as or different from the control limit factor $CL_F$ indicated in operation 2606.

In an operation 2610, the plurality of variables to define $x_i$ for a plurality of observations included in a next window are read from dataset 2524 or received, for example, directly or indirectly from sensor 2513, or from distributed computing system 128. Any data filter applied by training application 122 in processing training dataset 124 may be applied. The next window is determined based on a previous window, the window length $W_L$, and the window overlap $W_o$ to define the plurality of observations for the next window.

Monitoring application 2522 may be reading/receiving the plurality of observations as they are being generated or approximately in real-time.

In an operation 2612, an optimal value for the objective function is computed by optimizing the objective function with the plurality of observations included in the next window in operation 2608. The SVDD may be denoted as $SVDD_q < SV_q, \alpha_{iq}, R_q^2, a_q>$, where q is an index to the window. For example, equations (1)-(4) and (8) may be used without a kernel function or a kernel parameter value to solve for $SV_q$, the set of support vectors that have $0<\alpha_{iq} \leq C$. Values for the Lagrange constants $\alpha_{iq}$ for each support vector of the set of support vectors, for $R_q^2$ using equation (8), and for the center position $a_q$ using equation (4) also may be computed as part of computing the optimal value for the objective function.

As another example, equations (11)-(14) above are used to solve for $SV_q$, the set of support vectors that have $0<\alpha_{iq} \leq C$ in addition to values for the Lagrange constants $\alpha_{iq}$ for each support vector of the set of support vectors, for $R_q^2$ using equation (14), and for the center position $a_q$ using equation (4) based on a defined kernel function and kernel parameter. The defined kernel function and kernel parameter may be read from SVDD center 126a.

As still another example, a kernel function may be defined and a value for the associated kernel parameter input using operations 406-482 of FIGS. 4A-4C to solve for $SV_q$, the set of support vectors that have $0<\alpha_{iq} \leq C$ in addition to values for the Lagrange constants $\alpha_{iq}$ for each support vector of the set of support vectors, for $R_q^2$ using equation (14), and for the center position $a_q$ using equation (4) based on a defined kernel function and kernel parameter.

In an operation 2614, a distance is computed using $SVDD_{center}$ and $a_q$ as $dist^2(z)=(z \cdot z)-2 \sum_{i=1}^{N_{SV}} \alpha_{icenter}(x_i \cdot z) + \sum_{i=1}^{N_{SV}} \sum_{j=1}^{N_{SV}} \alpha_{icenter} \alpha_{jcenter}(x_i \cdot x_j)$ using equation (9) if no kernel function is selected or as $dist^2(z)=K(z,z)-2 \sum_{i=1}^{N_{SV}} \alpha_{icenter} K(x_i,z) + \sum_{i=1}^{N_{SV}} \sum_{j=1}^{N_{SV}} \alpha_{icenter} \alpha_{jcenter}(x_i,x_j)$ using equation (15) with kernel function $K(z,z)$, where $z=a_q$, $x_i$ and $x_j$ are selected from $SV_{center}$, $N_{SV}$ is a number of support vectors of $SV_{center}$, and $\alpha_{icenter}$ and $\alpha_{jcenter}$ are the Lagrange constants $\alpha_i$ for each support vector of $SV_{center}$. Of course, because some of the segments of $dist^2(z)$ are constant, the values may be read with $SVDD_{center}$ from SVDD center 126 in operation 2602.

In an operation 2616, a determination is made concerning whether or not the computed distance is within $R_{center}$ of $SVDD_{center}$, i.e., $dist^2(z) \leq R_{center}^2$. When $dist^2(z) \leq R_{center}^2$, processing continues in an operation 2618. When $dist^2(z) > R_{center}^2$, processing continues in an operation 2620. $R_{center}$ represents a threshold distance value from a* of $SVDD_{center}$. Thus, when $dist^2(z) \leq R_{center}^2$, $a_q$, the center of the current SVDD, is within $R_{center}^2$, the threshold distance value of a*, the center vector position of $SVDD_{center}$.

In operation 2618, a determination is made concerning whether or not threshold $R_q^2$ is within the dispersion control limits, i.e., $L_{DCL} \leq R_q^2 \leq U_{DCL}$. When $L_{DCL} \leq R_q^2 \leq U_{DCL}$, processing continues in operation 2610 to evaluate a next window of observations. When $L_{DCL} > R_q^2$ or $R_q^2 > U_{DCL}$, processing continues in operation 2620. $R_q^2$ represents a dispersion of the observation vectors included in window q. Thus, when $L_{DCL} \leq R_q^2 \leq U_{DCL}$, the dispersion is within the control limits defined based on the mean $\bar{R}^2$ and the standard deviation $\sigma_{R^2}$ of the $R_i^2$ threshold computed for each window i identified as a normal operating window in FIGS. 23A and 23B.

In operation 2620, an alert may be sent in response to identification of an outlier. The plurality of observations may be sent to distributed computing system 128, stored in output dataset 2526, output to second display 2516, to second printer 2520, etc. In an illustrative embodiment, an alert message may be sent to another device using second communication interface 2506, printed on second printer 2520 or another printer, presented visually on second display 2516 or another display, presented audibly using second speaker 2518 or another speaker when an outlier is identified.

Processing continues as windows of data are received or read from dataset 2524 until processing is stopped.

There are applications for training application 122 and monitoring application 2522 in areas such as process control and equipment health monitoring. Training dataset 124 and dataset 2524 may include sensor readings measuring multiple key health or process parameters at a very high frequency. For example, a typical airplane currently has 7,000 sensors measuring critical health parameters and creates 2.5 terabytes of data per day. By 2020, this number is expected to triple or quadruple to over 7.5 terabytes. In such applications, multiple $SVDD_{center}$ may be computed with each representing a different operating mode of the equipment or different process settings, for example, using the data filter to process subsets of data to compute center and to use $SVDD_{center}$ associated with that operating mode.

Figure 27:
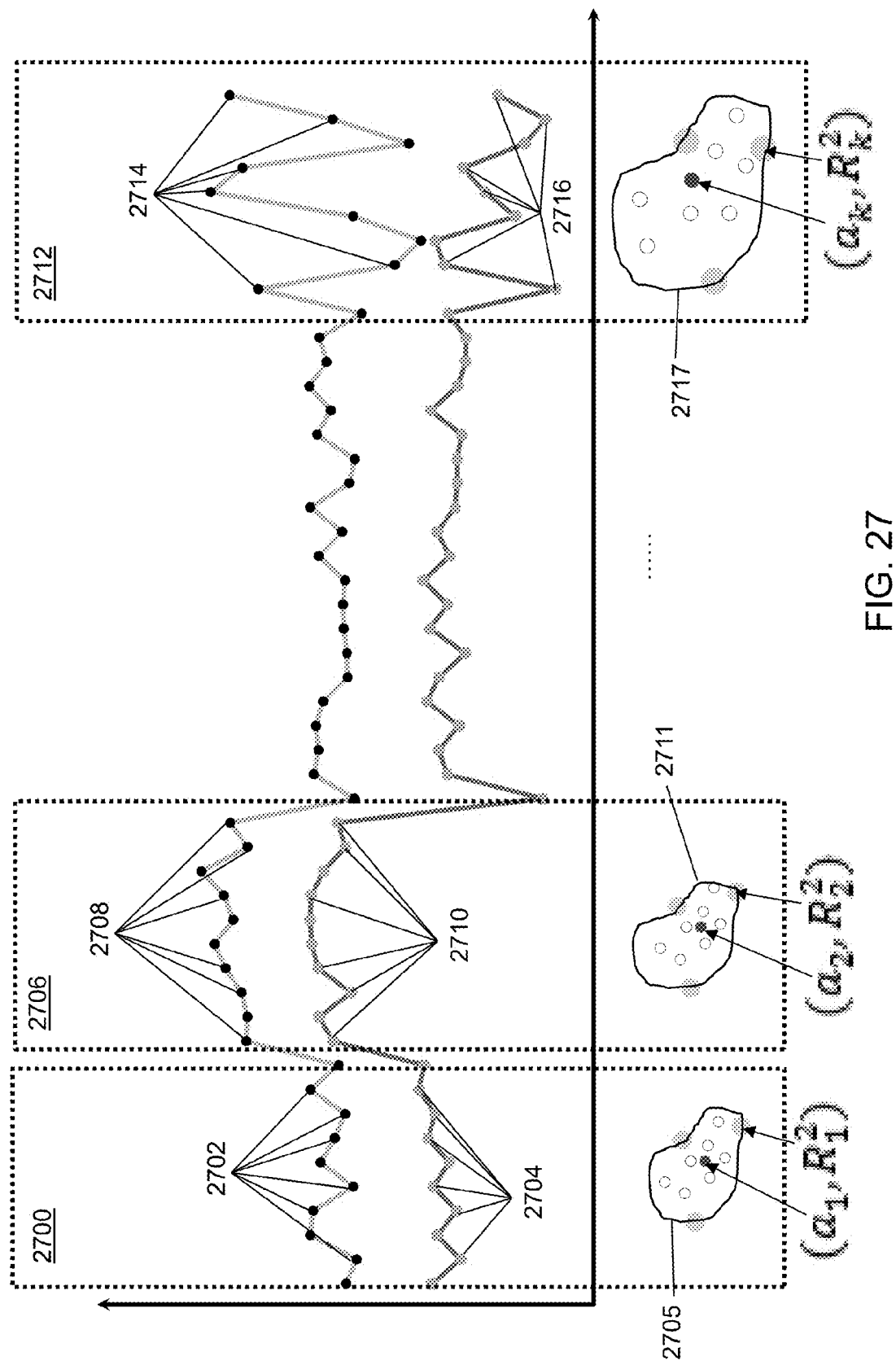
FIG. 27 graphically illustrates a plurality of windows definable by the operations of FIGS. 23A, 23B and 26 in accordance with an illustrative embodiment.

For illustration, of both training application 122 and monitoring application 2522, FIG. 27 shows a plurality of non-overlapping windows. The plurality of non-overlapping windows include a first window 2700, a second window 2706, . . . , a $k^{th}$ window 2712. First window 2700 includes a first plurality of observations 2702 of a first variable $x_1$ and a second plurality of observations 2704 of a second variable $x_2$. Second window 2706 includes a first plurality of observations 2708 of the first variable $x_1$ and a second plurality of observations 2710 of the second variable $x_2$. $k^{th}$ window 2712 includes a first plurality of observations 2714 of the first variable $x_1$ and a second plurality of observations 2716 of the second variable $x_2$. The $a_k$, $R_k^2$ is further shown for illustration in addition to the "o" symbols (filled and unfilled) that denote the $SV_k$ for each window. A first boundary 2705 is defined by $SV_{1<C}$. A second boundary 2711 is defined by $SV_{2<C}$. A $k^{th}$ boundary 2717 is defined by $SV_{k<C}$.

Figure 28:
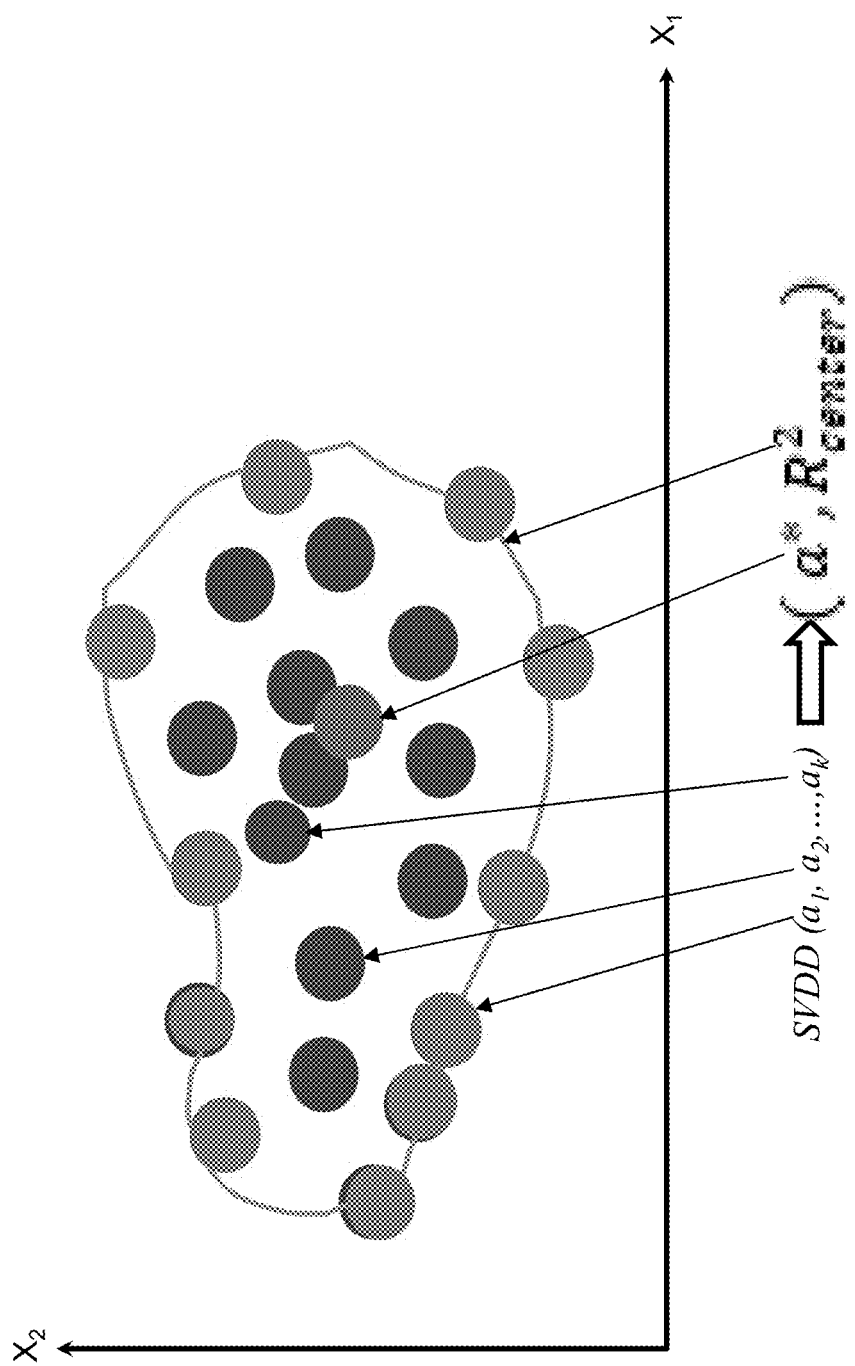
FIG. 28 graphically illustrates an $SVDD_{center}$ computed by the operations of FIGS. 23A and 23B and used by the operations of FIG. 26 in accordance with an illustrative embodiment.

For illustration of training application 122, FIG. 28 illustrates operations 2334 and 2336 of FIGS. 23A and 23B, where each "o" symbol represents a computed center $a_k$ of a window.

Figure 29:
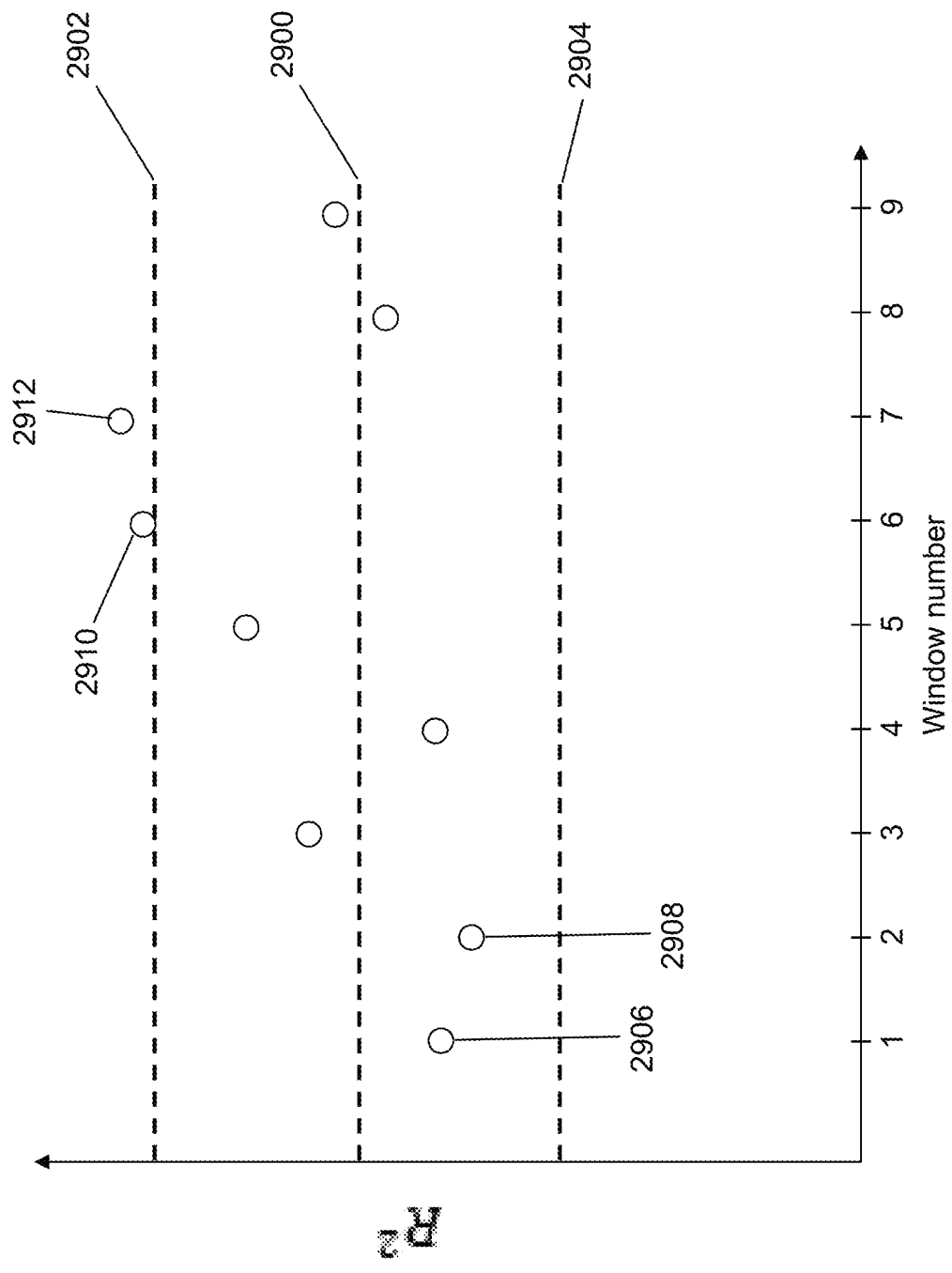
FIG. 29 graphically illustrates application of dispersion control limits in accordance with an illustrative embodiment.

Referring to FIG. 29, $R_k^2$ for window numbers k=1, . . . , 9 are shown plotted with $U_{DCL}$ 2902 and $L_{DCL}$ 2904. A center line 2900 represents a value of $\overline{R}^2$. A first value 2906 of $R_1^2$, a second value 2908 of $R_2^2$, a sixth value 2910 of $R_6^2$, and a seventh value 2912 of $R_7^2$ are shown to illustrate application of operations 2618 and/or 2346. Sixth value 2910 of $R_6^2$ and seventh value 2912 of $R_7^2$ may generate an alert because they exceed $U_{DCL}$ 2902.

Figure 30:
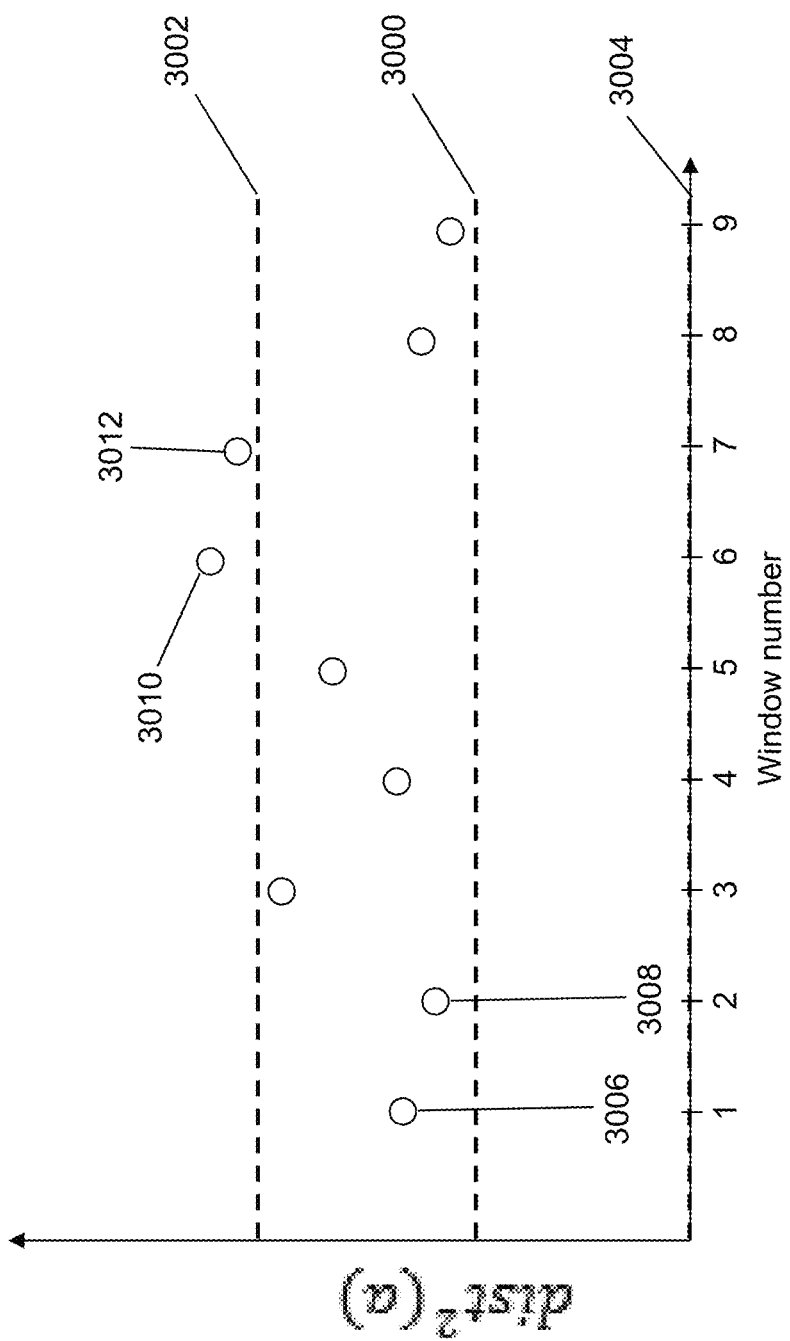
FIG. 30 graphically illustrates application of center threshold control limits in accordance with an illustrative embodiment.

Referring to FIG. 30, $dist^2(a_k)$ for window numbers k=1, . . . , 9 are shown plotted with $$\frac{R_{center}^2}{2} 3000,$$

$R_{center}^2$ 3002, and a zero line 3004. A first value 3006 of $dist^2(a_1)$, a second value 3008 of $dist^2(a_2)$, a sixth value 3010 of $dist^2(a_6)$, and a seventh value 3012 of $dist^2(a_7)$ are shown to illustrate application of operations 2616 and/or 2344.

Again, sixth value 3010 of $dist^2(a_6)$ and seventh value 3012 of $dist^2(a_7)$ may generate an alert because they exceed $R_{center}^2$ 3002.

Figure 31:
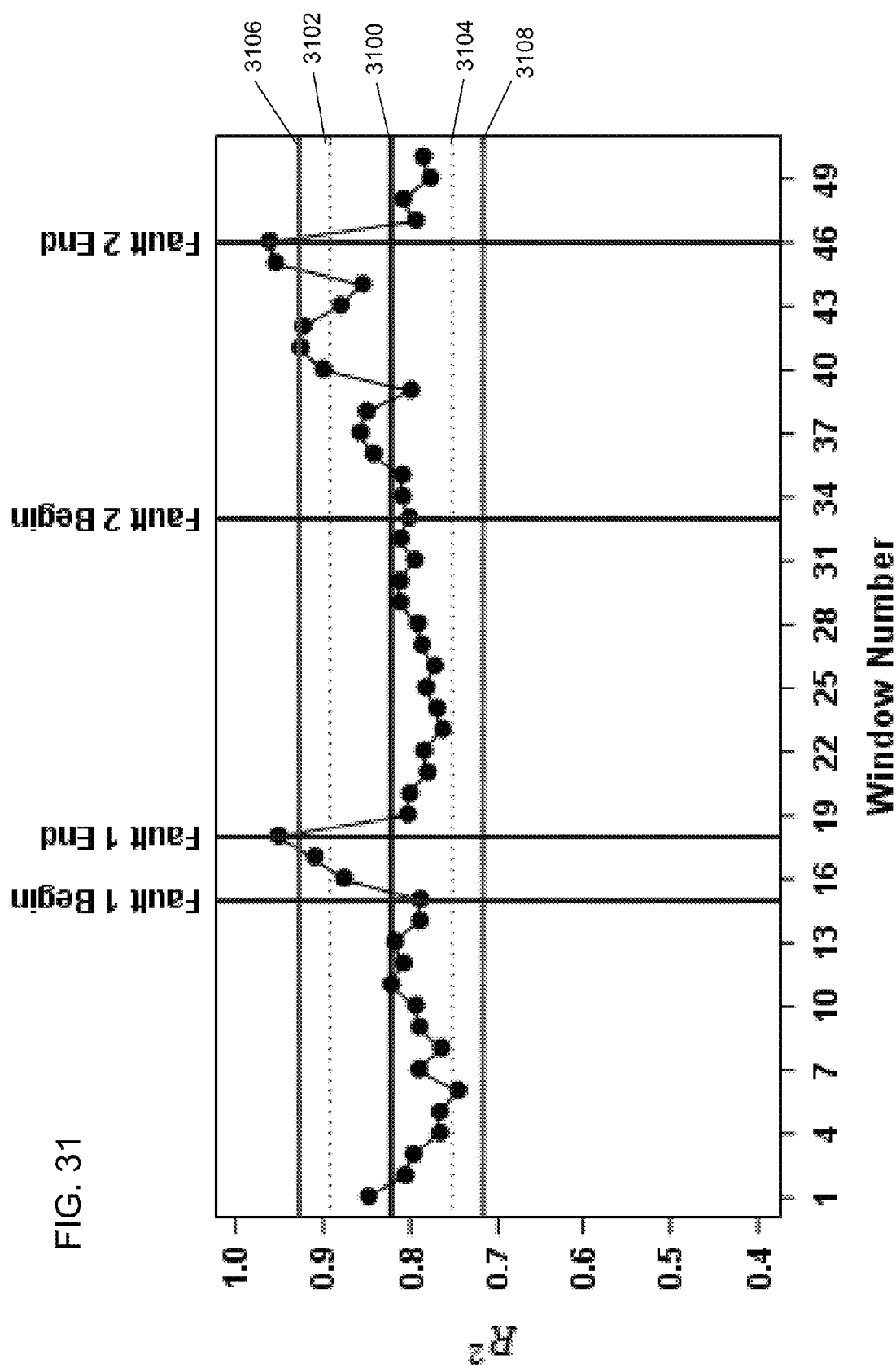
FIG. 31 graphically illustrates application of dispersion control limits computed for a Tennessee Eastman dataset to identify equipment faults in accordance with an illustrative embodiment.
Figure 32:
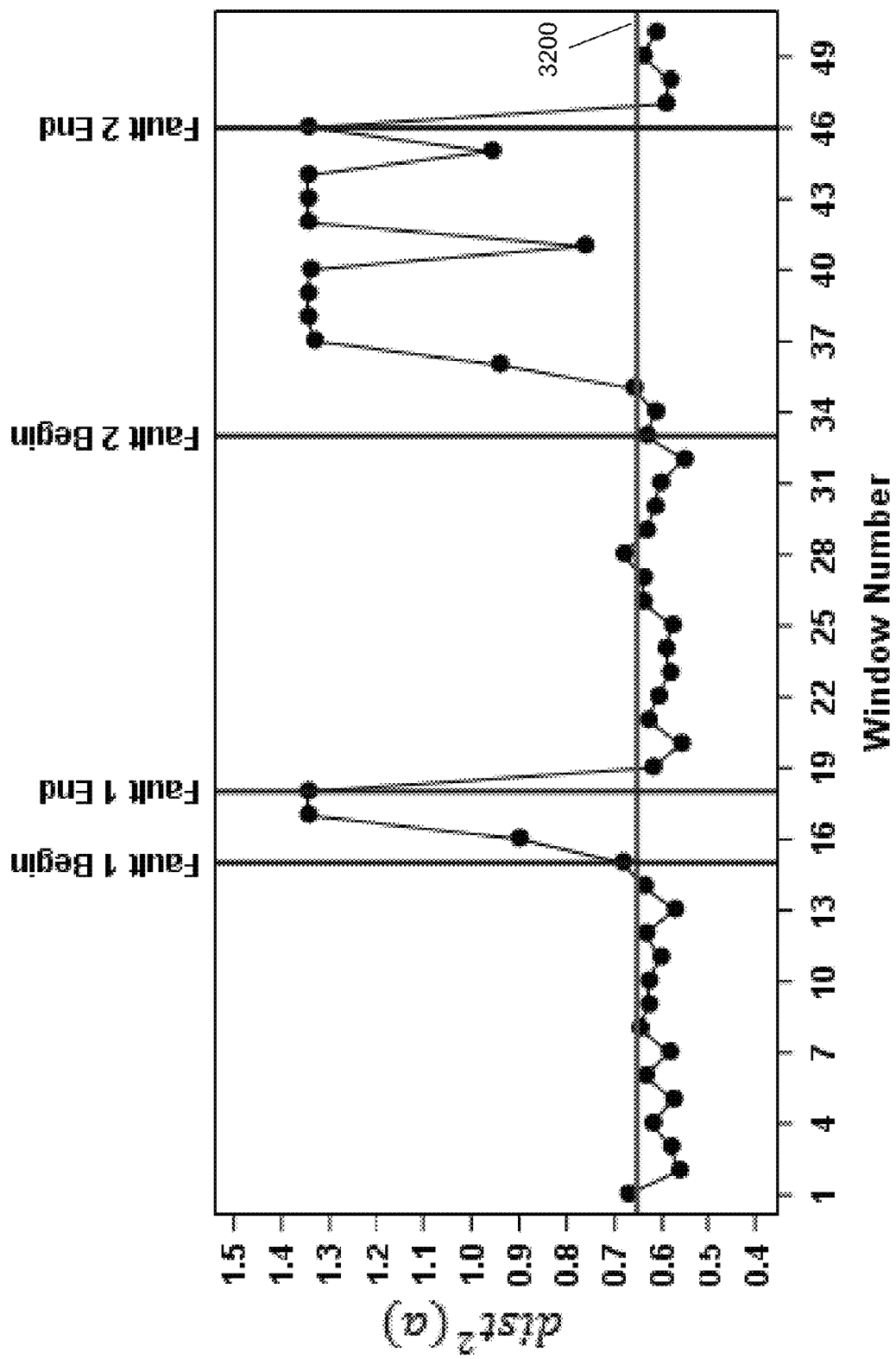
FIG. 32 graphically illustrates application of center threshold control limits computed for a Tennessee Eastman dataset to identify equipment faults in accordance with an illustrative embodiment.

Referring to FIG. 31, $R_k^2$ for window numbers k=1, . . . , 50 are shown plotted with a center line 3100 that represents a value of $\overline{R}^2$, a first $U_{DCL}$ 3102, a first $L_{DCL}$ 3104, a second $U_{DCL}$ 3106, and a first $L_{DCL}$ 3108. Referring to FIG. 32, $dist^2(a_k)$ for window numbers k=1, . . . , 50 are shown plotted with a threshold line 3200 that represents a value of $\overline{R}^2$. For illustration, first $U_{DCL}$ 3102 and first $L_{DCL}$ 3104 were computed using the control limit factor $CL_F=2$; whereas, second $U_{DCL}$ 3106 and second $L_{DCL}$ 3108 were computed using the control limit factor $CL_F=3$. The plurality of observations within each window included data captured during execution of a Tennessee Eastman process. Actual fault 1 beginning and ending windows and actual fault 2 beginning and ending windows are indicated in both FIGS. 31 and 32. In the illustrative example, application of $dist^2(a_k)$ by monitoring application 2522 identified a majority of the duration of both fault windows. Each window may be associated with a start time and an end time to define, for example, a date and time and duration of each fault.

Figure 33:
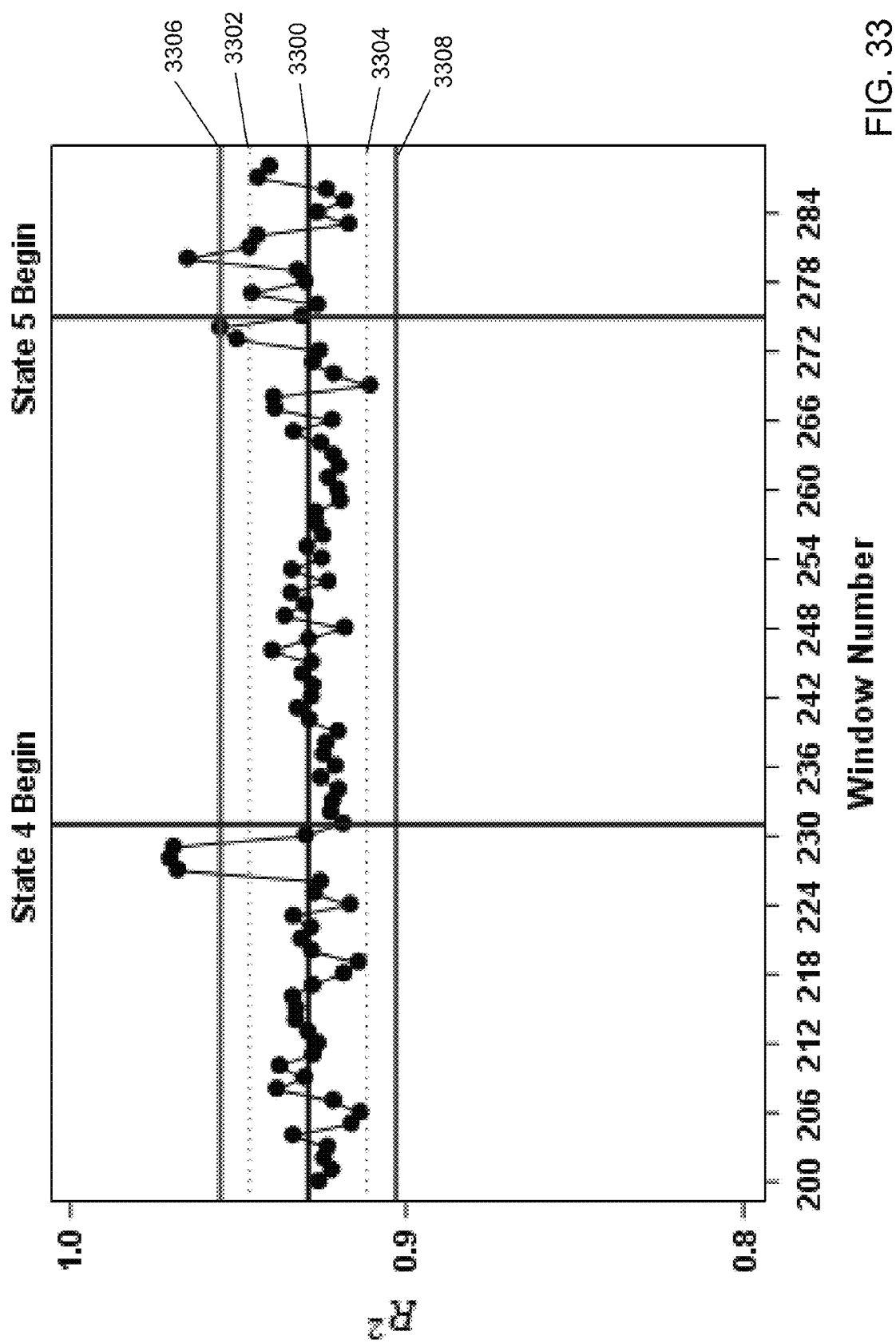
FIG. 33 graphically illustrates application of dispersion control limits computed for a shuttle dataset to identify state changes of the shuttle in accordance with an illustrative embodiment.
Figure 34:
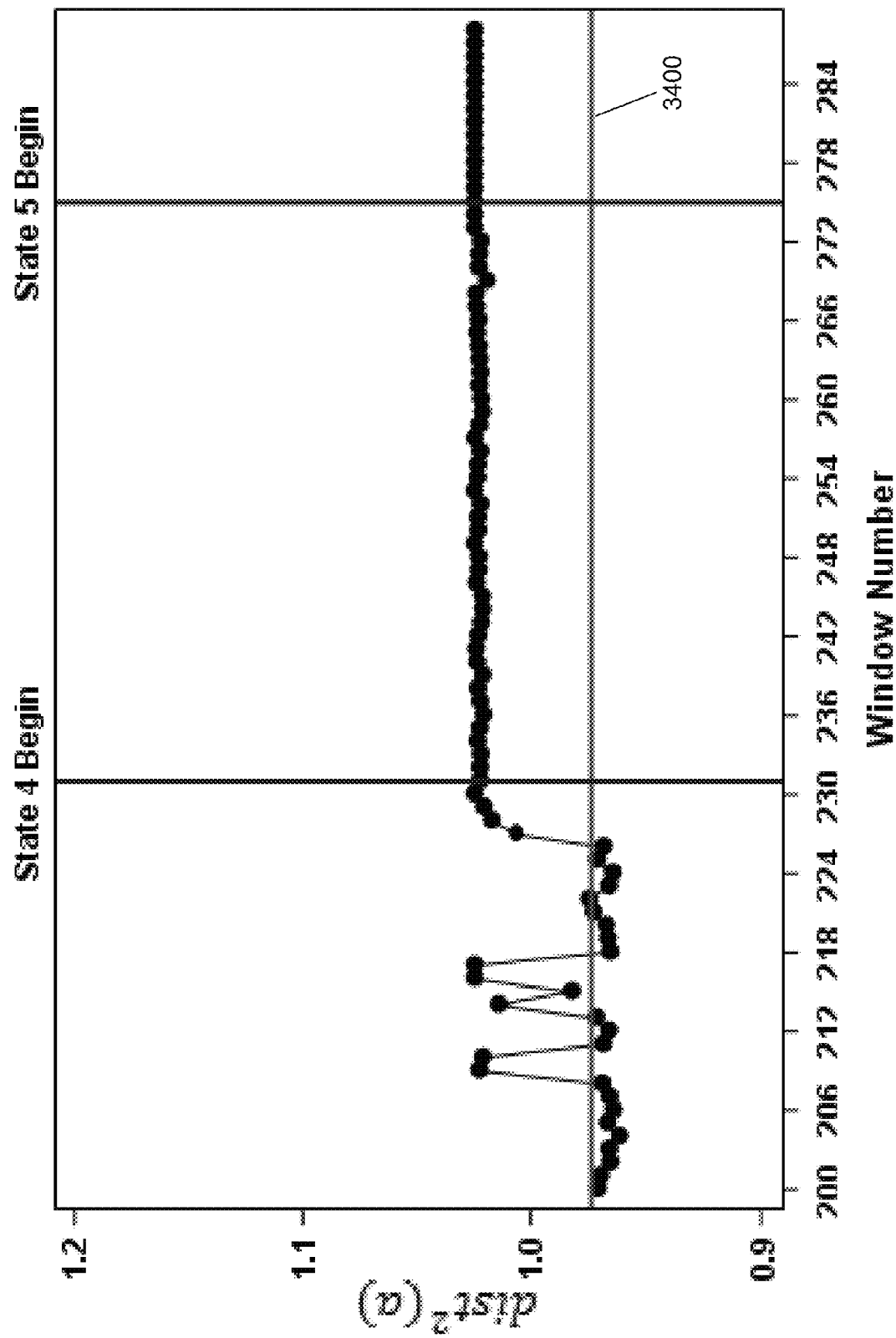
FIG. 34 graphically illustrates application of center threshold control limits computed for a shuttle dataset to identify state changes of the shuttle in accordance with an illustrative embodiment.

Referring to FIG. 33, $R_k^2$ for window numbers k=200, . . . , 290 are shown plotted with a center line 3300 that represents the threshold value $\overline{R}^2$, a first $U_{DCL}$ 3302, a first $L_{DCL}$ 3304, a second $U_{DCL}$ 3306, and a first $L_{DCL}$ 3308. Referring to FIG. 34, $dist^2(a_k)$ for window numbers k=200, . . . , 290 are shown plotted with a threshold line 3300 that represents a value of $\overline{R}^2$. For illustration, first $U_{DCL}$ 3302 and first $L_{DCL}$ 3304 were computed using the control limit factor $CL_F=2$; whereas, second $U_{DCL}$ 3306 and second $L_{DCL}$ 3308 were computed using the control limit factor $CL_F=3$. The plurality of observations within each window included data representing nine numeric attributes and one class attribute that indicated a state a space radiator subsystem of the shuttle. Actual state 4 beginning and ending windows and actual state 5 beginning and ending windows are indicated in both FIGS. 33 and 34. In the illustrative example, application of $dist^2(a_k)$ by monitoring application 2522 identified a majority of the duration of both state windows.

Monitoring application 2522 identifies when data generated by a process being monitored deviates from a normal operating condition. $SVDD_{center}$ defines the normal operating condition against which new windows of data are compared. Monitoring application 2522 identifies a fault, a disturbance, a state change, etc. approximately at onset for approximately a duration of the fault, disturbance, state change, etc. Monitoring application 2522 simultaneously monitors a process center and spread or dispersion of the process relative to a normal operation. The fast training provided by training application 122 and the fast identification provided by monitoring application 2522 allows computation on the edge and may reduce transmission costs in an IoT application where data is only sent when it is identified as operating outside the normal operating condition. Training application 122 and monitoring application 2522 are effective in environments generating high frequency data. In some scenarios, window statistics may remain within the limits, but a trend may indicate a process change due to an assignable cause.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a set of support vectors, a Lagrange constant for each support vector of the set of support vectors, a center threshold value, an upper control limit value, and a lower control limit value, wherein the set of support vectors define a normal operating condition of a system, wherein the center threshold value, the upper control limit value, and the lower control limit value are computed from the set of support vectors and the plurality of Lagrange constants;
   receive a first plurality of observation vectors, wherein a number of the first plurality of observation vectors is a predefined window length;
   compute a window threshold value and a window center vector by solving an objective function defined for a support vector data description (SVDD) model using the received first plurality of observation vectors;
   compute a window distance value between the window center vector and the set of support vectors using the set of support vectors and the plurality of Lagrange constants;
   when the computed distance value is greater than the center threshold value, identify the first plurality of observation vectors as an outlier relative to the normal operating condition of the system;
   when the computed window threshold value is greater than the upper control limit value, identify the first plurality of observation vectors as the outlier relative to the normal operating condition of the system;
   when the computed window threshold value is less than the lower control limit value, identify the first plurality of observation vectors as the outlier relative to the normal operating condition of the system; and
   when the first plurality of observation vectors are identified as the outlier, output an alert.

2. The non-transitory computer-readable medium of claim 1, wherein outputting the alert comprises sending a message to a second computing device, wherein the message indicates that a system fault has occurred or that a system state has changed.

3. The non-transitory computer-readable medium of claim 2, wherein the predefined window length is associated with a start time and an end time, wherein outputting the alert comprises presenting an indicator of the start time and the end time.

4. The non-transitory computer-readable medium of claim 1, wherein outputting the alert comprises sending the first plurality of observation vectors to a second computing device.

5. The non-transitory computer-readable medium of claim 1, wherein outputting the alert comprises presenting the first plurality of observation vectors on a display.

6. The non-transitory computer-readable medium of claim 1, wherein outputting the alert comprises presenting the computed distance value or the computed window threshold value on a display.

7. The non-transitory computer-readable medium of claim 1, wherein the distance value is computed using $\text{dist}^2(z) = K(z,z) - 2\sum_{i=1}^{N} \alpha_i K(x_i, z) + \sum_{i=1}^{N} \sum_{j=1}^{N} \alpha_i \alpha_j K(x_i, x_j)$, where $z$ is the window center vector, $x_i$ and $x_j$ are a support vector of the set of support vectors, $\alpha_i$ and $\alpha_j$ are the Lagrange constant for the associated support vector, $N$ is a number of support vectors of the set of support vectors, and $K(\ )$ is a kernel function.

8. The non-transitory computer-readable medium of claim 1, wherein the distance value is computed using $\text{dist}^2(z) = (z \cdot z) - 2\sum_{i=1}^{N} \alpha_i (x_i \cdot z) + \sum_{i=1}^{N} \sum_{j=1}^{N} \alpha_i \alpha_j (x_i \cdot x_j)$, where $z$ is the window center vector, $x_i$ and $x_j$ are a support vector of the set of support vectors, $\alpha_i$ and $\alpha_j$ are the Lagrange constant for the associated support vector, and $N$ is a number of support vectors of the set of support vectors.

9. The non-transitory computer-readable medium of claim 1, wherein the set of support vectors are computed from a plurality of windows of data, wherein each window of data of the plurality of windows of data includes a second plurality of observation vectors.

10. The non-transitory computer-readable medium of claim 9, wherein the upper control limit value is computed using $U_{DCL} = \overline{R}^2 + CL_F \times \sigma_{R^2}$, where $\overline{R}^2$ is a mean of a plurality of threshold values, $CL_F$ is a control limit factor, and $\sigma_{R^2}$ is a standard deviation of the plurality of threshold values, wherein each threshold value of the plurality of threshold values is computed for each window of data.

11. The non-transitory computer-readable medium of claim 10, wherein the lower control limit value is computed using $L_{DCL} = \overline{R}^2 - CL_F \times \sigma_{R^2}$.

12. The non-transitory computer-readable medium of claim 10, wherein each threshold value for each window of data is computed by solving the objective function defined for the SVDD model using the second plurality of observation vectors for each window of data to define a second set of support vectors for each window of data.

13. The non-transitory computer-readable medium of claim 12, wherein each threshold value is computed using $R^2 = K(x_k, x_k) - 2\sum_{i=1}^{N} \alpha_i K(x_i, x_k) + \sum_{i=1}^{N} \sum_{j=1}^{N} \alpha_i \alpha_j K(x_i, x_j)$, where $x_k$ is any support vector of the second set of support vectors that have $0 < \alpha_i < C$, $x_i$ and $x_j$ are a support vector of the second set of support vectors, $\alpha_i$ and $\alpha_j$ are the Lagrange constant of the associated support vector, $N$ is a number of support vectors included in the second set of support vectors, and $C$ is a penalty constant.

14. The non-transitory computer-readable medium of claim 12, wherein each threshold value is computed using $R^2 = x_k \cdot x_k - 2\sum_{i=1}^{N} \alpha_i (x_i \cdot x_k) + \sum_{i=1}^{N} \sum_{j=1}^{N} \alpha_i \alpha_j (x_i \cdot x_j)$, where $x_k$ is any support vector of the second set of support vectors that have $0 < \alpha_i < C$, $x_i$ and $x_j$ are a support vector of the second set of support vectors, $\alpha_i$ and $\alpha_j$ are the Lagrange constant of the associated support vector, $N$ is a number of support vectors included in the second set of support vectors, and $C$ is a penalty constant.

15. The non-transitory computer-readable medium of claim 13, wherein the center threshold value is computed using $R^2=K(x_k,x_k)-2\sum_{i=1}^{N}\alpha_i K(x_i,x_k)+\sum_{i=1}^{N}\sum_{j=1}^{N}\alpha_i\alpha_j K(x_i,x_j)$, where $x_k$ is any support vector of the set of support vectors that have $0<\alpha_i<C$, $x_i$ and $x_j$ are a support vector of the set of support vectors, $\alpha_i$ and $\alpha_j$ are the Lagrange constant of the associated support vector, N is a number of support vectors included in the set of support vectors, and C is a penalty constant.

16. The non-transitory computer-readable medium of claim 14, wherein the center threshold value is computed using $R^2=(x_k \cdot x_k)-2\sum_{i=1}^{N}\alpha_i(x_i \cdot x_k)+\sum_{i=1}^{N}\sum_{j=1}^{N}\alpha_i\alpha_j(x_i \cdot x_j)$, where $x_k$ is any support vector of the set of support vectors that have $0<\alpha_i<C$, $x_i$ and $x_j$ are a support vector of the set of support vectors, $\alpha_i$ and $\alpha_j$ are the Lagrange constant of the associated support vector, N is a number of support vectors included in the set of support vectors, and C is a penalty constant.

17. The non-transitory computer-readable medium of claim 1, wherein the set of support vectors are computed by sampling from a plurality of windows of data, wherein each window of data of the plurality of windows of data includes a second plurality of observation vectors.

18. The non-transitory computer-readable medium of claim 1, wherein solving the objective function defined for the SVDD model using the received first plurality of observation vectors comprises sampling the received first plurality of observation vectors.

19. A computing device comprising:
a processor; and
a non-transitory computer-readable medium operably coupled to the processor, the computer-readable medium having computer-readable instructions stored thereon that, when executed by the processor, cause the computing device to
receive a set of support vectors, a Lagrange constant for each support vector of the set of support vectors, a center threshold value, an upper control limit value, and a lower control limit value, wherein the set of support vectors define a normal operating condition of a system, wherein the center threshold value, the upper control limit value, and the lower control limit value are computed from the set of support vectors and the plurality of Lagrange constants;
receive a first plurality of observation vectors, wherein a number of the first plurality of observation vectors is a predefined window length;
compute a window threshold value and a window center vector by solving an objective function defined for a support vector data description (SVDD) model using the received first plurality of observation vectors;
compute a window distance value between the window center vector and the set of support vectors using the set of support vectors and the plurality of Lagrange constants;
when the computed distance value is greater than the center threshold value, identify the first plurality of observation vectors as an outlier relative to the normal operating condition of the system;
when the computed window threshold value is greater than the upper control limit value, identify the first plurality of observation vectors as the outlier relative to the normal operating condition of the system;
when the computed window threshold value is less than the lower control limit value, identify the first plurality of observation vectors as the outlier relative to the normal operating condition of the system; and
when the first plurality of observation vectors are identified as the outlier, output an alert.

20. The computing device of claim 19, wherein outputting the alert comprises sending a message to a second computing device, wherein the message indicates that a system fault has occurred or that a system state has changed.

21. The computing device of claim 20, wherein the predefined window length is associated with a start time and an end time, wherein outputting the alert comprises presenting an indicator of the start time and the end time.

22. The computing device of claim 19, wherein outputting the alert comprises sending the first plurality of observation vectors to a second computing device.

23. The computing device of claim 19, wherein outputting the alert comprises presenting the first plurality of observation vectors on a display.

24. The computing device of claim 19, wherein outputting the alert comprises presenting the computed distance value or the computed window threshold value on a display.

25. A method of determining a support vector data description for outlier identification, the method comprising:
receiving a set of support vectors, a Lagrange constant for each support vector of the set of support vectors, a center threshold value, an upper control limit value, and a lower control limit value, wherein the set of support vectors define a normal operating condition of a system, wherein the center threshold value, the upper control limit value, and the lower control limit value are computed from the set of support vectors and the plurality of Lagrange constants;
receiving a first plurality of observation vectors, wherein a number of the first plurality of observation vectors is a predefined window length;
computing, by a computing device, a window threshold value and a window center vector by solving an objective function defined for a support vector data description (SVDD) model using the received first plurality of observation vectors;
computing, by the computing device, a window distance value between the window center vector and the set of support vectors using the set of support vectors and the plurality of Lagrange constants;
when the computed distance value is greater than the center threshold value, identifying, by the computing device, the first plurality of observation vectors as an outlier relative to the normal operating condition of the system;
when the computed window threshold value is greater than the upper control limit value, identifying, by the computing device, the first plurality of observation vectors as the outlier relative to the normal operating condition of the system;
when the computed window threshold value is less than the lower control limit value, identifying, by the computing device, the first plurality of observation vectors as the outlier relative to the normal operating condition of the system; and
when the first plurality of observation vectors are identified as the outlier, outputting, by the computing device, an alert.

26. The method of claim 25, wherein outputting the alert comprises sending a message to a second computing device, wherein the message indicates that a system fault has occurred or that a system state has changed.

27. The method of claim 26, wherein the predefined window length is associated with a start time and an end time, wherein outputting the alert comprises presenting an indicator of the start time and the end time.

28. The method of claim 25, wherein outputting the alert comprises sending the first plurality of observation vectors to a second computing device.

29. The method of claim 25, wherein outputting the alert comprises presenting the first plurality of observation vectors on a display.

30. The method of claim 25, wherein outputting the alert comprises presenting the computed distance value or the computed window threshold value on a display.

* * * * *

UNITED STATES PATENT AND TRADEMARK OFFICE
CERTIFICATE OF CORRECTION

PATENT NO. : 9,639,809 B1
APPLICATION NO. : 15/390236
DATED : May 2, 2017
INVENTOR(S) : Deovrat Vijay Kakde et al.

Page 1 of 2

It is certified that error appears in the above-identified patent and that said Letters Patent is hereby corrected as shown below:

In the Specification

Equation 8, Column 8, Line 42:

Delete " $R^2 = x_k \cdot x_k - 2\sum_{i=1}^{N_{SV}} \alpha_i(x_i \cdot x_k) + \sum_{i=1}^{N_{SV}} \sum_{j=1}^{N_{SV}} \alpha_i \beta_j (x_i \cdot x_j)$ ," and replace with -- $R^2 = x_k \cdot x_k - 2\sum_{i=1}^{N_{SV}} \alpha_i(x_i \cdot x_k) + \sum_{i=1}^{N_{SV}} \sum_{j=1}^{N_{SV}} \alpha_i \alpha_j (x_i \cdot x_j)$ --

In the Claims

Claim 7, Column 36, Lines 13-14:

Delete " $dist^2(z) = K(z,z) - 2\sum_{i=1}^{N} \alpha_i K(x_i, z) + \sum_{i=1}^{N} \sum_{j=1}^{N} \alpha_i \alpha_j K(x_i, x_j)$ ," and replace with -- $dist^2(z) = K(z,z) - 2\sum_{i=1}^{N} \alpha_i K(x_i, z) + \sum_{i=1}^{N} \sum_{j=1}^{N} \alpha_i \alpha_j K(x_i, x_j)$ --

Claim 11, Column 36, Line 41:

Delete " $L_{DCL} = \underline{R}^2 - CL_F \times \sigma_{R^2}$ ," and replace with -- $L_{DCL} = \bar{R}^2 - CL_F \times \sigma_{R^2}$ --

Claim 13, Column 36, Line 50:

Delete " $R^2 = K(x_k, x_k) - 2\sum_{i=1}^{N} \alpha_i K(x_i, x_k) + \sum_{i=1}^{N} \sum_{j=1}^{N} \alpha_i \alpha_j K(x_i, x_j)$ ," and replace with -- $R^2 = K(x_k, x_k) - 2\sum_{i=1}^{N} \alpha_i K(x_i, x_k) + \sum_{i=1}^{N} \sum_{j=1}^{N} \alpha_i \alpha_j K(x_i, x_j)$ --

Signed and Sealed this
Eleventh Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,639,809 B1

Claim 14, Column 36, Line 59:

Delete "$R^2 = x_k \cdot x_k \cdot 2 \sum_{i=1}{}^N \alpha_i K(x_i, x_k) + \sum_{i=1}{}^N \sum_{j=1}{}^N \alpha_i \alpha_j K(x_i, x_j)$," and replace with -- $R^2 = x_k \cdot x_k - 2 \sum_{i=1}^N \alpha_i (x_i \cdot x_k) + \sum_{i=1}^N \sum_{j=1}^N \alpha_i \alpha_j (x_i \cdot x_j)$ --

Claim 15, Column 37, Lines 1-2:

Delete "$R^2 = K(x_k, x_k) - 2 \sum_{i=1}{}^N \alpha_i K(x_i, x_k) + \sum_{i=1}{}^N \sum_{j=1}{}^N \alpha_i \alpha_j K(x_i, x_j)$," and replace with -- $R^2 = K(x_k, x_k) - 2 \sum_{i=1}^N \alpha_i K(x_i, x_k) + \sum_{i=1}^N \sum_{j=1}^N \alpha_i \alpha_j K(x_i, x_j)$ --

Claim 16, Column 37, Line 10:

Delete "$R^2 = (x_k \cdot x_k) - 2 \sum_{i=1}{}^N \alpha_i K(x_i, x_k) + \sum_{i=1}{}^N \sum_{j=1}{}^N \alpha_i \alpha_j K(x_i, x_j)$," and replace with -- $R^2 = (x_k \cdot x_k) - 2 \sum_{i=1}^N \alpha_i (x_i \cdot x_k) + \sum_{i=1}^N \sum_{j=1}^N \alpha_i \alpha_j (x_i \cdot x_j)$ --